US007330826B1

(12) United States Patent
Porat et al.

(10) Patent No.: US 7,330,826 B1
(45) Date of Patent: Feb. 12, 2008

(54) METHOD, SYSTEM AND BUSINESS MODEL FOR A BUYER'S AUCTION WITH NEAR PERFECT INFORMATION USING THE INTERNET

(75) Inventors: Marc Porat, Los Altos Hills, CA (US); Kevin J. Surace, Sunnyvale, CA (US); Paul Milgrom, Palo Alto, CA (US)

(73) Assignee: Perfect.com, Inc., Kansas City, MO (US)

( * ) Notice: Subject to any disclaimer, the term of this patent is extended or adjusted under 35 U.S.C. 154(b) by 0 days.

(21) Appl. No.: 09/350,983

(22) Filed: Jul. 9, 1999

(51) Int. Cl.
*G06Q 40/00* (2006.01)

(52) U.S. Cl. .............................. 705/26; 705/27; 705/37

(58) Field of Classification Search .................. 705/26, 705/27, 37
See application file for complete search history.

(56) References Cited

U.S. PATENT DOCUMENTS

| 5,717,989 | A | * | 2/1998 | Tozzoli et al. ................. 705/37 |
| 5,794,207 | A | | 8/1998 | Walker et al. ................. 705/23 |
| 5,826,244 | A | * | 10/1998 | Huberman .................... 705/37 |
| 5,835,896 | A | | 11/1998 | Fisher et al. ................... 705/37 |
| 5,913,210 | A | * | 6/1999 | Call ............................... 707/4 |
| 5,950,172 | A | * | 9/1999 | Klingman ..................... 705/26 |
| 5,991,737 | A | * | 11/1999 | Chen .............................. 705/26 |
| 6,026,383 | A | * | 2/2000 | Ausubel ........................ 705/37 |
| 6,041,308 | A | | 3/2000 | Walker et al. ................. 705/14 |
| 6,058,379 | A | | 5/2000 | Odom et al. .................... 705/37 |
| 6,061,789 | A | * | 5/2000 | Hauser et al. ................. 713/168 |
| 6,085,169 | A | | 7/2000 | Walker et al. ................. 705/26 |
| 6,108,639 | A | | 8/2000 | Walker et al. ................. 705/26 |
| 6,128,600 | A | * | 10/2000 | Imamura et al. ............... 705/27 |
| 6,161,099 | A | * | 12/2000 | Harrington et al. ........... 705/36 |
| 6,223,163 | B1 | * | 4/2001 | Van Luchene .................. 705/1 |
| 6,394,341 | B1 | * | 5/2002 | Makipaa et al. ............. 235/379 |
| 6,397,197 | B1 | * | 5/2002 | Gindlesperger ............... 705/35 |
| 6,408,283 | B1 | * | 6/2002 | Alaia et al. .................... 705/37 |
| 6,647,373 | B1 | | 11/2003 | Carlton-Foss |

FOREIGN PATENT DOCUMENTS

EP 0828223 A2 * 9/1997

(Continued)

OTHER PUBLICATIONS

Maes et al.; Agents That Buy and sell, Communications of the ACM, Mar. 1999, vol. 42, No. 3.*

(Continued)

*Primary Examiner*—Jagdish N Patel
(74) *Attorney, Agent, or Firm*—Morgan, Lewis & Bockius LLP

(57) ABSTRACT

A methodology, system and business model are disclosed for facilitating a fully automated buyer's auction in which the major types of transaction costs are significantly reduced by providing the buyer and the sellers with near-perfect information about one another, including information about buyer preferences and competing sellers' offers. The system implements a buyer's auction with multidimensional bidding that minimizes market intelligence, search, bargaining and transaction execution costs and thus creates more competitive, frictionless markets. Buyers and sellers can efficiently conduct the buyer's auction within a unified environment, thereby minimizing buyer integration costs as well. The buyer's auction generates commercially marketable proprietary information and a revenue stream for the auctioneer providing such a service.

1 Claim, 60 Drawing Sheets

FOREIGN PATENT DOCUMENTS

| | | | |
|---|---|---|---|
| WO | WO 97/37315 | * | 10/1997 |
| WO | WO 00/21006 | | 4/2000 |
| WO | WO 00/58898 | | 10/2000 |

OTHER PUBLICATIONS

Yannis Bakos; The emerging role of electronic marketplaces on the Internet, Communication of the ACM pp. 35-42, Aug. 1998.*

Newsbytes article dated Jan. 15, 1999: "Ebay Thwarting Fraudsters".*

Boston Ed RFR Seeks Between 132 MN and 306 MW; Independent Power Report, Oct. 25, 1991.*

Guttman, Robert H; "Merchant Differentiation through Integrative Negotiation in Agent-mediated Electronic Commerce", 1998 Massachustts Institute of Technology.* eBay.com: "eBay Exceeds 21 Million Bids: Leader in Person-to-Person Online Auction Site Sets the Pace in Fast-Growing Industry," San Jose, CA; Jan. 20, 1998. "Internet Shopping Network and eBay Partner to Expand Auction Capabilities," Sunnyvale, CA; Jan. 13, 1998.

* cited by examiner

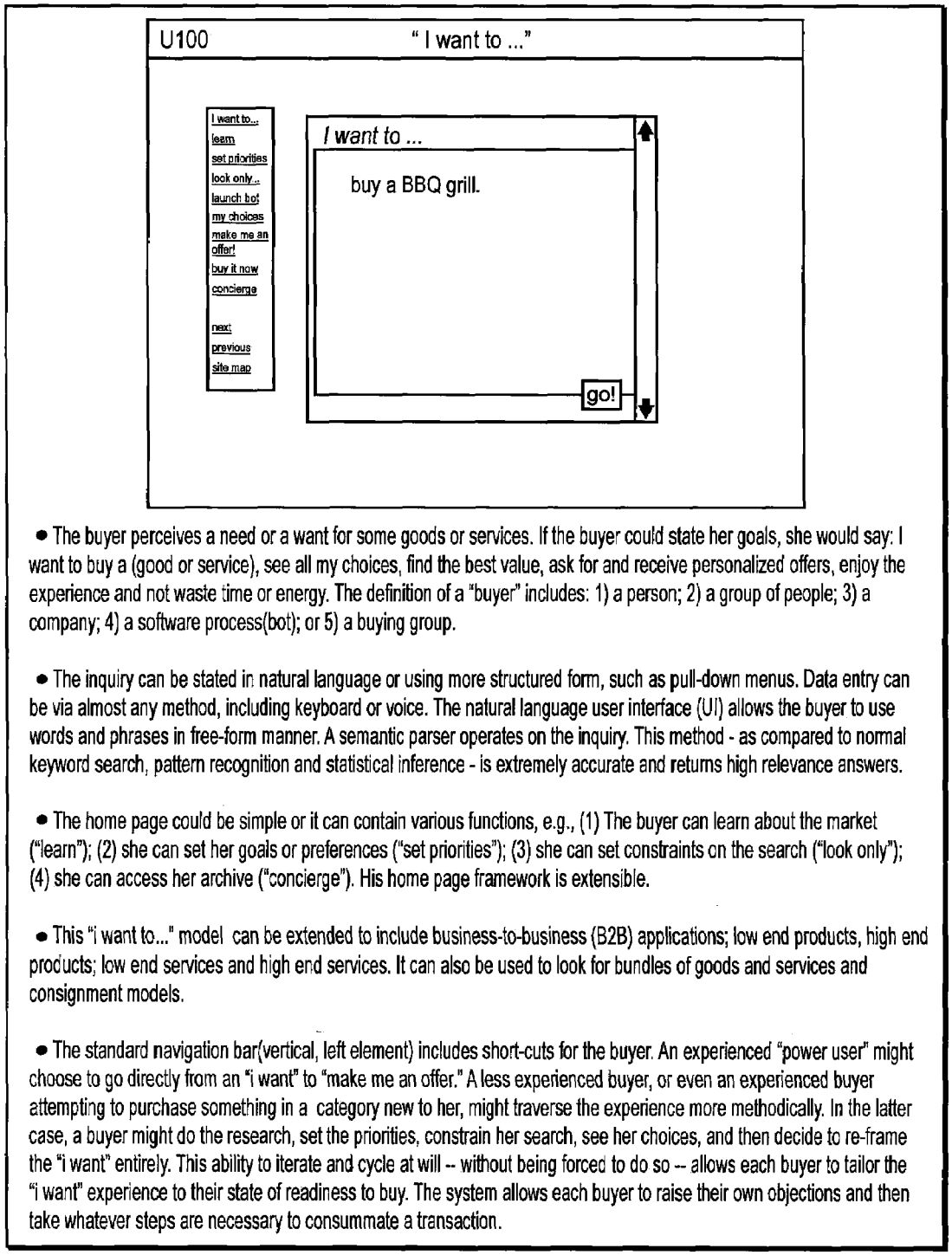

- The buyer perceives a need or a want for some goods or services. If the buyer could state her goals, she would say: I want to buy a (good or service), see all my choices, find the best value, ask for and receive personalized offers, enjoy the experience and not waste time or energy. The definition of a "buyer" includes: 1) a person; 2) a group of people; 3) a company; 4) a software process(bot); or 5) a buying group.

- The inquiry can be stated in natural language or using more structured form, such as pull-down menus. Data entry can be via almost any method, including keyboard or voice. The natural language user interface (UI) allows the buyer to use words and phrases in free-form manner. A semantic parser operates on the inquiry. This method - as compared to normal keyword search, pattern recognition and statistical inference - is extremely accurate and returns high relevance answers.

- The home page could be simple or it can contain various functions, e.g., (1) The buyer can learn about the market ("learn"); (2) she can set her goals or preferences ("set priorities"); (3) she can set constraints on the search ("look only"); (4) she can access her archive ("concierge"). His home page framework is extensible.

- This "i want to..." model can be extended to include business-to-business (B2B) applications; low end products, high end products; low end services and high end services. It can also be used to look for bundles of goods and services and consignment models.

- The standard navigation bar(vertical, left element) includes short-cuts for the buyer. An experienced "power user" might choose to go directly from an "i want" to "make me an offer." A less experienced buyer, or even an experienced buyer attempting to purchase something in a category new to her, might traverse the experience more methodically. In the latter case, a buyer might do the research, set the priorities, constrain her search, see her choices, and then decide to re-frame the "i want" entirely. This ability to iterate and cycle at will -- without being forced to do so -- allows each buyer to tailor the "i want" experience to their state of readiness to buy. The system allows each buyer to raise their own objections and then take whatever steps are necessary to consummate a transaction.

FIG. 31

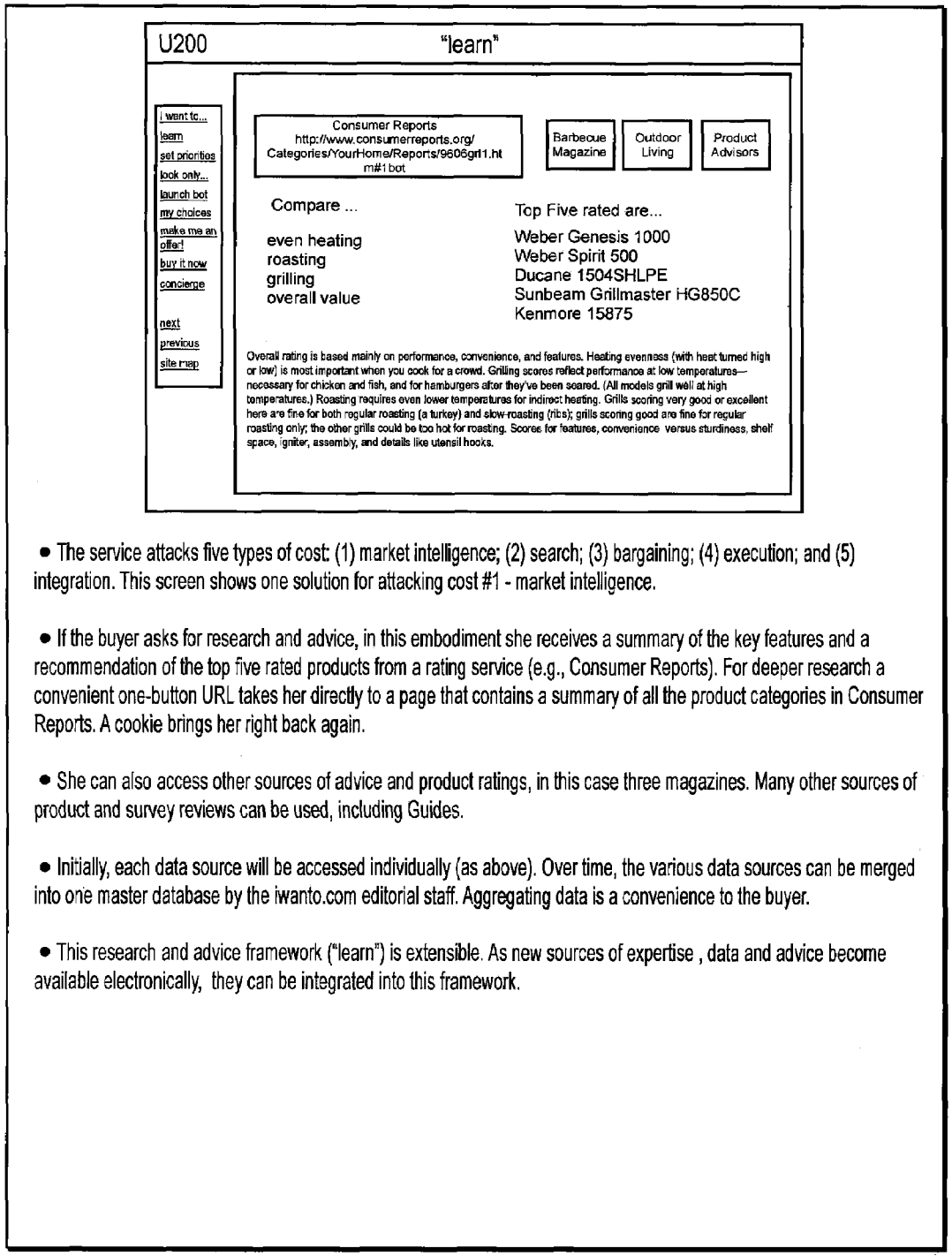

- The service attacks five types of cost: (1) market intelligence; (2) search; (3) bargaining; (4) execution; and (5) integration. This screen shows one solution for attacking cost #1 - market intelligence.

- If the buyer asks for research and advice, in this embodiment she receives a summary of the key features and a recommendation of the top five rated products from a rating service (e.g., Consumer Reports). For deeper research a convenient one-button URL takes her directly to a page that contains a summary of all the product categories in Consumer Reports. A cookie brings her right back again.

- She can also access other sources of advice and product ratings, in this case three magazines. Many other sources of product and survey reviews can be used, including Guides.

- Initially, each data source will be accessed individually (as above). Over time, the various data sources can be merged into one master database by the iwanto.com editorial staff. Aggregating data is a convenience to the buyer.

- This research and advice framework ("learn") is extensible. As new sources of expertise, data and advice become available electronically, they can be integrated into this framework.

FIG. 32

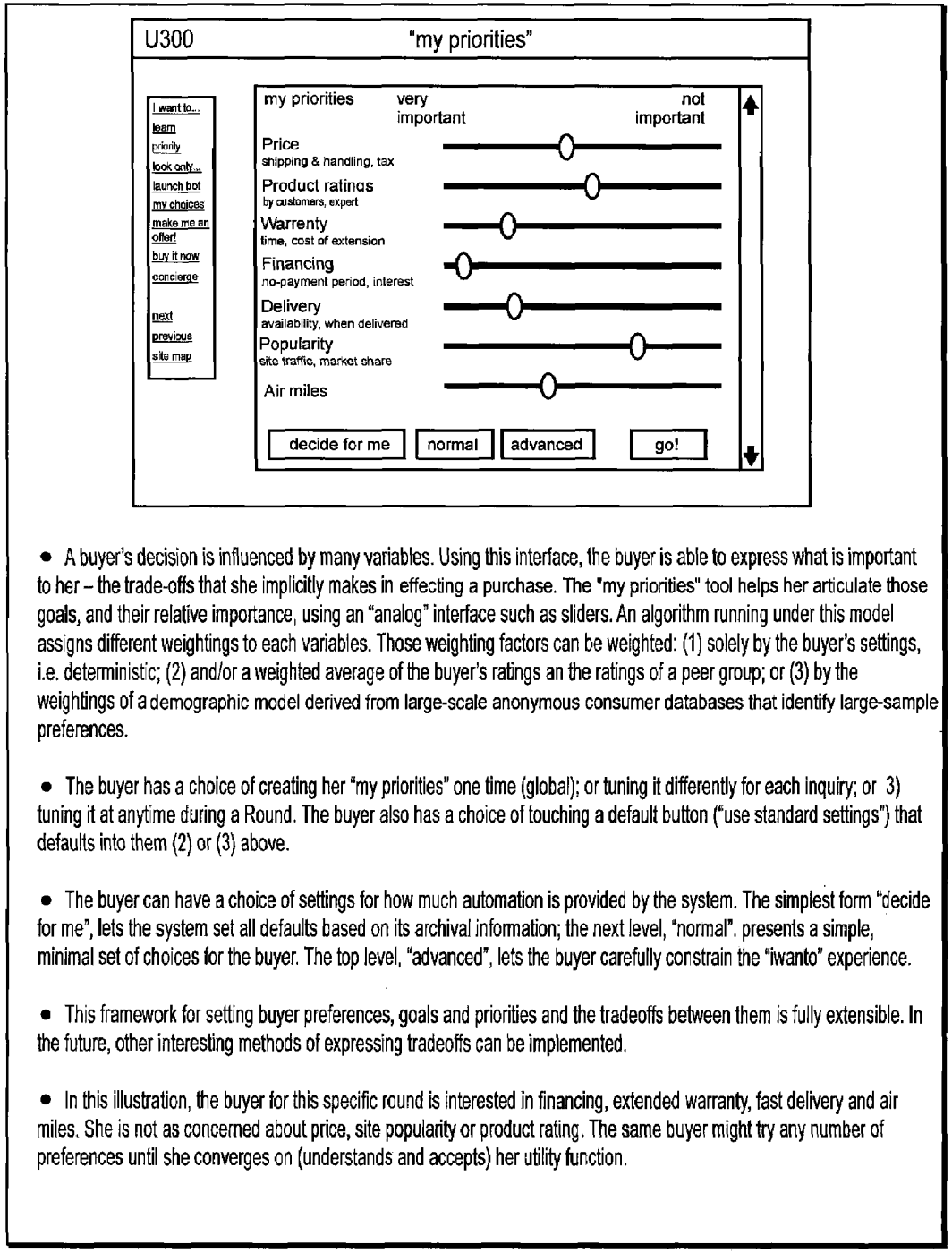

- A buyer's decision is influenced by many variables. Using this interface, the buyer is able to express what is important to her – the trade-offs that she implicitly makes in effecting a purchase. The "my priorities" tool helps her articulate those goals, and their relative importance, using an "analog" interface such as sliders. An algorithm running under this model assigns different weightings to each variables. Those weighting factors can be weighted: (1) solely by the buyer's settings, i.e. deterministic; (2) and/or a weighted average of the buyer's ratings an the ratings of a peer group; or (3) by the weightings of a demographic model derived from large-scale anonymous consumer databases that identify large-sample preferences.

- The buyer has a choice of creating her "my priorities" one time (global); or tuning it differently for each inquiry; or 3) tuning it at anytime during a Round. The buyer also has a choice of touching a default button ("use standard settings") that defaults into them (2) or (3) above.

- The buyer can have a choice of settings for how much automation is provided by the system. The simplest form "decide for me", lets the system set all defaults based on its archival information; the next level, "normal". presents a simple, minimal set of choices for the buyer. The top level, "advanced", lets the buyer carefully constrain the "iwanto" experience.

- This framework for setting buyer preferences, goals and priorities and the tradeoffs between them is fully extensible. In the future, other interesting methods of expressing tradeoffs can be implemented.

- In this illustration, the buyer for this specific round is interested in financing, extended warranty, fast delivery and air miles. She is not as concerned about price, site popularity or product rating. The same buyer might try any number of preferences until she converges on (understands and accepts) her utility function.

FIG. 33

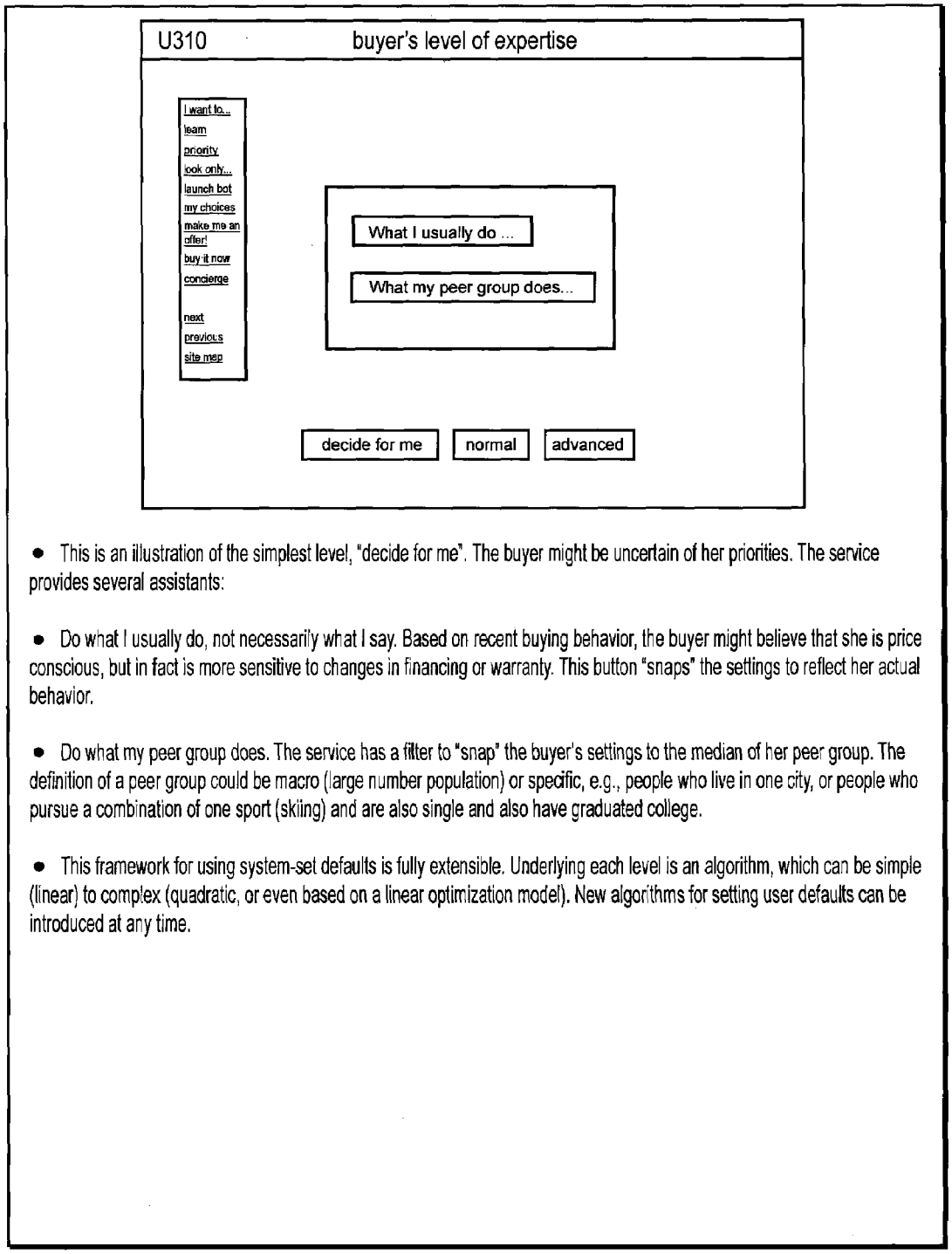

- This is an illustration of the simplest level, "decide for me". The buyer might be uncertain of her priorities. The service provides several assistants:

- Do what I usually do, not necessarily what I say. Based on recent buying behavior, the buyer might believe that she is price conscious, but in fact is more sensitive to changes in financing or warranty. This button "snaps" the settings to reflect her actual behavior.

- Do what my peer group does. The service has a filter to "snap" the buyer's settings to the median of her peer group. The definition of a peer group could be macro (large number population) or specific, e.g., people who live in one city, or people who pursue a combination of one sport (skiing) and are also single and also have graduated college.

- This framework for using system-set defaults is fully extensible. Underlying each level is an algorithm, which can be simple (linear) to complex (quadratic, or even based on a linear optimization model). New algorithms for setting user defaults can be introduced at any time.

FIG. 34

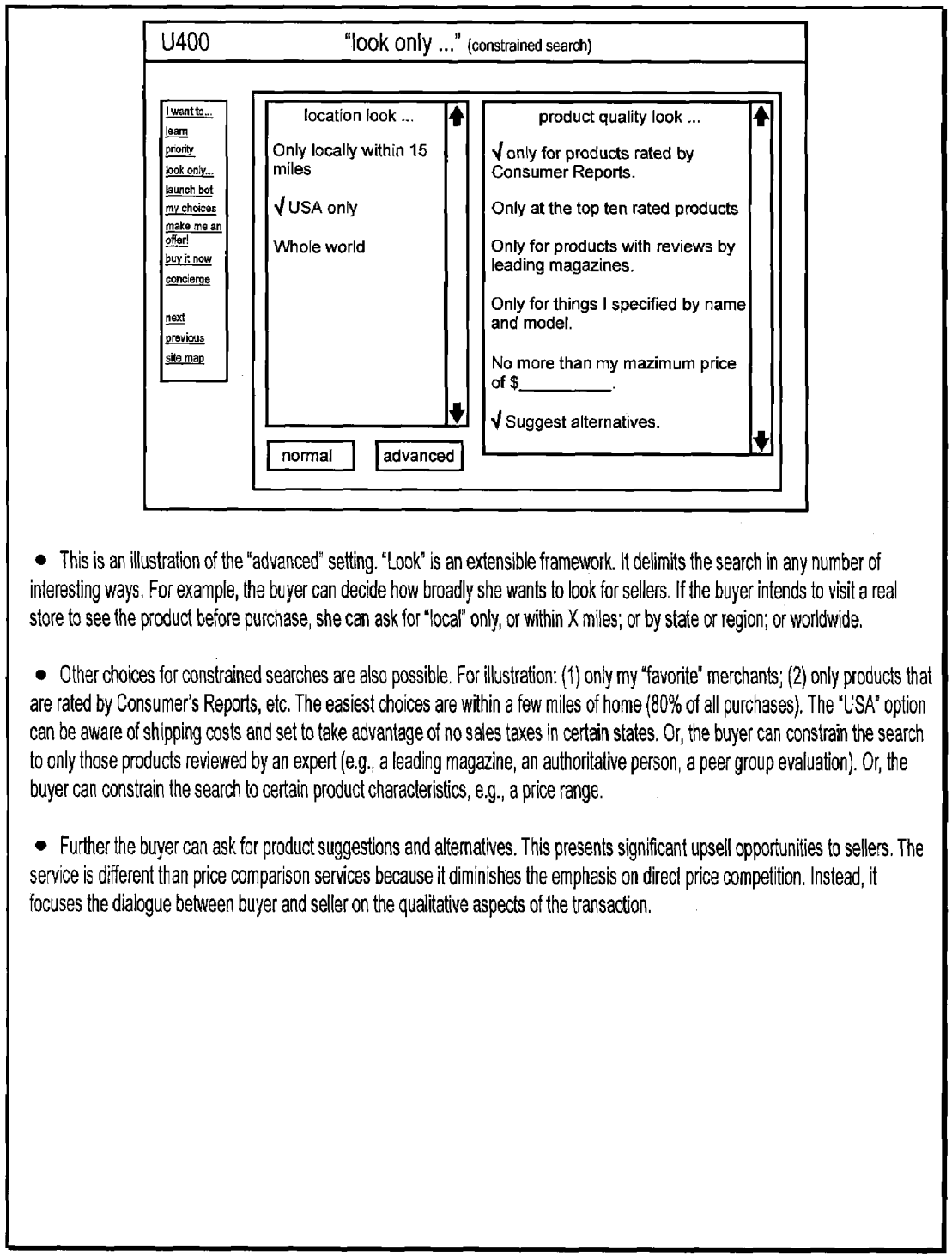

- This is an illustration of the "advanced" setting. "Look" is an extensible framework. It delimits the search in any number of interesting ways. For example, the buyer can decide how broadly she wants to look for sellers. If the buyer intends to visit a real store to see the product before purchase, she can ask for "local" only, or within X miles; or by state or region; or worldwide.

- Other choices for constrained searches are also possible. For illustration: (1) only my "favorite" merchants; (2) only products that are rated by Consumer's Reports, etc. The easiest choices are within a few miles of home (80% of all purchases). The "USA" option can be aware of shipping costs and set to take advantage of no sales taxes in certain states. Or, the buyer can constrain the search to only those products reviewed by an expert (e.g., a leading magazine, an authoritative person, a peer group evaluation). Or, the buyer can constrain the search to certain product characteristics, e.g., a price range.

- Further the buyer can ask for product suggestions and alternatives. This presents significant upsell opportunities to sellers. The service is different than price comparison services because it diminishes the emphasis on direct price competition. Instead, it focuses the dialogue between buyer and seller on the qualitative aspects of the transaction.

FIG. 35

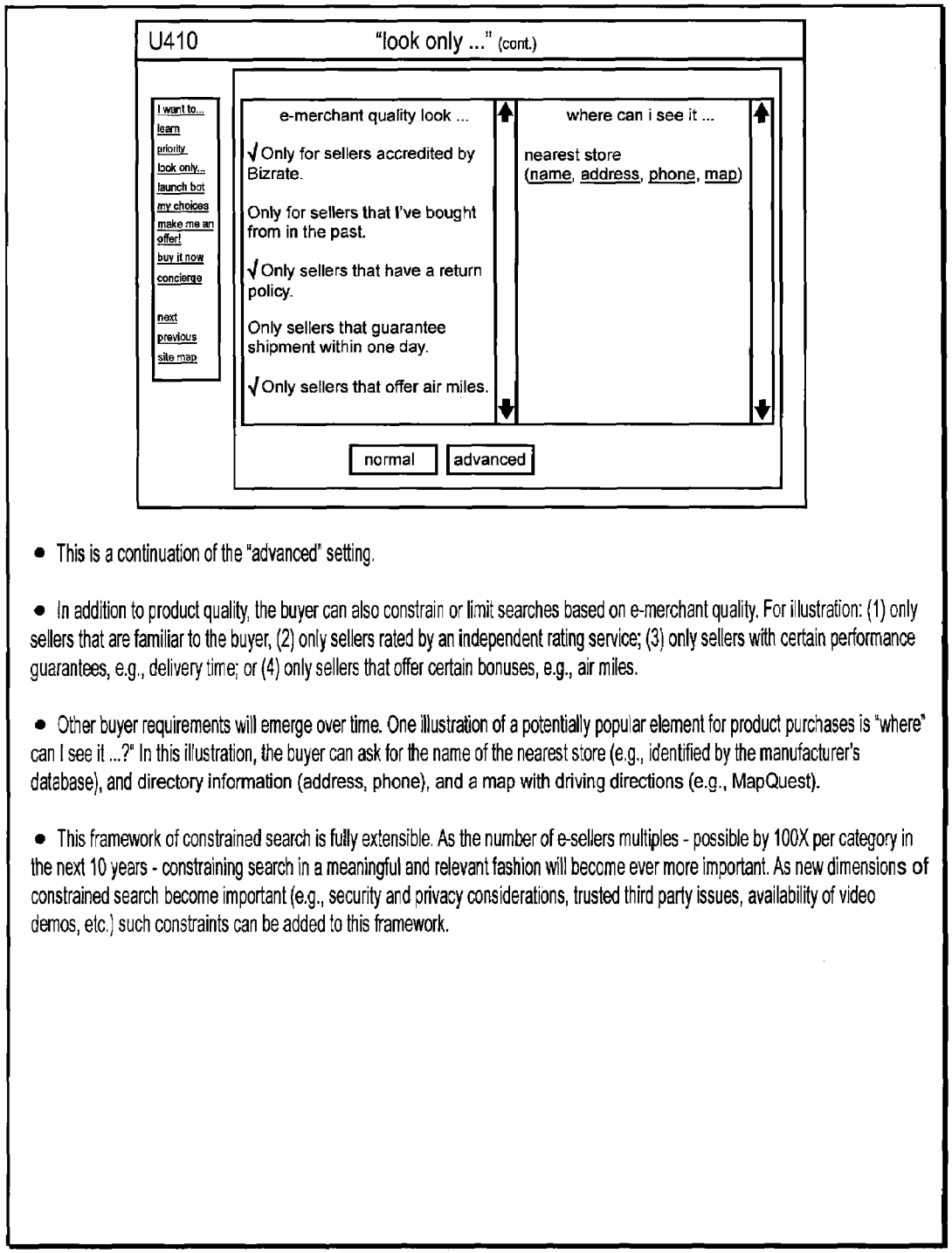

- This is a continuation of the "advanced" setting.

- In addition to product quality, the buyer can also constrain or limit searches based on e-merchant quality. For illustration: (1) only sellers that are familiar to the buyer, (2) only sellers rated by an independent rating service; (3) only sellers with certain performance guarantees, e.g., delivery time; or (4) only sellers that offer certain bonuses, e.g., air miles.

- Other buyer requirements will emerge over time. One illustration of a potentially popular element for product purchases is "where" can I see it ...?" In this illustration, the buyer can ask for the name of the nearest store (e.g., identified by the manufacturer's database), and directory information (address, phone), and a map with driving directions (e.g., MapQuest).

- This framework of constrained search is fully extensible. As the number of e-sellers multiples - possible by 100X per category in the next 10 years - constraining search in a meaningful and relevant fashion will become ever more important. As new dimensions of constrained search become important (e.g., security and privacy considerations, trusted third party issues, availability of video demos, etc.) such constraints can be added to this framework.

FIG. 36

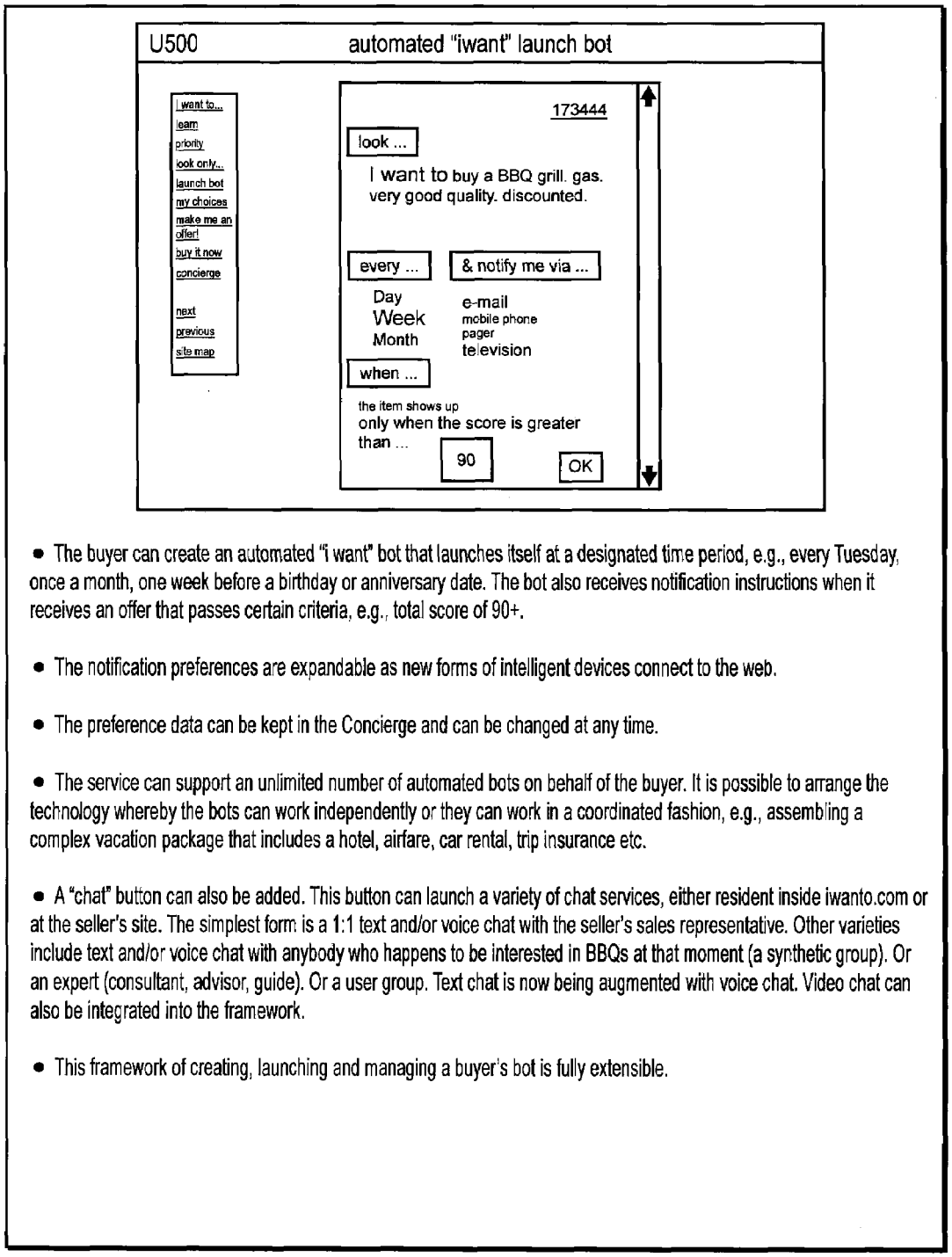

- The buyer can create an automated "i want" bot that launches itself at a designated time period, e.g., every Tuesday, once a month, one week before a birthday or anniversary date. The bot also receives notification instructions when it receives an offer that passes certain criteria, e.g., total score of 90+.

- The notification preferences are expandable as new forms of intelligent devices connect to the web.

- The preference data can be kept in the Concierge and can be changed at any time.

- The service can support an unlimited number of automated bots on behalf of the buyer. It is possible to arrange the technology whereby the bots can work independently or they can work in a coordinated fashion, e.g., assembling a complex vacation package that includes a hotel, airfare, car rental, trip insurance etc.

- A "chat" button can also be added. This button can launch a variety of chat services, either resident inside iwanto.com or at the seller's site. The simplest form is a 1:1 text and/or voice chat with the seller's sales representative. Other varieties include text and/or voice chat with anybody who happens to be interested in BBQs at that moment (a synthetic group). Or an expert (consultant, advisor, guide). Or a user group. Text chat is now being augmented with voice chat. Video chat can also be integrated into the framework.

- This framework of creating, launching and managing a buyer's bot is fully extensible.

FIG. 37

| U600 | "my choices" result | | | |
|---|---|---|---|---|
| | sort by price | | | Round 173444 |
| I want to...<br>learn<br>priority<br>look only...<br>launch bot<br>my choices<br>make me an offer!<br>buy it now<br>concierge<br>next<br>previous<br>site map | 1. bbq.com [chat]<br>Closeouts, over-stocks, many items from around the world | Weber Genesis 1000<br>Many extras. Fully loaded. Needs some assembly.<br>$254<br>MSRP $319 | product thumbnail | 12 day delivery<br>$30 S&H<br>No financing<br>90 day Warranty<br>buy 2, 30% off |
| | 2. e-home.com [chat]<br>We stock 4,800 models for men & women from 120 companies.... | Ducane 1504SHLPE<br>Full featured BBQ.<br>$454<br>MSRP $684 | product thumbnail | 5 day delivery<br>$40 S&H<br>pay in 6 installments<br>12.8% interest<br>1 yr.. warranty |
| | 3. backyard.com [chat]<br>The largest wholesaler of toys. We specialize in imports from... | Sunbeam Grillmaster HG850C<br>Everything included for grilling and roasting, fish, chicken, steaks.<br>$388<br>MSRP $624 | product thumbnail | 3 day delivery<br>$58 S&H<br>pay in 3 installments<br>12% interest<br>2 year warranty |
| | adjust myPriorities | make a recommendation | | make me an offer! |

- When the buyer touches the "go" button, the natural language inquiry ("i want to...") coupled with the decision criteria (my priorities) are launched against a database of e-merchant goods and services. This database can either be pre-compiled; or compiled on the fly; or a combination of the two.

- The search bot assembles all the high-relevance offers in a consistent manner, corresponding as closely as possible to the standard decision criteria as seen in the myPriority tool. The offers can be sorted by any arbitrary field, such as name of seller, asking price, or any of the priorities. In this illustration, the buyer sorted by posted prices. bbq.com sorted into the #1 position.

- It is expected that many sources of date can be aggregated into the "my choices" reporting framework. It is therefore fully extensible, adding new features and functionality supported by third party providers of relevant market data that can be integrated into "my choices".

- The buyer can delimit the results that are displayed by top 100 (or any number); highest score from the recommended; or by any of the criteria, such as delivery time or warranty.

- The "my choices" answers are all pre-adjustment. They are exactly as would be found on the seller's web-sites by any buyer or seller. The answers can be pre-filtered to remove offers which are clearly not going to be relevant or are purposefully misleading. This pre-filtering uses the "my priorities" criteria module.

- The buyer can also launch the "make a recommendation" function. The recommendation engine uses the "my priorities" weights and analyzes all the data in "my choices".

FIG. 38

```
┌─────────────────────────────────────────────────────────────────────┐
│ U700              "make a recommendation"                           │
│                                                    Round 173444     │
│ ┌──────────┬────────────────┬──────────────────┬──────────────────┐ │
│ │I want to.│ 1. e-home.com  │ Ducane 1504SHLPE │ 5 day delivery   │ │
│ │learn     │                │ Full featured BBQ.│ $40 S&H    (91) │ │
│ │priority  │      [chat]    │                  │ pay in 6 install.│ │
│ │look only.│We stock 4,800  │                  │ 12.8% interest   │ │
│ │launch bot│models for men  │ $454             │ 1 yr. warranty   │ │
│ │my choices│& women from 120│ MSRP $684        │                  │ │
│ │make me an│companies ....  │                  │                  │ │
│ │offer!    ├────────────────┼──────────────────┼──────────────────┤ │
│ │buy it now│ 2. bbq.com     │                  │ 12 day delivery  │ │
│ │concierge │                │ Weber Genesis 1000│ $30 S&H      84 │ │
│ │          │      [chat]    │Many extras. Fully │ No financing     │ │
│ │next      │Closeouts, over-│loaded. Needs some │ 90 day Warranty  │ │
│ │previous  │stocks, many    │assembly.          │ buy 2, 30% off   │ │
│ │site map  │items from      │ $254              │                  │ │
│ │          │around the world│ MSRP $319         │                  │ │
│ │          ├────────────────┼──────────────────┼──────────────────┤ │
│ │          │ 3. backyard.com│ Sunbeam Grillmaster│ 3 day delivery  │ │
│ │          │                │ HG850C             │ $58 S&H      76 │ │
│ │          │      [chat]    │Everything included │ pay in 3 install.│ │
│ │          │The largest     │for grilling and    │ 12% interest    │ │
│ │          │wholesaler of   │roasting, fish,     │ 2 year warranty │ │
│ │          │toys. We spec.  │chicken, steaks.    │                 │ │
│ │          │in imports from │ $388              │                  │ │
│ │          │                │ MSRP $624         │                  │ │
│ └──────────┴────────────────┴──────────────────┴──────────────────┘ │
│           [adjust myPriorities]            [make me an offer!]      │
└─────────────────────────────────────────────────────────────────────┘
```

- A summary "value score" can be displayed that summarizes relevancy. The value score is created by an algorithm that weights the buyer's utility function in a unique manner (via policy) and matches it against the market choices. The score serves as a recommendation. In this illustration, the seller's offers are rank-ordered by Score and displayed in sequence. Notice that the fictitious company "e-home" seems to be the most relevant and delivers the highest value.

- The resulting recommendation can include side-by-side comparisons of features. In this illustration, the Recommender gave e-home the #1 position, with a value score of 91. Note that the bbq.com offer (lowest price in "my choices") dropped from #1 into the #2 position.

- An exclusion filter can also be applied to the database. The exclusion filter removes all offers which are non-qualifying for any number of reasons, some decided by the buyer, some decided by the "my choices" server. For illustration, a buyer may have had a bad experience with a vender, or a rating service may have given en e-merchant a bad rating; or the e-merchant is known to be using misleading information in their offers.

- The buyer has an option - as she does on almost all screens - to cycle back to the beginning and re-order her priorities, run the "my choices" again, and see if the resulting evaluation and recommendation has changed in an interesting manner. In this manner, the buyer is simulating her utility function - trying out different combinations that intuitively match her mental image of what is important to her. In the beginning, gross adjustments of her priorities may produce gross changes in the value score. As she converges on her priorities, the adjustments are expected to become finer and the value score more stable.

- Experienced buyers (within a particular category - not necessary across all categories) could go straight from an "iwanto" to an auction and bypass this step altogether.

- This framework for evaluation and recommendation is fully extensible. Additional evaluation criteria could be imposed from external sources. Multiple services can offer recommendations based on the same set of data. All of these features can be integrated into this framework.

FIG. 39

```
            U800                    "make me an offer"
```

| I want to... | Hello. You only do this once, ever. |
| learn | |
| priority | My name is [_____] |
| look only... | |
| launch bot | My secret password is [_____] |
| my choices | |
| make me an offer! | That's it. Have fun! |
| buy it now | |
| concierge | [normal] [advanced]        [make me an offer!] |
| next | |
| previous | |
| site map | |

- When the buyer first comes to "iwanto.com", she is welcomed to the service. When she is ready to ask for her first "make me an offer!", she is asked to fill out a simple registration, which is immediately confirmed by return email. There is no need to fill out her personal profile until she makes her first purchase.

- As new standards emerge of automating the registration process, this declaration might simplify down to just one input - a statement that says "join" or "register". Everything else would be supplied by the locally resident (i.e., browser-based, on the user's computer) or server-based (i.e., remote) database. Numerous standards are supported by the service, including but not limited to Open Profiling Standard (OPS), E-Commerce Markup Language (ECML), Platform for Privacy (P3P), Microsoft Passport, and ancillary services such as TrustE. For buyers who use such functionality, a single button push can upload all the data into the registration process – including the user's name and preferred (default) password.

FIG. 40

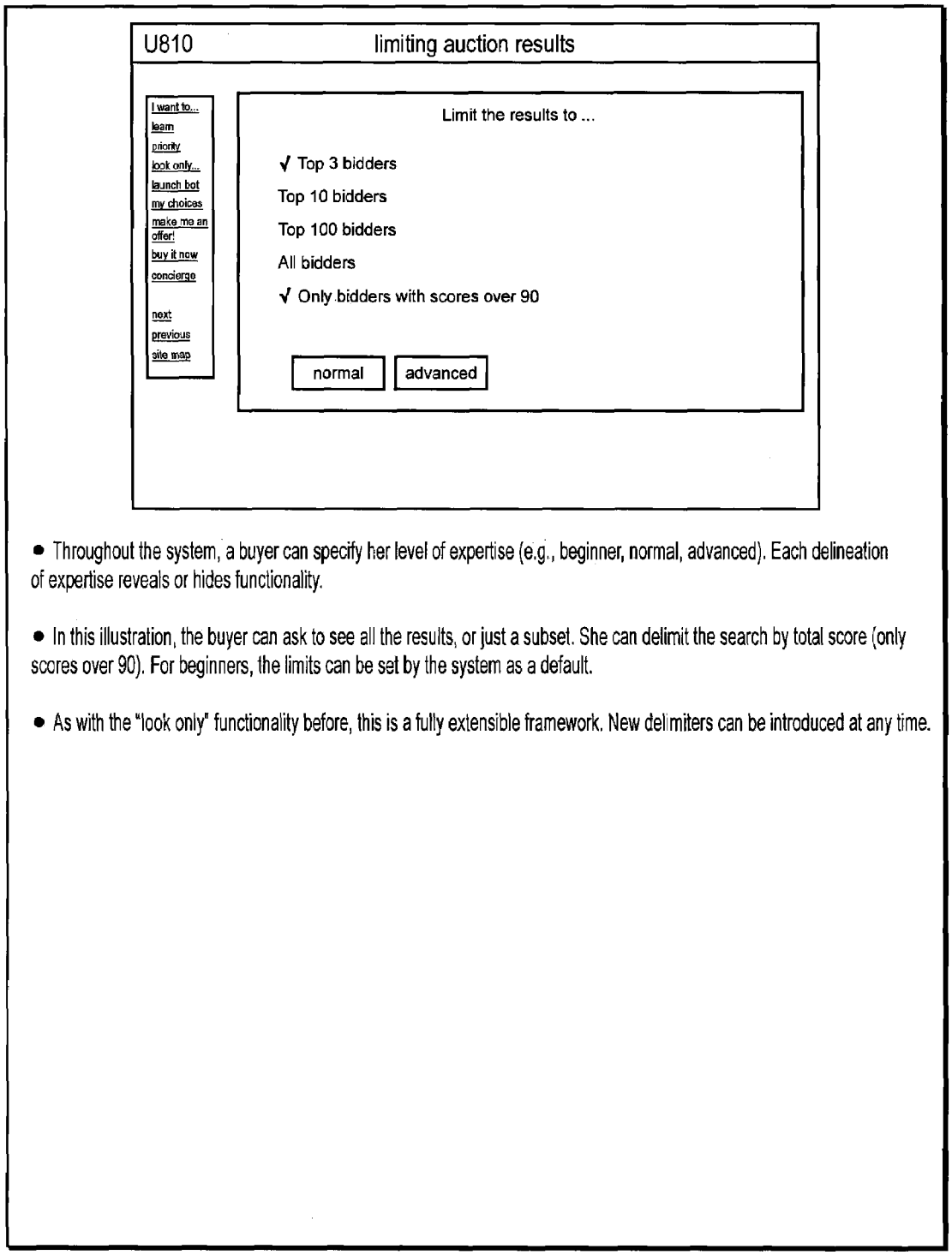

- Throughout the system, a buyer can specify her level of expertise (e.g., beginner, normal, advanced). Each delineation of expertise reveals or hides functionality.

- In this illustration, the buyer can ask to see all the results, or just a subset. She can delimit the search by total score (only scores over 90). For beginners, the limits can be set by the system as a default.

- As with the "look only" functionality before, this is a fully extensible framework. New delimiters can be introduced at any time.

FIG. 41

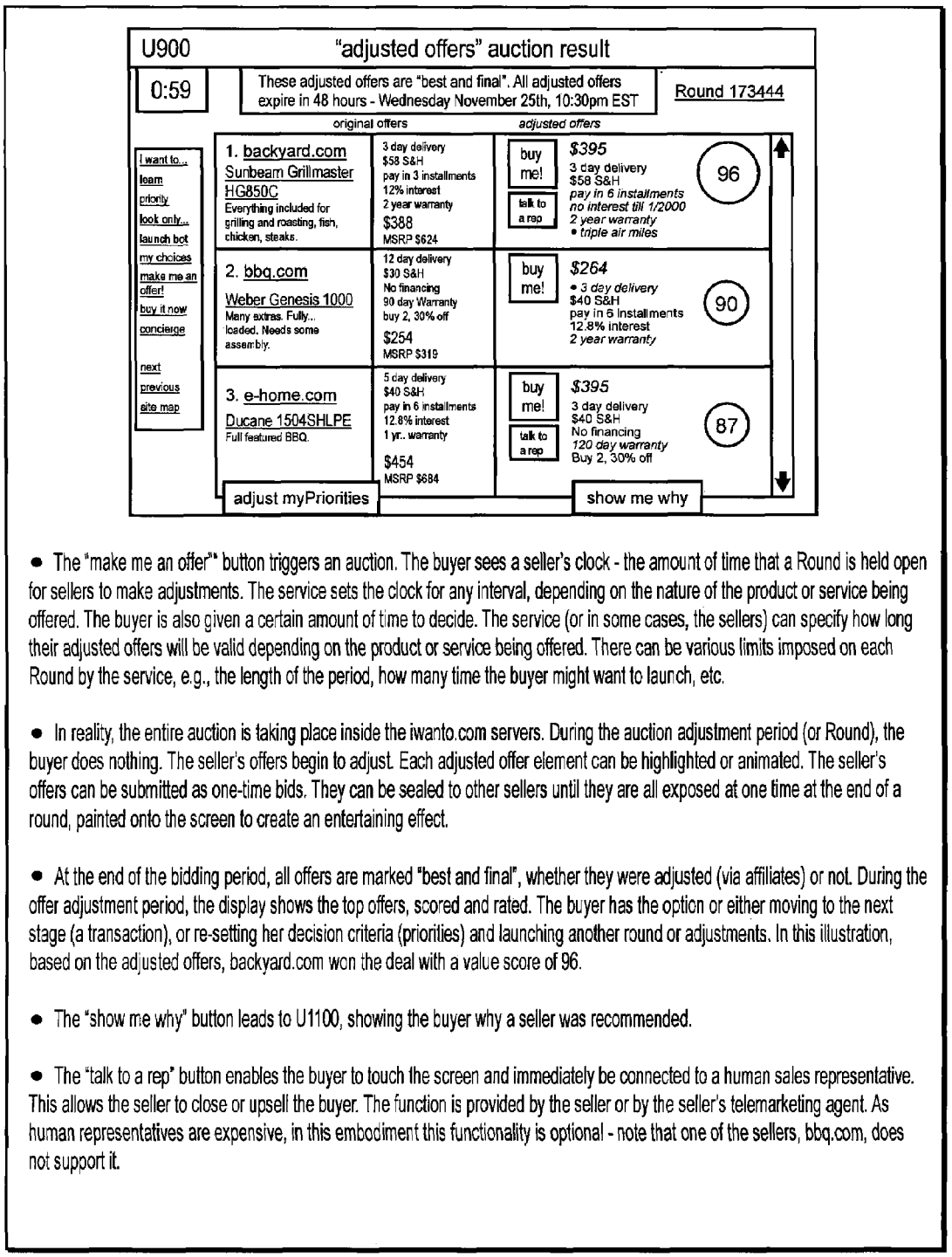

- The "make me an offer" button triggers an auction. The buyer sees a seller's clock - the amount of time that a Round is held open for sellers to make adjustments. The service sets the clock for any interval, depending on the nature of the product or service being offered. The buyer is also given a certain amount of time to decide. The service (or in some cases, the sellers) can specify how long their adjusted offers will be valid depending on the product or service being offered. There can be various limits imposed on each Round by the service, e.g., the length of the period, how many time the buyer might want to launch, etc.

- In reality, the entire auction is taking place inside the iwanto.com servers. During the auction adjustment period (or Round), the buyer does nothing. The seller's offers begin to adjust. Each adjusted offer element can be highlighted or animated. The seller's offers can be submitted as one-time bids. They can be sealed to other sellers until they are all exposed at one time at the end of a round, painted onto the screen to create an entertaining effect.

- At the end of the bidding period, all offers are marked "best and final", whether they were adjusted (via affiliates) or not. During the offer adjustment period, the display shows the top offers, scored and rated. The buyer has the option or either moving to the next stage (a transaction), or re-setting her decision criteria (priorities) and launching another round or adjustments. In this illustration, based on the adjusted offers, backyard.com won the deal with a value score of 96.

- The "show me why" button leads to U1100, showing the buyer why a seller was recommended.

- The "talk to a rep" button enables the buyer to touch the screen and immediately be connected to a human sales representative. This allows the seller to close or upsell the buyer. The function is provided by the seller or by the seller's telemarketing agent. As human representatives are expensive, in this embodiment this functionality is optional - note that one of the sellers, bbq.com, does not support it.

FIG. 42

| U910 | "i always get something" | | | |
|---|---|---|---|---|
| | | | | Round 173444 |
| | original offers | | adjusted offers | |
| I want to...<br>learn<br>priority<br>look only...<br>launch bot<br>my choices<br>make me an offer!<br>buy it now<br>concierge<br>next<br>previous<br>site map | 25. patioworld.com<br>Sunbeam Grillmaster<br>HG850C<br>Everything included for grilling and roasting, fish, chicken, steaks. | 3 day delivery<br>$58 S&H<br>pay in 3 installments<br>12% interest<br>2 year warranty<br>$388<br>MSRP $624 | buy me! | $388. Premium package option - only $36 (SRP $72)<br>• 1 day delivery no extra charge<br>• 3.9% interest<br>• no payments until 6/2000<br>• 48 month extended warranty    90 |

- The buyer's auction is most appealing when there are a large number of adjusted offers and when the buyer always gets something exceptional out of the experience. The buyer's experience is most satisfying when the buyer is assured of receiving something of value when she participates. iwanto.com already guarantees that the buyer receives value in market intelligence (e.g., Consumer Reports, research) and in "my choices" (all the posted offers). iwanto.com can further guarantee that the buyer receives a unique improvement over posted offers, in the form of iwanto-sponsored offers attached to posted offers.

- iwanto.com can guarantee that most or all offers will be adjusted by bundling several "premium" ancillary services into each offer: a) low interest and long no-payment period financing; b) faster delivery methods for the same price; (c) longer extended warranty period for the same price; etc. These ancillary services can be purchased from competitive suppliers and private-labeled by iwanto.com. With sufficient scale and buying power, iwanto.com can purchase these ancillary services at near "most favored nation" cost, and provide them to the buyer at near-cost (or conceivably as a loss-leader). The net effect is that every offer - whether provided by an affiliate or not - can appear to the buyer to be an adjusted offer. The seller's posted offer remains unchanged, and a low cost "premium package" is added to the offer. Posted offers can thus become adjusted offers.

- In this illustration, patioworld.com is not an affiliate player and therefore does not have a bot making adjusted offers. iwanto.com has therefore supplied a "Premium Package" including delivery, financing and warranty. The manufacturer's suggested retail price (MSRP) of the premium package is twice the price being offered. The offer is attached to the product as if patioworld.com were making an adjusted offer. From the buyer's point of view, the single "i want" generated hundreds of adjusted offers in the auction.

- If an unaffiliated seller wins a round, iwanto.com can make an ad-hoc arrangement to collect the 2.5% success fee or offer the first customer as a bonus for affiliating.

FIG. 43

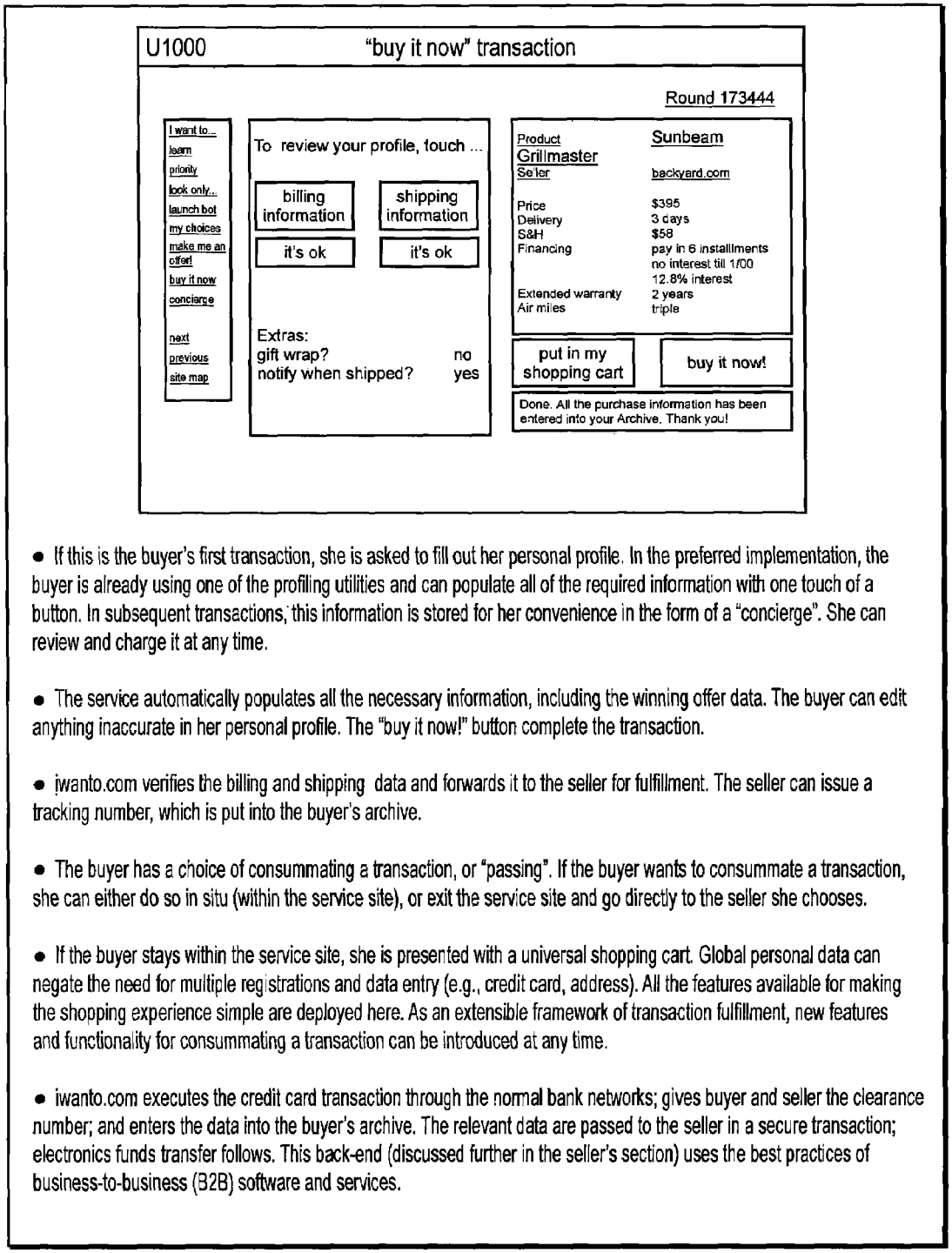

- If this is the buyer's first transaction, she is asked to fill out her personal profile. In the preferred implementation, the buyer is already using one of the profiling utilities and can populate all of the required information with one touch of a button. In subsequent transactions, this information is stored for her convenience in the form of a "concierge". She can review and charge it at any time.

- The service automatically populates all the necessary information, including the winning offer data. The buyer can edit anything inaccurate in her personal profile. The "buy it now!" button complete the transaction.

- iwanto.com verifies the billing and shipping data and forwards it to the seller for fulfillment. The seller can issue a tracking number, which is put into the buyer's archive.

- The buyer has a choice of consummating a transaction, or "passing". If the buyer wants to consummate a transaction, she can either do so in situ (within the service site), or exit the service site and go directly to the seller she chooses.

- If the buyer stays within the service site, she is presented with a universal shopping cart. Global personal data can negate the need for multiple registrations and data entry (e.g., credit card, address). All the features available for making the shopping experience simple are deployed here. As an extensible framework of transaction fulfillment, new features and functionality for consummating a transaction can be introduced at any time.

- iwanto.com executes the credit card transaction through the normal bank networks; gives buyer and seller the clearance number; and enters the data into the buyer's archive. The relevant data are passed to the seller in a secure transaction; electronics funds transfer follows. This back-end (discussed further in the seller's section) uses the best practices of business-to-business (B2B) software and services.

FIG. 44

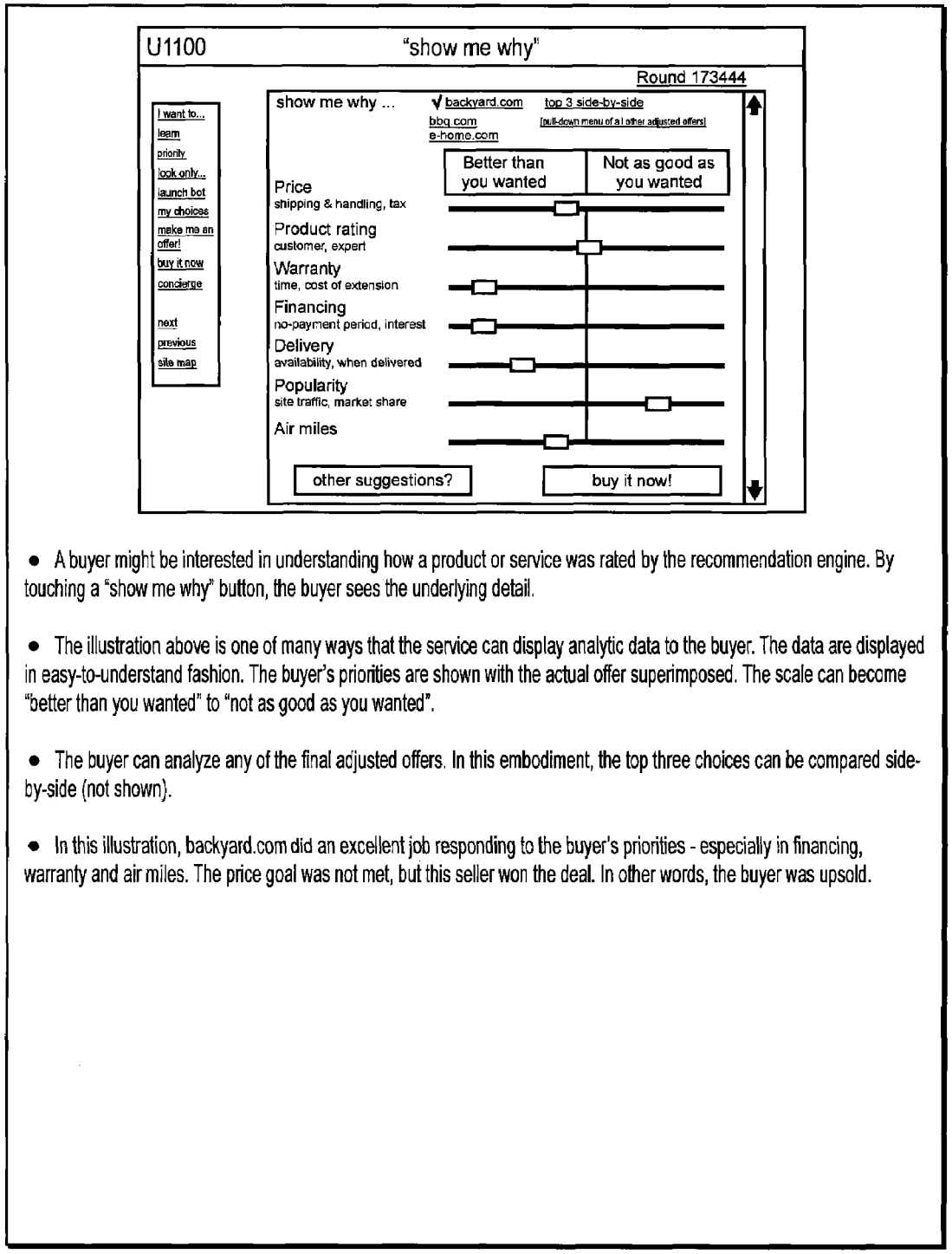

- A buyer might be interested in understanding how a product or service was rated by the recommendation engine. By touching a "show me why" button, the buyer sees the underlying detail.

- The illustration above is one of many ways that the service can display analytic data to the buyer. The data are displayed in easy-to-understand fashion. The buyer's priorities are shown with the actual offer superimposed. The scale can become "better than you wanted" to "not as good as you wanted".

- The buyer can analyze any of the final adjusted offers. In this embodiment, the top three choices can be compared side-by-side (not shown).

- In this illustration, backyard.com did an excellent job responding to the buyer's priorities - especially in financing, warranty and air miles. The price goal was not met, but this seller won the deal. In other words, the buyer was upsold.

FIG. 45

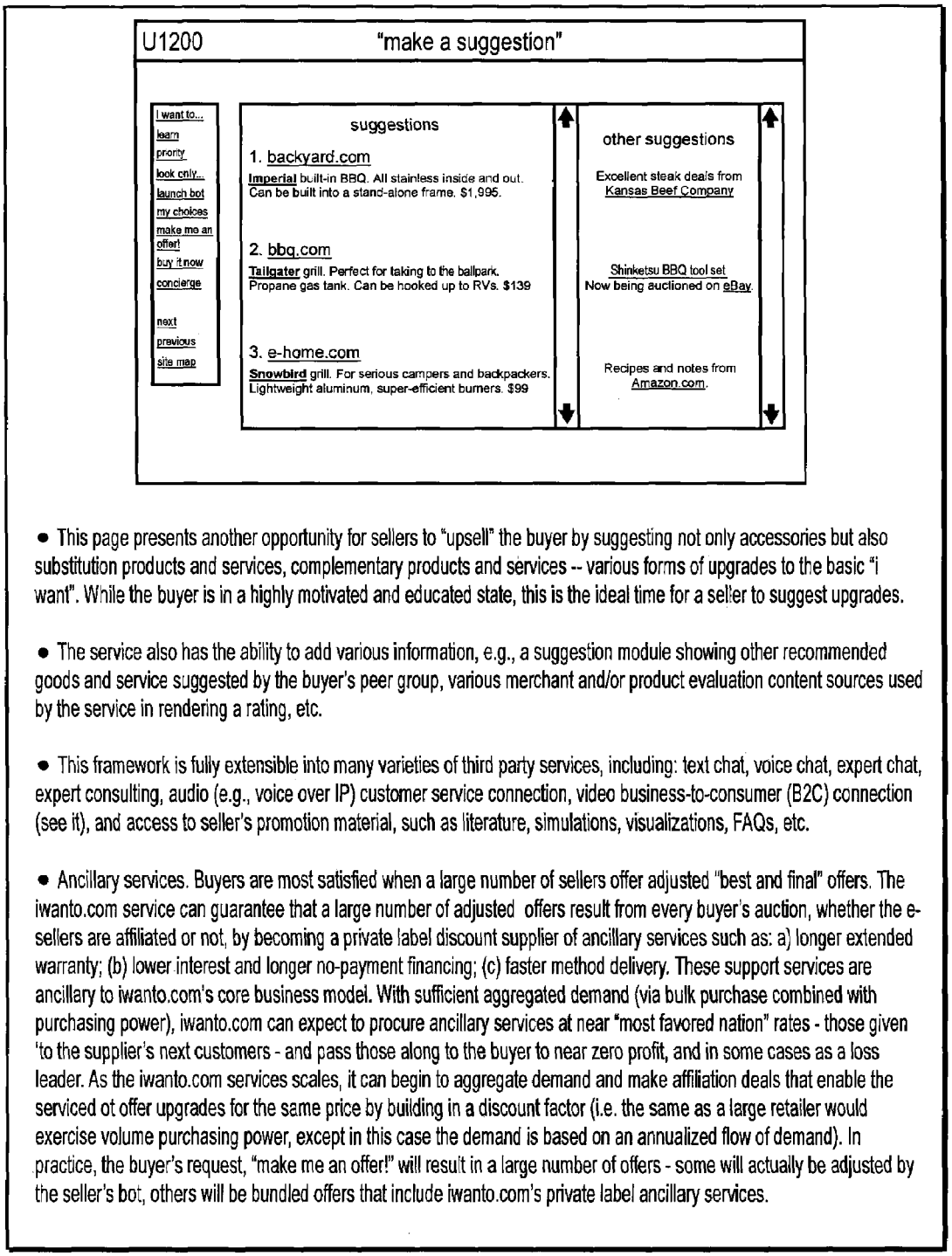

- This page presents another opportunity for sellers to "upsell" the buyer by suggesting not only accessories but also substitution products and services, complementary products and services -- various forms of upgrades to the basic "i want". While the buyer is in a highly motivated and educated state, this is the ideal time for a seller to suggest upgrades.

- The service also has the ability to add various information, e.g., a suggestion module showing other recommended goods and service suggested by the buyer's peer group, various merchant and/or product evaluation content sources used by the service in rendering a rating, etc.

- This framework is fully extensible into many varieties of third party services, including: text chat, voice chat, expert chat, expert consulting, audio (e.g., voice over IP) customer service connection, video business-to-consumer (B2C) connection (see it), and access to seller's promotion material, such as literature, simulations, visualizations, FAQs, etc.

- Ancillary services. Buyers are most satisfied when a large number of sellers offer adjusted "best and final" offers. The iwanto.com service can guarantee that a large number of adjusted offers result from every buyer's auction, whether the e-sellers are affiliated or not, by becoming a private label discount supplier of ancillary services such as: a) longer extended warranty; (b) lower interest and longer no-payment financing; (c) faster method delivery. These support services are ancillary to iwanto.com's core business model. With sufficient aggregated demand (via bulk purchase combined with purchasing power), iwanto.com can expect to procure ancillary services at near "most favored nation" rates - those given 'to the supplier's next customers - and pass those along to the buyer to near zero profit, and in some cases as a loss leader. As the iwanto.com services scales, it can begin to aggregate demand and make affiliation deals that enable the serviced ot offer upgrades for the same price by building in a discount factor (i.e. the same as a large retailer would exercise volume purchasing power, except in this case the demand is based on an annualized flow of demand). In practice, the buyer's request, "make me an offer!" will result in a large number of offers - some will actually be adjusted by the seller's bot, others will be bundled offers that include iwanto.com's private label ancillary services.

FIG. 46

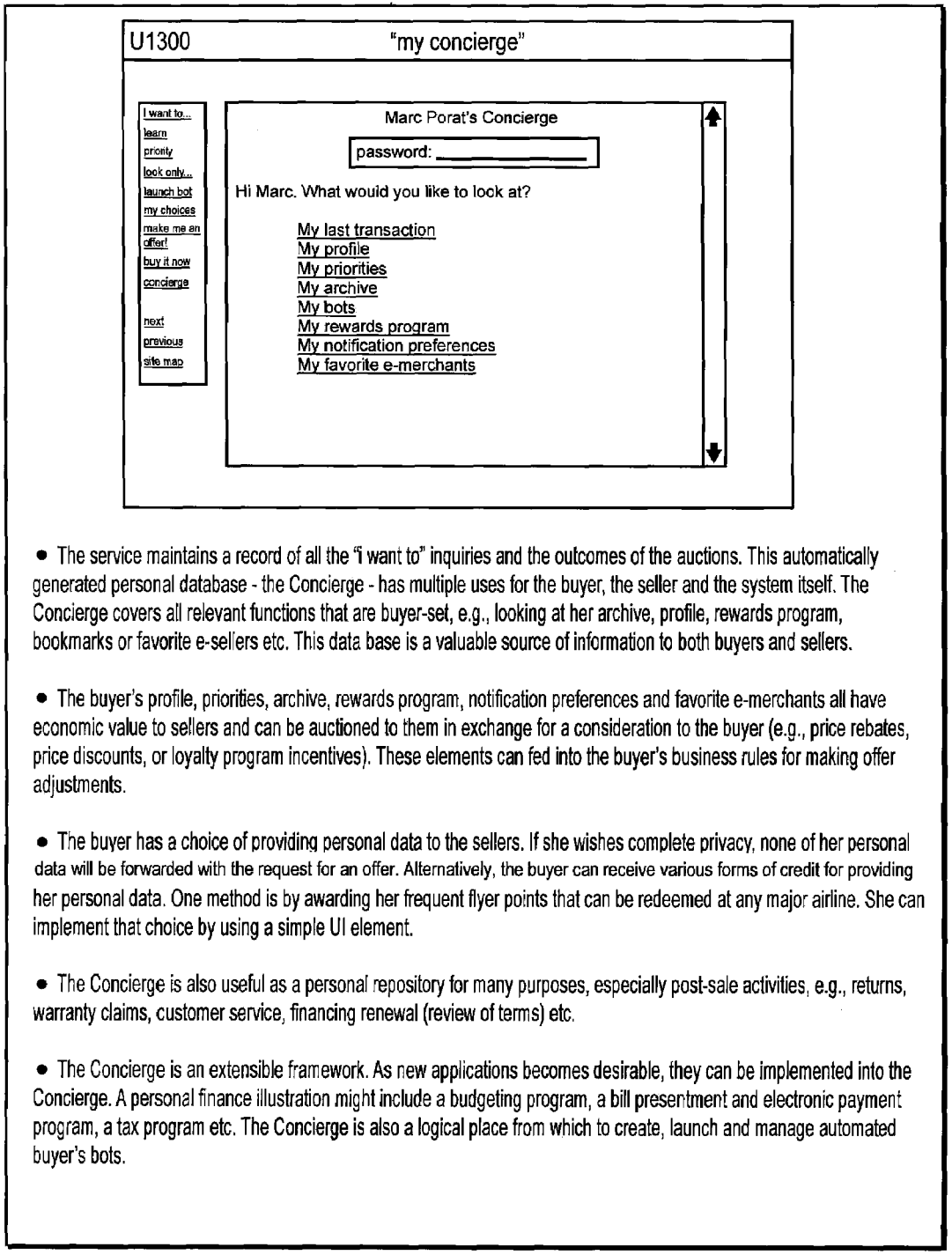

- The service maintains a record of all the "i want to" inquiries and the outcomes of the auctions. This automatically generated personal database - the Concierge - has multiple uses for the buyer, the seller and the system itself. The Concierge covers all relevant functions that are buyer-set, e.g., looking at her archive, profile, rewards program, bookmarks or favorite e-sellers etc. This data base is a valuable source of information to both buyers and sellers.

- The buyer's profile, priorities, archive, rewards program, notification preferences and favorite e-merchants all have economic value to sellers and can be auctioned to them in exchange for a consideration to the buyer (e.g., price rebates, price discounts, or loyalty program incentives). These elements can fed into the buyer's business rules for making offer adjustments.

- The buyer has a choice of providing personal data to the sellers. If she wishes complete privacy, none of her personal data will be forwarded with the request for an offer. Alternatively, the buyer can receive various forms of credit for providing her personal data. One method is by awarding her frequent flyer points that can be redeemed at any major airline. She can implement that choice by using a simple UI element.

- The Concierge is also useful as a personal repository for many purposes, especially post-sale activities, e.g., returns, warranty claims, customer service, financing renewal (review of terms) etc.

- The Concierge is an extensible framework. As new applications becomes desirable, they can be implemented into the Concierge. A personal finance illustration might include a budgeting program, a bill presentment and electronic payment program, a tax program etc. The Concierge is also a logical place from which to create, launch and manage automated buyer's bots.

FIG. 47

```
U1310                    "my archive"

I want to...    my archive - click for details
  learn
  priority        1/15/99   Women's skis, shape style ...  purchased   $450      shipped 1/16/98
  look only...    2/14/99   Mortgage refinance             $180,000... ...
  launch bot      3/1/99    B&B in Vail ...                purchased   $1,100    confirmed 3/1/99
  my choices      4/11/99   Fragrance ...                  purchased             back ordered
  make me an      4/11/99   Epson printer supplies ...     purchased   $29       shipped 4/13/99
  offer!          5/4/99    Mexico cruise ...              ...
  buy it now      5/5/99    Book                           purchased   $14       shipped 5/5/99
  concierge       5/5/99    CD                             purchased   $11       shipped 5/5/99
                  5/5/99    Books                          purchased   $36       back ordered
  next            6/23/99   Flowers                        purchased   $58       shipped 6/23/99
  previous        7/21/99   Auto financing
  site map

[ more archive ]                      [ print a report ]
```

- The Archive is a record all purchases. This is a useful database. The buyer can refer back for further information, reminders etc.

- The Archive contains data not only on consummated transactions but also on transactions not consummated. For illustration, the buyer may have come close to a decision and then stopped, wishing to cycle back, do more research and learning, change her priorities, and then re-enter the market. The Archive gives the buyer a snapshot of where she left the process, and can resume the buyer's auction without having to start from the beginning.

- In the case of subscriptions (e.g., magazines) and evergreen contracts (e.g., cable television), the concierge can remind the buyer or perform automatic functions, such as cancellation, renewal or suggestion of a rebid.

FIG. 48

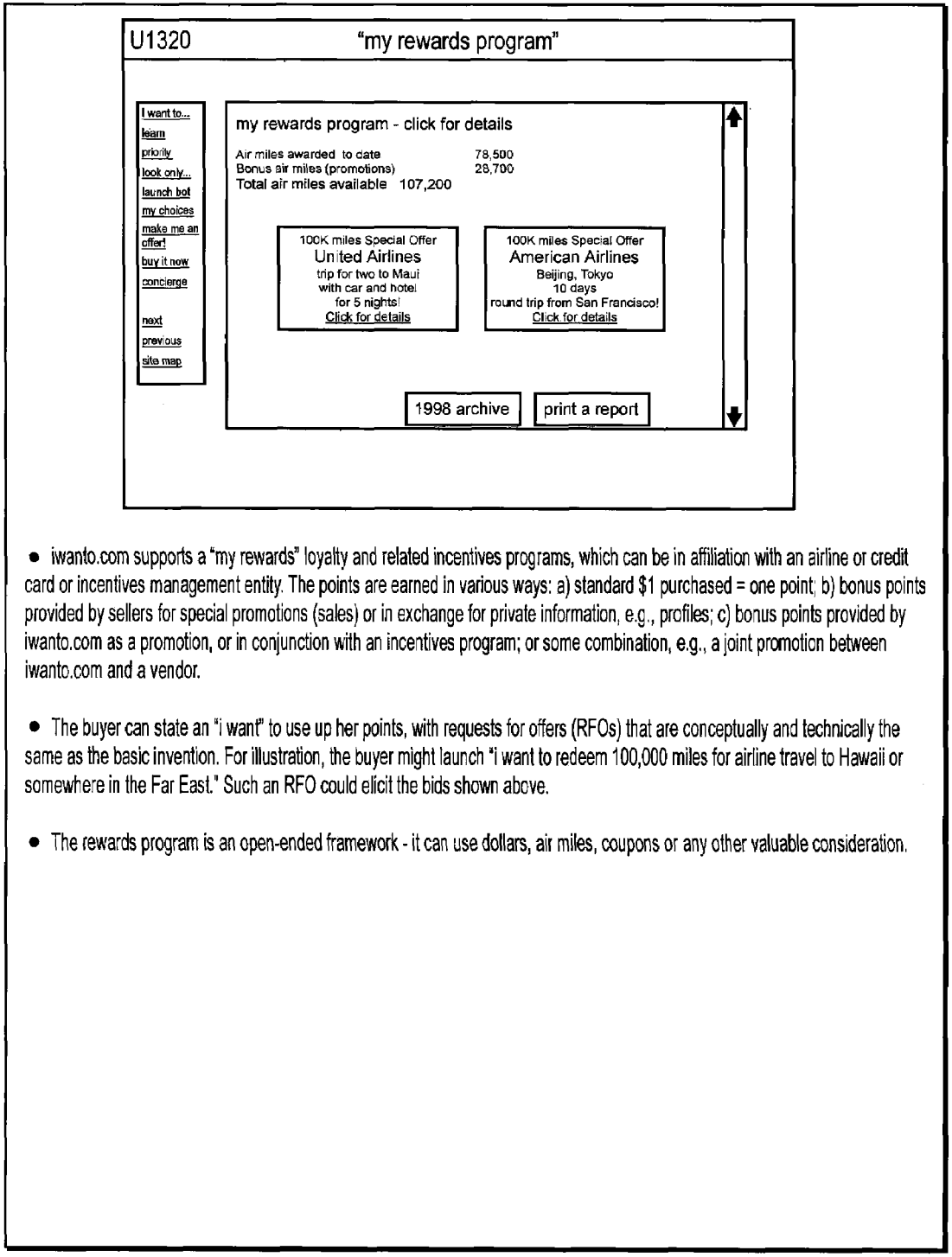

- iwanto.com supports a "my rewards" loyalty and related incentives programs, which can be in affiliation with an airline or credit card or incentives management entity. The points are earned in various ways: a) standard $1 purchased = one point; b) bonus points provided by sellers for special promotions (sales) or in exchange for private information, e.g., profiles; c) bonus points provided by iwanto.com as a promotion, or in conjunction with an incentives program; or some combination, e.g., a joint promotion between iwanto.com and a vendor.

- The buyer can state an "i want" to use up her points, with requests for offers (RFOs) that are conceptually and technically the same as the basic invention. For illustration, the buyer might launch "i want to redeem 100,000 miles for airline travel to Hawaii or somewhere in the Far East." Such an RFO could elicit the bids shown above.

- The rewards program is an open-ended framework - it can use dollars, air miles, coupons or any other valuable consideration.

FIG. 49

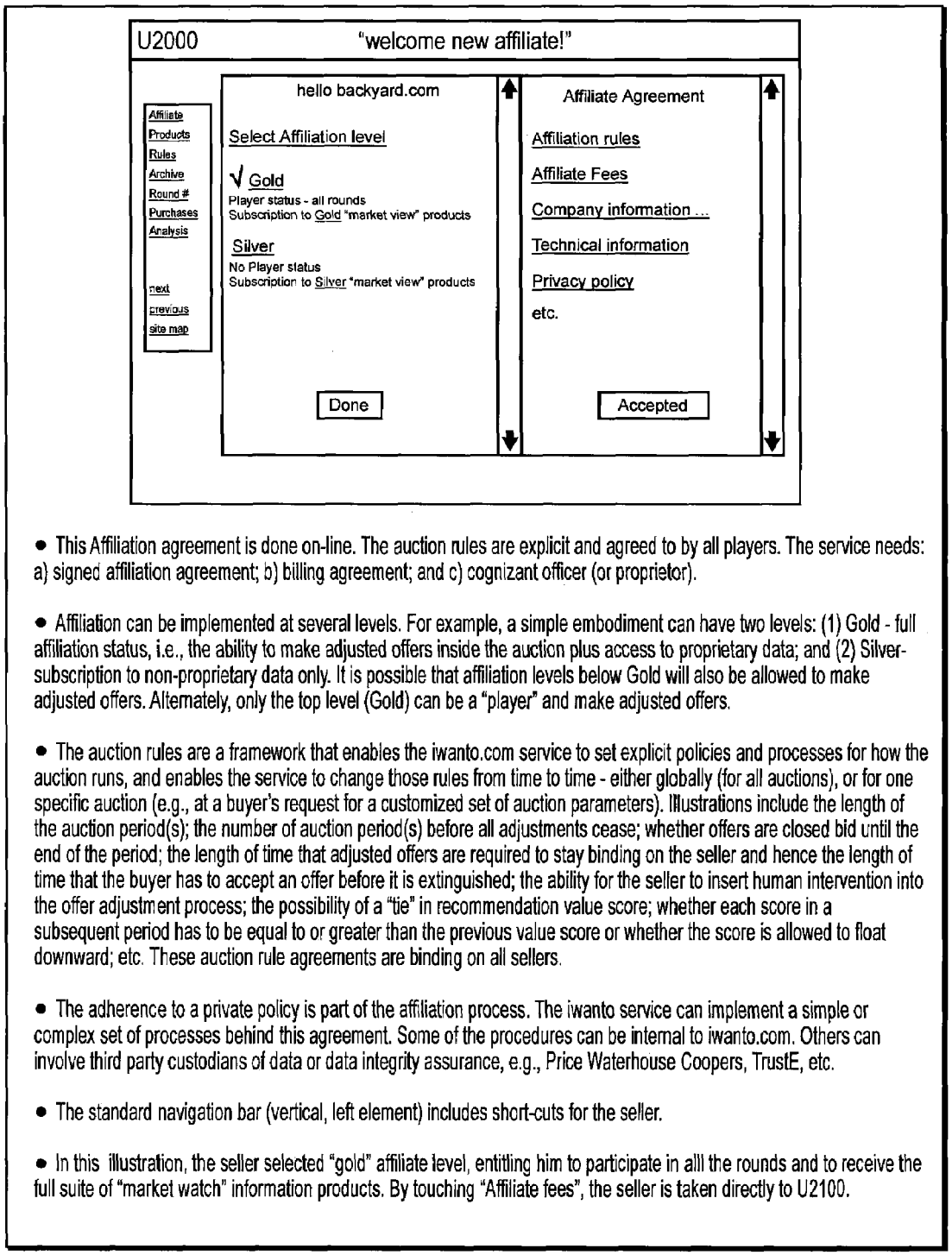

- This Affiliation agreement is done on-line. The auction rules are explicit and agreed to by all players. The service needs: a) signed affiliation agreement; b) billing agreement; and c) cognizant officer (or proprietor).

- Affiliation can be implemented at several levels. For example, a simple embodiment can have two levels: (1) Gold - full affiliation status, i.e., the ability to make adjusted offers inside the auction plus access to proprietary data; and (2) Silver- subscription to non-proprietary data only. It is possible that affiliation levels below Gold will also be allowed to make adjusted offers. Alternately, only the top level (Gold) can be a "player" and make adjusted offers.

- The auction rules are a framework that enables the iwanto.com service to set explicit policies and processes for how the auction runs, and enables the service to change those rules from time to time - either globally (for all auctions), or for one specific auction (e.g., at a buyer's request for a customized set of auction parameters). Illustrations include the length of the auction period(s); the number of auction period(s) before all adjustments cease; whether offers are closed bid until the end of the period; the length of time that adjusted offers are required to stay binding on the seller and hence the length of time that the buyer has to accept an offer before it is extinguished; the ability for the seller to insert human intervention into the offer adjustment process; the possibility of a "tie" in recommendation value score; whether each score in a subsequent period has to be equal to or greater than the previous value score or whether the score is allowed to float downward; etc. These auction rule agreements are binding on all sellers.

- The adherence to a private policy is part of the affiliation process. The iwanto service can implement a simple or complex set of processes behind this agreement. Some of the procedures can be internal to iwanto.com. Others can involve third party custodians of data or data integrity assurance, e.g., Price Waterhouse Coopers, TrustE, etc.

- The standard navigation bar (vertical, left element) includes short-cuts for the seller.

- In this illustration, the seller selected "gold" affiliate level, entitling him to participate in alll the rounds and to receive the full suite of "market watch" information products. By touching "Affiliate fees", the seller is taken directly to U2100.

FIG. 50

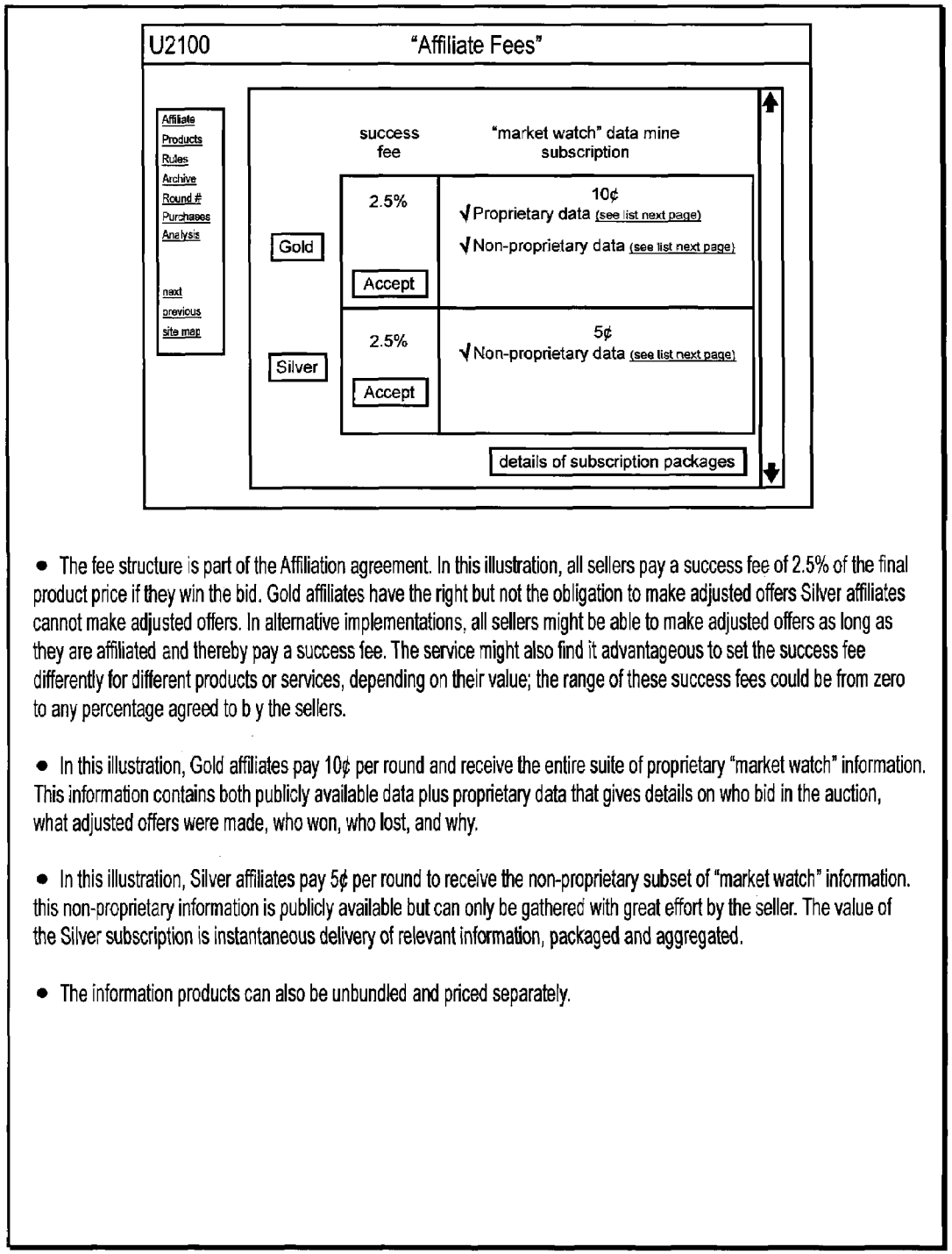

- The fee structure is part of the Affiliation agreement. In this illustration, all sellers pay a success fee of 2.5% of the final product price if they win the bid. Gold affiliates have the right but not the obligation to make adjusted offers Silver affiliates cannot make adjusted offers. In alternative implementations, all sellers might be able to make adjusted offers as long as they are affiliated and thereby pay a success fee. The service might also find it advantageous to set the success fee differently for different products or services, depending on their value; the range of these success fees could be from zero to any percentage agreed to b y the sellers.

- In this illustration, Gold affiliates pay 10¢ per round and receive the entire suite of proprietary "market watch" information. This information contains both publicly available data plus proprietary data that gives details on who bid in the auction, what adjusted offers were made, who won, who lost, and why.

- In this illustration, Silver affiliates pay 5¢ per round to receive the non-proprietary subset of "market watch" information. this non-proprietary information is publicly available but can only be gathered with great effort by the seller. The value of the Silver subscription is instantaneous delivery of relevant information, packaged and aggregated.

- The information products can also be unbundled and priced separately.

FIG. 51

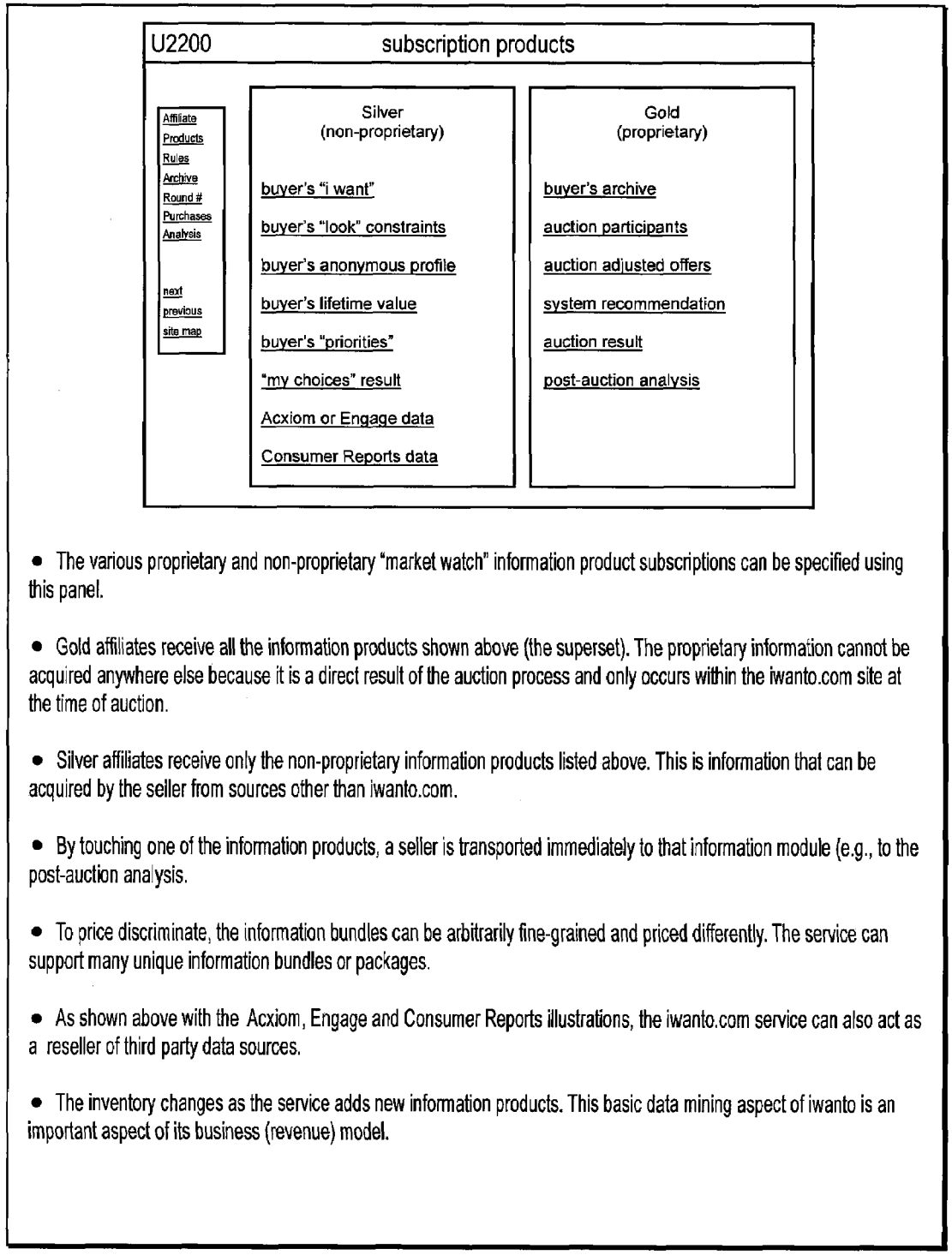

- The various proprietary and non-proprietary "market watch" information product subscriptions can be specified using this panel.

- Gold affiliates receive all the information products shown above (the superset). The proprietary information cannot be acquired anywhere else because it is a direct result of the auction process and only occurs within the iwanto.com site at the time of auction.

- Silver affiliates receive only the non-proprietary information products listed above. This is information that can be acquired by the seller from sources other than iwanto.com.

- By touching one of the information products, a seller is transported immediately to that information module (e.g., to the post-auction analysis.

- To price discriminate, the information bundles can be arbitrarily fine-grained and priced differently. The service can support many unique information bundles or packages.

- As shown above with the Acxiom, Engage and Consumer Reports illustrations, the iwanto.com service can also act as a reseller of third party data sources.

- The inventory changes as the service adds new information products. This basic data mining aspect of iwanto is an important aspect of its business (revenue) model.

FIG. 52

| U2300 | seller's business rules | | |
|---|---|---|---|
| | | max adjustment | match or beat |
| Affiliate | Price | 10% | bbq.com |
| Products | Standard shipping & handling | | e-home |
| Rules | 1 day | 5% | |
| Archive | 3 day | 10% | |
| Round # | 5 day | 20% | |
| Purchases | Tax | 0% | |
| Analysis | Warranty | | |
| | Extended warranty (time) | 50% | bbq.com |
| | Extended warranty (cost) | 33% | bbq.com |
| next | Financing | | |
| previous | Months before payment | 80% | e-home |
| site map | Interest rates | 40% | e-home |
| | Rewards program points | 200% | bbq.com |

| global setting | for this round only | use auto-recommendation |
|---|---|---|

- One of the first actions of a Gold (or offer-adjusting) affiliate is to set his business rules. Both affiliated and unaffiliated seller's business rules are set to zero at the beginning. By giving all sellers a simple business rules template pre-set to zero, the iwanto service can incorporate all of them into the action adjustment process without waiting for a positive (i.e., non-zero) setting. In the degenerate case, the seller's posted offer will equal his adjusted offer, and both would be deemed "best and final" and so marked ion the user interface. The seller can set his rules in numerous ways, including, without limitation: a) via a global setting - set once for all rounds, irrespective of the buyer's profile; b) for this round only - upon seller's analysis of the buyer and the market; or c) by using auto-recommendation - the iwanto recommender engine can supply a default set of business rules that will match or beat the competition and get the deal. Most sellers (small businesses) can set their business rules by using the template bot supplied by iwanto.com. The business rules template illustrated above presents a simple model to the seller. The simple business rules client will be posted in source code form on the web. Sellers can use and modify the code for free. Sophisticated sellers can drive this template using their own proprietary business rules model. Their confidential business information drives the rules, e.g., competitive data, current cost of capital, inventory levels etc. More sophisticated sellers can drive the iwanto.com template bot via their own proprietary business rules engines. The preferred embodiment accommodates external "drivers" of the many popular business rules engines, e.g., as provided by Oracle, Sybase, SAP, PeopleSoft etc. As the business-to-business (B2B) industry develops new business rule drivers, the iwanto.com platform can accommodate them via APIs supplied by the vendor. The seller can set his business rules numerically (as shown) or by attaching each parameter to a named competitor. This creates a dynamic where certain sellers become price leaders (setters) or terms-of-offer setters. It allows companies to compete with each other with pinpoint accuracy.

- The business rules template is a framework that is extensible. New categories of seller's rules can be added to the template either by the iwanto.com service (open) or suggested by the sellers. For the business rules template to have beneficial effect, there needs to be agreement between the seller, the buyer and the iwanto service about the template elements. Hence, to ensure consistency, the iwanto service can act as custodian of the business rules templates semantics, e.g., the meaning of the term "extended warranty" or "zero-payment period". As other entities - e.g., Ariba, Commerce One - create standards for business-to-business (B2B) commerce, iwanto.com can readily adapt them into this framework.

FIG. 53

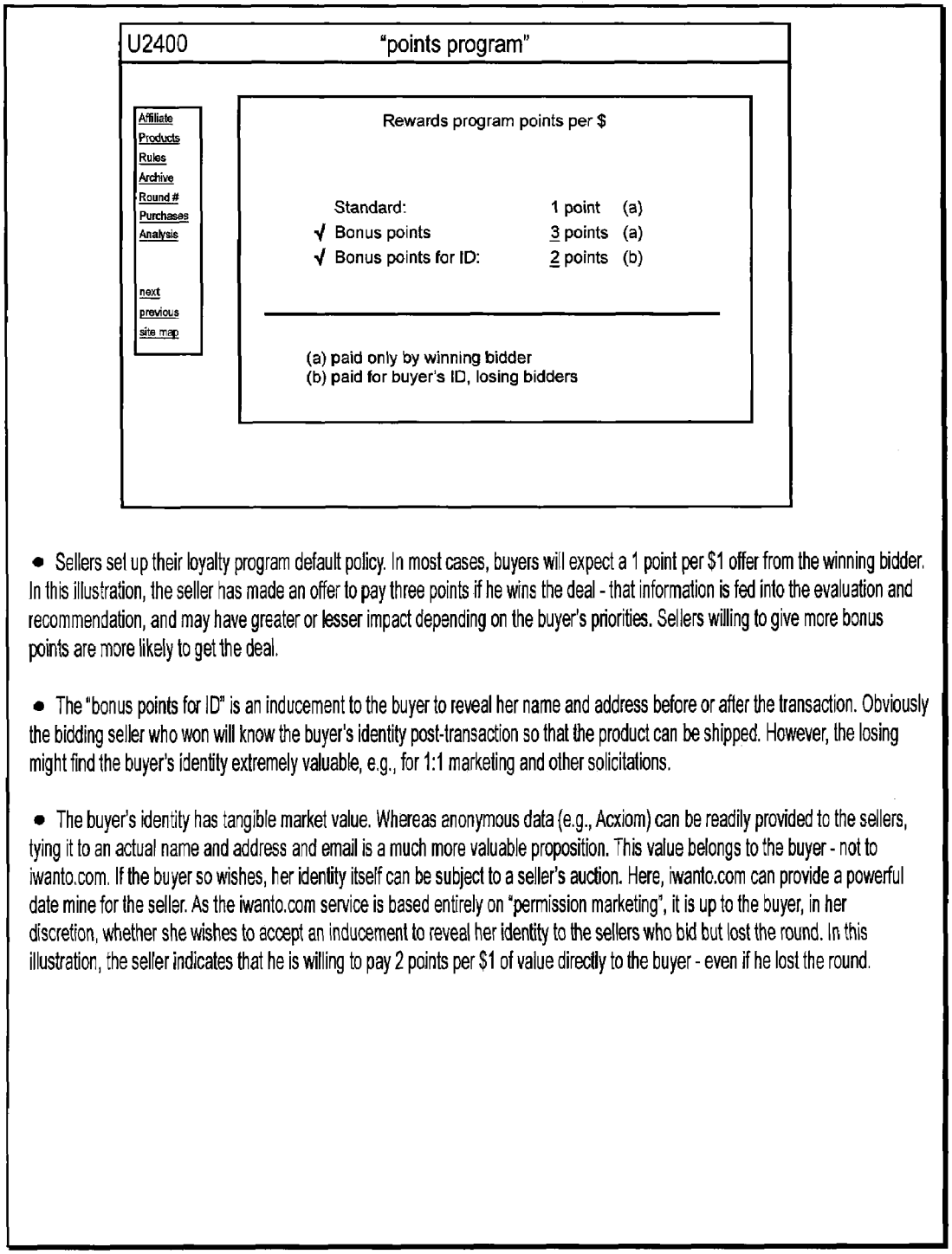

- Sellers set up their loyalty program default policy. In most cases, buyers will expect a 1 point per $1 offer from the winning bidder. In this illustration, the seller has made an offer to pay three points if he wins the deal - that information is fed into the evaluation and recommendation, and may have greater or lesser impact depending on the buyer's priorities. Sellers willing to give more bonus points are more likely to get the deal.

- The "bonus points for ID" is an inducement to the buyer to reveal her name and address before or after the transaction. Obviously the bidding seller who won will know the buyer's identity post-transaction so that the product can be shipped. However, the losing might find the buyer's identity extremely valuable, e.g., for 1:1 marketing and other solicitations.

- The buyer's identity has tangible market value. Whereas anonymous data (e.g., Acxiom) can be readily provided to the sellers, tying it to an actual name and address and email is a much more valuable proposition. This value belongs to the buyer - not to iwanto.com. If the buyer so wishes, her identity itself can be subject to a seller's auction. Here, iwanto.com can provide a powerful date mine for the seller. As the iwanto.com service is based entirely on "permission marketing", it is up to the buyer, in her discretion, whether she wishes to accept an inducement to reveal her identity to the sellers who bid but lost the round. In this illustration, the seller indicates that he is willing to pay 2 points per $1 of value directly to the buyer - even if he lost the round.

FIG. 54

- All the information necessary to conduct an auction is inside the iwanto.com servers in the form of a database. However, if the seller wishes to see reports of what is going on in each round (in real time or historical archive), a report is generated. The illustration above shows that the seller sees the buyer's RFO (request for an offer); the "look" constrained search delimiters; and the buyer's utility function (priorities). The buyer's identity is not revealed - she is anonymous.

- The seller can manipulate the "my priorities" data using their own models of buyer behavior and market segmentation.

FIG. 55

| U2100 | "Affiliate Fees" | | |
|---|---|---|---|
| Affiliate<br>Products<br>Rules<br>Archive<br>Round #<br>Purchases<br>Analysis<br><br>next<br>previous<br>site map | buyer value<br><br>Last 90 days $0<br>Last 180 days $580<br>Last 1 year $1,145<br>Last 3 years $21,490<br>Lifetime value $145,977 | anonymous profile<br>gender           F<br>age              35<br>marital          married<br>income           $68K<br>home             Condo<br>children         1<br>auto             96 Audi<br>credit rating    AAA<br>education        16 yrs<br>zip code         94022<br>Tel. prefix      650-917<br>ISP              AOL<br>credit card      MC, Visa | archive<br>Woman's skis, shape style ...<br>Mortgage refi $180,000 ...<br>B&B in Vail ...<br>Fragrance ...<br>Epson printer supplies ...<br>Mexico cruise<br>Book<br>CD<br>Book<br>Flowers<br>Auto financing |

Legal notice: this strictly confidential information is provided by buyer exclusively for use in this market Round. Redistribution or other use is prohibited. Violation of the Affiliate agreement is punishable by a fine.

- Depending on the type of affiliation and the buyer's permission, the seller can see the Buyer's anonymous profile and history. Other data provided to the Gold affiliate seller can include historical and future value of the customer, anonymous demographic data; and an archival history of "iwanto" inquiries. This data mine should increase the seller's chances of winning the business with an optimal offer.

FIG. 56

| U3200 | "my choices" result | | | |
|---|---|---|---|---|
| | | | | Round 173444 |
| Affiliate<br>Products<br>Rules<br>Archive<br>Round #<br>Purchases<br>Analysis<br><br>next<br>previous<br>site map | 1. bbq.com [chat]<br><br>Closeouts, over-stocks, many items from around the world | Weber Genesis 1000<br>Many extras. Fully loaded.<br>Needs some assembly.<br><br>$254<br>MSRP $319 | pocket thumbnail | 12 day delivery<br>$30 S&H<br>No financing<br>90 day Warranty<br>buy 2, 30% off |
| | 2. e-home.com [chat]<br><br>We stock 4,800 models for men & women from 120 companies ... | Ducane 1504SHLPE<br>Full featured BBQ.<br><br>$454<br>MSRP $684 | pocket thumbnail | 5 day delivery<br>$40 S&H<br>pay in 6 installments<br>12.8% interest<br>1 yr. warranty |
| | 3. backyard.com [chat]<br><br>The largest wholesaller of toys. We specialize in imports from ... | Sunbeam Grillmaster HG850C<br>Everything included for grilling and roasting, fish, chicken, steaks.<br><br>$388<br>MSRP $624 | pocket thumbnail | 3 day delivery<br>$58 S&H<br>pay in 3 installments<br>12% interest<br>2 year warranty |

- The seller sees the result of "my choices". Here is a case where the seller can laboriously search the web for posted offers and discover the same information as presented above. The iwanto.com service value add is to package the correct information at the right time (pre-auction) in the proper form (electronic) such that the seller's bot can take action on it and make an adjusted offer.

FIG. 57

| U3400 | "adjusted offer" auction results | | | |
|---|---|---|---|---|
| 0:59 | These adjusted offers are "best and final". All adjusted offers expire in 48 hours - Wednesday November 25th, 10:30pm EST | | | Round 173444 |

| | original offers | | | adjusted offers | |
|---|---|---|---|---|---|
| Affiliate<br>Products<br>Rules<br>Archive<br>Round #<br>Purchases<br>Analysis<br><br>next<br>previous<br>site map | 1. backyard.com<br>Sunbeam Grillmaster<br>HG850C<br>Everything included for grilling and roasting, fish, chicken, steaks. | 3 day delivery<br>$58 S&H<br>pay in 3 installments<br>12% interest<br>2 year warranty<br>$388<br>MSRP $624 | buy me!<br>talk to a rep | $395<br>3 day delivery<br>$58 S&H<br>pay in 6 installments<br>no interest till 1/2000<br>2 year warranty<br>• triple air miles | 96 |
| | 2. bbq.com<br>Weber Genesis 1000<br>Many extras. Fully... loaded. Needs some assembly. | 12 day delivery<br>$30 S&H<br>No financing<br>90 day Warranty<br>buy 2, 30% off<br>$254<br>MSRP $319 | buy me! | $264<br>• 3 day delivery<br>$40 S&H<br>pay in 6 installments<br>12.8% interest<br>2 year warranty | 90 |
| | 3. e-home.com<br>Ducane 1504SHLPE<br>Full featured BBQ. | 5 day delivery<br>$40 S&H<br>pay in 6 installments<br>12.8% interest<br>1 yr.. warranty<br>$454<br>MSRP $684 | buy me!<br>talk to a rep | $395<br>3 day delivery<br>$40 S&H<br>No financing<br>120 day warranty<br>Buy 2, 30% off | 87 |

FIG. 58

| U3500 | transaction | |
|---|---|---|
| | | Round 173444 |

Affiliate
Products
Rules
Archive
Round #
Purchases
Analysis next
previous
site map ship to:

customer #7,287,932
unchanged billing information
unchanged shipping information
unchanged

| Seller | backyard.com |
|---|---|
| Round | 17344 |
| Product | Sunbeam Grillmaster HG850C |
| Price | $388 |
| Delivery | 3 days |
| S&H | $58 |
| Financing | pay in 6 installments |
| | no interest till 1/2000 |
| | 12.8% interest |
| Extended warranty | 2 years |
| Air miles | 3X | purchased at 1425 PDT
funds transfer tonight

- The seller's affiliation agreement states whether the buyer can do the transaction in situ, or whether the buyer is required to come to the seller's site. The advantages to the buyer of staying in situ are: a) the buyer can stay within one unified environment without going through the resistance barrier of suddenly being in a different environment, with a different UI and additional hurdles such as a re-registration burden; b) the iwanto.com service can aggregate loyalty program points across a number of re-sellers; and c) all the data generated by the transaction are integrated into the concierge for archival uses without any additional effort by the buyer.

- The advantages to the buyer of going to the seller's site are: a) trust (e.g., if a strong brand like Amazon); b) familiarity; and c) integration into the seller's loyalty program.

- In this case, the buyer decided to stay inside iwanto.com service. She approved identifying her by name and address in exchange for air mile points. All the credit card transactions flow directly from iwanto.com's accounts via EFTS into backyard.com's account.

FIG. 59

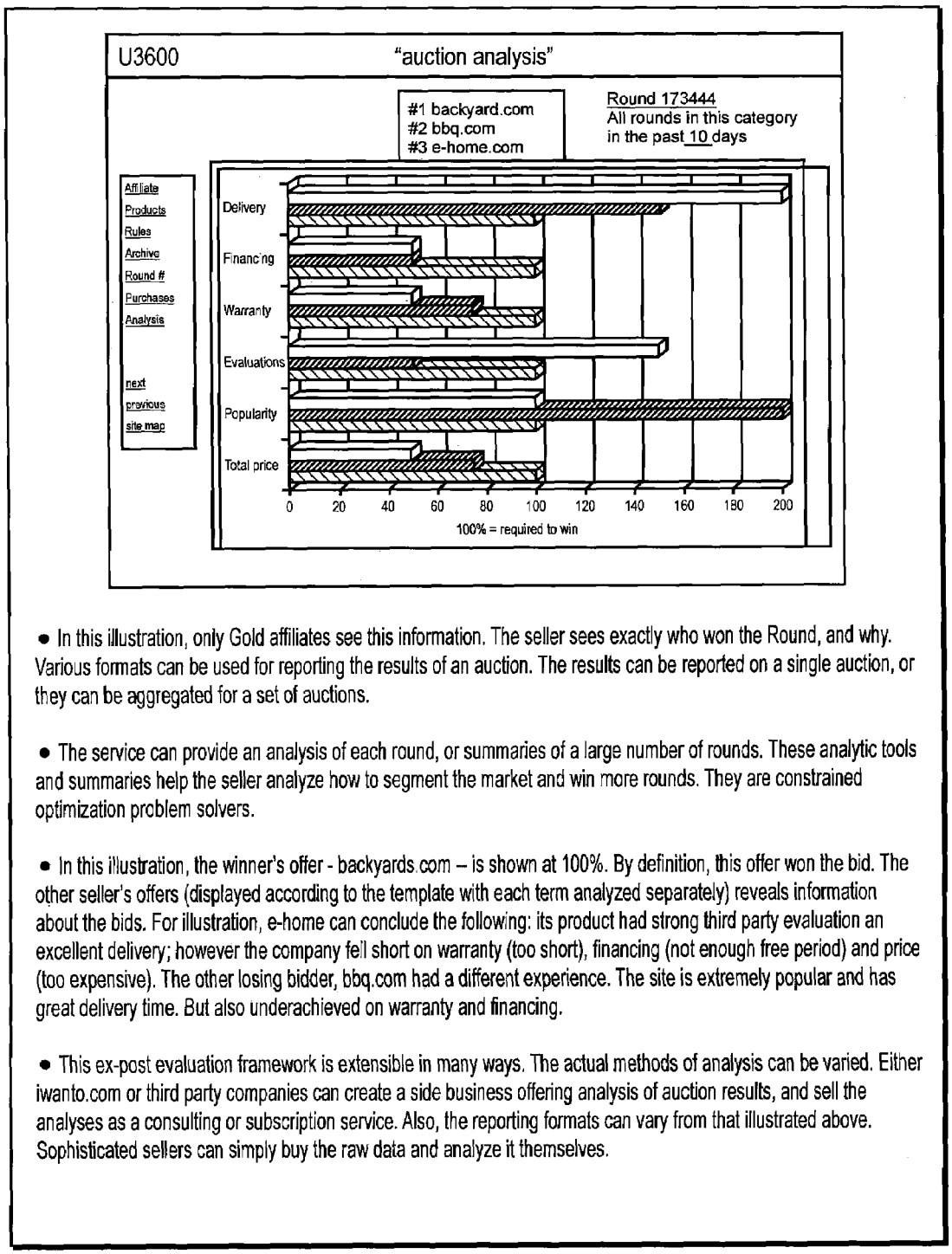

- In this illustration, only Gold affiliates see this information. The seller sees exactly who won the Round, and why. Various formats can be used for reporting the results of an auction. The results can be reported on a single auction, or they can be aggregated for a set of auctions.

- The service can provide an analysis of each round, or summaries of a large number of rounds. These analytic tools and summaries help the seller analyze how to segment the market and win more rounds. They are constrained optimization problem solvers.

- In this illustration, the winner's offer - backyards.com – is shown at 100%. By definition, this offer won the bid. The other seller's offers (displayed according to the template with each term analyzed separately) reveals information about the bids. For illustration, e-home can conclude the following: its product had strong third party evaluation an excellent delivery; however the company fell short on warranty (too short), financing (not enough free period) and price (too expensive). The other losing bidder, bbq.com had a different experience. The site is extremely popular and has great delivery time. But also underachieved on warranty and financing.

- This ex-post evaluation framework is extensible in many ways. The actual methods of analysis can be varied. Either iwanto.com or third party companies can create a side business offering analysis of auction results, and sell the analyses as a consulting or subscription service. Also, the reporting formats can vary from that illustrated above. Sophisticated sellers can simply buy the raw data and analyze it themselves.

FIG. 60

METHOD, SYSTEM AND BUSINESS MODEL FOR A BUYER'S AUCTION WITH NEAR PERFECT INFORMATION USING THE INTERNET

FIELD OF THE INVENTION

The present invention relates to creating a buyer's auction with near-perfect information on the World Wide Web. More particularly, the present invention is directed to: (1) a single buyer-multiple seller electronic auction methodology in which multi-attribute adjustments to buyer requests or seller offers are made in real time in response to near-perfect information for both the buyer and the sellers; (2) a comprehensive, unified system that minimizes the entire chain of transaction costs from first desire to buy, through education, search, bargaining, and finally to the sale itself; and (3) a business model to produce and sell near-perfect proprietary information about the buyer and the sellers that derives directly and exclusively from the auction process. The total effect is to produce near-perfect, frictionless, competitive markets.

BACKGROUND OF THE INVENTION

I. Introduction

Traditional markets are burdened by many forms of inefficiency, which can be classified into two broad categories. The first category consists of the costs incurred before and during a transaction. This includes the resources spent learning about products, finding trading partners, negotiating terms, and consummating the transaction. Also included in this first category of costs is the waste that results when the transaction that is consummated is not the one that creates the most value. The second category consists of costs incurred after the transaction is consummated, for example the costs of monitoring performance or renegotiating terms. This invention is primarily concerned with reducing costs in the first category to the maximum degree, thereby creating near perfect, frictionless markets.

The transaction costs incurred prior to and during the transaction can be further divided into five types, each corresponding to an information processing problem. This invention is focused specifically on attacking each of these costs.

First are the market intelligence costs. For buyers, gathering market intelligence means learning about the products that are available and doing research about product attributes. For sellers, market intelligence consists of information about what offerings consumers are likely to demand and about what potential competitors are offering.

Second are the search costs. Buyers would like to identify all the sellers who can potentially meet their needs, while sellers would like to reach all the buyers whose demands they can potentially meet.

Third are the bargaining costs. The particular buyer and seller involved in each transaction must exchange enough information to be able to structure a personalized, customized deal that creates maximum value for themselves.

Fourth are the sellers' transaction execution costs. An ideal mechanism would reduce these costs, allowing the savings to be either appropriated by the seller, or shared with the buyer, or with a broker-agent (also called an "infomediary" in the modern e-commerce context).

Fifth are the buyer's integration costs. The problem of integrating information from disparate and disconnected sources may itself discourage buyers and sellers from becoming perfectly informed.

When all these costs are almost zero, it is said that there is near-perfect information.

In the past, markets with near-perfect information have been possible in only very limited settings outside of economics laboratories. For most consumer items, in particular, the cost of near-perfect information has been too high relative to its value to make its achievement worthwhile. The result in traditional markets has been a loss of value to both buyers, who fail to find their most preferred goods, and sellers, who lose customers they might otherwise have acquired.

However, with the advent of the Internet, the falling costs of finding, communicating, transferring and storing information is beginning to change markets dramatically. The Internet has enabled buyers and sellers to meet and transact trade in "virtual" markets. Internet-based ventures are taking advantage of the falling cost of communication to create new markets of increasing scope and scale that would have been unimaginable before the advent of the World Wide Web in the mid-1990s. For example, traditional auction markets have been adapted to the web. Familiar auction types, such as Yankee auctions and Dutch auctions, have been implemented effectively by the web-based auction houses (e.g., eBay, Onsale). The once-local classified ad and garage sale are going virtual and global. The very concept of "fixed prices" is under attack, as prices become fluid in the electronic auction environment.

Some economists and even the Chairman of the Federal Reserve Board in 1999, Alan Greenspan, have argued that this reduction in market friction can be directly translated into the high productivity and low inflation characterizing today's economy.

Even though virtual markets are more efficient than traditional markets, they have still not evolved to the point where they can deliver results that even approach the perfect information ideal. Most e-commerce today is still based on the traditional merchant model in which sellers post fixed offers and buyers visit the sellers searching for the right product. Buyers visit one or more of these sellers to identify who can supply the needed good or service. Although successful e-commerce companies (e.g., Amazon) have emerged using this traditional posted offer, seller-centric business model, the model does not drive any of the relevant information costs to near-zero.

More modern forms of markets that are more buyer-centric have also been emerging. For example, the web has allowed broader application of buyer-initiated requests that had previously been restricted to industrial requests-for-proposals (RFPs) and requests-for-quotes (RFQs). In the mass market space, RFPs and RFQs were found only in select industries such as construction. Consumers can now ask for and receive offers for a broad variety of commodities such as airline tickets (Travelocity), mortgages (e-loan), insurance (Intuit), automobiles (autobytel) and even house cleaning services (Imandi).

On the web today, independent and non-integrated solutions are being attempted to address the costs associated with market intelligence (e.g., consumer information, communities), search (directories and guides) and bargaining (auctions). However, if buyers and sellers have to visit a large number of web sites to accomplish their desired task of consummating a purchase optimized to their needs, the problem remains unsolved—the parties must still search for and integrate diverse resources. This takes time and energy, posing another barrier to efficient transactions. A complete solution should entail not only separate solutions to minimizing costs, it should also integrate those solutions within a fast, unified, easily navigated environment.

A final problem for the perfection of markets is the creation of a business model to gather and sell information. One limit to acquiring information in a bargaining situation is that the parties may want to distort their apparent preferences to improve their bargaining positions. For example, a buyer may want the seller to believe that it will not buy unless a price is significantly reduced. Two difficulties in selling information are that buyers of information may be suspicious because the quality of information cannot be verified before the information is transferred; and that it is difficult to prevent highly valued information from being resold. In current practice, it is unusual for retail consumers to pay large sums to acquire market intelligence. Often, they expect sellers to make such information available for free.

The present invention provides a complete solution to minimizing the above types of transaction costs; unifying the buyer's experience; and creating a revenue model for the market information that both emerges from and drives the solution.

II. The Problems to be Solved

Summarizing the foregoing discussion, today's web-based electronic commerce market contains two related problems to be solved.

First, there is the problem of minimizing five types of transaction costs market intelligence cost, search cost, bargaining cost, sellers' transaction execution cost and buyer's integration cost. The goal is to reduce all five costs to near zero.

Second, there is the problem of constructing a business model that creates a sustainable revenue source to support the solution to the first problem.

(Note: Hereafter, female pronouns are used for the buyer and male pronouns for the seller.)

A. Market Intelligence Cost

Before a buyer converts latent demand into a purchase, she may undergo a process of research and education about her needs. Eventually, the relevant decision criteria are settled and the buyer is ready to move ahead. The buyer develops a mental template that identifies the most important benefits and features (and those to avoid). The template is continuously refined through both casual and purposeful research until it stabilizes.

In economic terms, the buyer invests time and energy to create a template of decision variables that describe an optimal product that matches her goals (utility function). The sellers invests time, energy and money looking for buyers that best match their business goals (production function). The investment by buyers and sellers can be high.

Despite the high value of research to buyers, Internet economics have valued research at close to zero. Even in markets such as stock trading, where presumably the value of knowledge and information is high, most firms find that they cannot successfully charge for information products. The exception is in highly specialized professions, such as journalism, medicine, law and engineering—but it is a rare phenomenon in the mass consumer market. Hence, individual buyers are left to their own random devices to gather the information necessary to make a decision. The result is usually wasted time, fatigue, confusion, and frustration—which can cause the buyer to stop learning.

For sellers, besides learning about the buyer, they must learn enough about one another's offers to be able to match or beat their competitors. Moreover, that information must be available early enough in the process for competitors to act upon it, tailoring offers to the individual buyer in full knowledge of the competition.

There are adverse systemic effects if the sellers do not know what offers their competitors are making or which competitors are being evaluated. A seller who thinks that he may be facing no competition or only weak competition will not be likely to offer the most favorable prices and terms to the buyer. Perfect information will motivate sellers to bid aggressively and buyers to collect multiple offers, provided the search and bargaining costs of doing so are sufficiently low.

B. Search Cost

Once the education phase is concluded and the buyer has developed a mental template, a search commences that leads to a transaction.

For buyers, search costs arise primarily from the time it takes to search through a bewildering array of commercial sites on the web for the best possible deal. Evaluating a deal accurately involves accounting for differences in all the terms, including, without limitation, the price, product features, brand, delivery time, warranties, shipping costs, financing, and seller reputation. For sellers, search costs include marketing expenses, advertising, direct sales force salaries, and, in general, any costs associated with learning about customer needs.

Today, a buyer cannot perform a comprehensive search for relevant information about the spectrum of seller offers because there are far too many electronic merchants. Thus, a buyer will typically visit only a handful of commercial sites before accepting a (possibly) sub-optimal offer because she lacks the time to gather information about better offers.

The problems with search costs are especially acute for a buyer who is concerned about more than just price. Each seller that this buyer finds may offer a different array of options (e.g., product features, warranty, financing terms, delivery time, and shipping and handling costs) that require time-consuming evaluation and comparison by the buyer. Because more time must be spent analyzing each individual offer, this buyer will restrict her attention to even fewer sellers and remain ignorant of other, possibly better, offers.

Similarly, a seller may not attract all the buyers he could serve. For instance, a seller that emphasizes one product or service feature in advertising (because marketing data indicate that a majority of buyers value that feature) may fail to reach a substantial minority of customers that place a higher value on unadvertised aspects of the product or service. It may also happen that the buyer is unaware that the advertised product is a close substitute for the product specified in the buyer's search.

High buyer search costs not only result in high direct costs to buyers, they can also have harmful systemic consequences. To the extent that high search costs keep buyers poorly informed about potential sellers, inefficient sellers with relatively poor products and high prices are more likely to survive in the marketplace. At the same time, relatively efficient firms will have more trouble attracting customers and will be slower to grow. In the language of economics, this means that seller entry and exit decisions will be inefficient.

As a further result, even a buyer who finds searching relatively painless will have greater difficulty finding the best deal in a sea of inferior deals, which discourages buyers from searching. Reduced buyer search activity, in turn, contributes to pricing inefficiency by sellers. Sellers that know that most buyers do not have time to search for the best deals are likely to set higher prices for all buyers, because they cannot tell the well-informed and poorly informed buyers apart.

Looking to the future, the problems associated with high search costs will only increase as the scope and diversity of electronic commerce continue to expand. Because markets function best when information is near perfect, there is tremendous economic and social value to be added by an invention that drastically reduces these costs in electronic commerce.

C. Bargaining Cost

Even if buyers and sellers were able to identify the right partners at zero cost, they would still face the bargaining cost of adjusting the initially offered terms to serve the parties' mutual interests. For optimal bargaining, both the buyer's priorities and the sellers' costs and business objectives must be taken into account, which requires some mechanism for the relevant transaction information to be communicated to each party and some mechanism for dynamic adjustments by buyers and sellers based on this information. Today, however, there is no practical way for sellers to adjust their offers quickly and cheaply to each buyer in response to information they have received about that particular buyer's goals, their competition for that buyer, or their own changing business rules. Similarly, there is no quick and easy way for a buyer to communicate to sellers changes in her spectrum of buying criteria for a particular good or service.

As a result, a seller today can make mistakes because he does not know the buying behavior of a particular buyer, the buyer's purchasing criteria for a particular purchase, or who his competitors are for a particular buyer. For example, a seller may lose a much-wanted sale because he did not adjust his offer to meet a particular buyer's needs (because the seller did not know the particular needs of the particular buyer) or the seller may sell for too low a price because he did not know the offers being made by his competitors.

There is one exception to this generally negative scenario in present electronic markets: sellers learn some of the characteristics of repeat buyers. Even so, a buyer who wishes to preserve her anonymity cannot communicate her particular desires to a large number of merchants in order to fine tune the bargain. As a result, a buyer may become locked in to the sellers that know her and pay too much or settle for a less than ideal product or service because other sellers have such imperfect information.

Today, sellers often lack relevant information about particular buyers because the existing mechanisms to provide such information are too costly, too slow, and too cumbersome to be effective. Yet this information has considerable value to a seller trying to optimize his offers. Seller decisions based on direct knowledge of a buyer's needs are superior to those that rely on statistical estimates and conjectures derived from aggregate marketing data. A well-informed seller could tailor his decisions to each particular customer if he knew which features that customer valued.

To eliminate bargaining costs, there need to be mechanisms that enable each seller to fine-tune his offer to each buyer in multiple dimensions (including price, product features, warranty, financing terms, delivery time, and shipping and handling). Properly implemented, the mechanism could further reduce costs by making suggestions to sellers about substitute, alternative, or complementary products that closely track the buyer's preferences. However, if implemented by individual sellers—each in his own way—the very richness of the seller's response could also increase buyer search costs by forcing buyers to spend more time identifying the best deal at each seller's site. Thus, there is a need for integrated systems and methods that encompass relevant sellers to reduce both search costs and bargaining costs simultaneously.

Besides the mistakes made in individual transactions, a seller's imperfect information about his customers can lead to other mistakes as well. The seller who never learns why he has lost a sale may fail to adjust his future offerings accordingly. In addition, a seller that has the potential to succeed in a market may fail to get the information he needs to learn to be successful, thereby leading that seller to make an incorrect decision to leave to the market.

From the viewpoint of overall social welfare, these seller mistakes are costly. Sellers who can most efficiently produce an offer in exactly the dimensions desired by the buyer should get the business, because they maximize the buyer's satisfaction while economizing on society's limited resources. In a perfect market, the efficient sellers with respect to the specific buyer at hand get her business, which is part of what makes perfect markets so desirable.

D. Sellers' Transaction Execution Cost

Electronic commerce had as it roots the Electronic Data Interchange initiative, which was largely developed and promoted in the 1980s. EDI is an expensive and cumbersome system of agreements between merchants to standardize the way they communicate with each other across organizational boundaries.

The World Wide Web has significantly streamlined and improved on EDI. Seller-oriented initiatives such as Extended Markup Language (XML) are unifying the exchange of electronic information between businesses. Without such standards, businesses would be unable to place purchase orders and fulfill them accurately.

On the web, because buyers and sellers can each be either individuals or businesses, an informationally perfect e-commerce environment needs to embrace both the business-to-consumer (B2C) and the business-to-business (B2B) standards.

E. Buyer's Integration Cost

When a buyer has to deal with multiple sites to consummate a transaction—each with its own user interface and methods—the experience can be tedious. A complete solution from the buyer's perspective should minimize all types of costs within one integrated environment, without the need to visit a number of different sites and to re-enter data at each new site. Today, however, a user who wishes to get market intelligence, conduct an exhaustive search, bargain to a successful outcome and effect a transaction would have to visit dozens, perhaps hundreds of web sites.

A common buyer response to this integration cost is to concede defeat at the outset and not shop aggressively. Recent studies indicate that nearly one third of all buyers who decide not to buy are deterred by the high cost of learning yet another user interface and entering more personal data.

Modern e-commerce sites offer convenient methods for executing transactions, e.g., Amazon's "one-click." The industry is beginning to develop standards to help minimize the overhead (time and energy) involved in consummating transactions.

Buyer-oriented initiatives such as Open Profiling Standards (OPS) and the E-Commerce Markup Language (ECML) are attempts to create an electronic wallet so that the buyer does not have to repeat tediously the entry of her name, address, credit card information and similar conventional data.

Despite these efforts, none of the prior solutions has attempted to fully integrate the entire process into one seamless experience. Instead, as described below, today's solutions remain fragmented.

III. The Limitations of Existing Solutions

There has been progress made with respect to some of the cost categories on a piecemeal basis, using a variety of different approaches, but none of the web sites that exist today makes a systematic and integrated attempt to eliminate or reduce all five kinds of costs (i.e., market intelligence, search, bargaining, sellers' transaction execution and buyer's integration costs).

A. Solutions that do not Create New Markets

1. Search Engines, Directories, Guides & Portals

One early attack on the problem of information costs was the search engine, which, as its name suggests, aims to reduce search costs. A search engine is a remotely accessible computer program that lets people do keyword searches for information on the Internet. For electronic commerce applications, typing a keyword or phrase that describes the desired good or service can launch a search. Search engines, however, have a number of shortcomings in providing a solution to the problems described above. In particular, buyers often find that the search results are not relevant, and visiting each web site suggested by a search engine can be a laborious and fruitless task. A search on AltaVista reveals that there are over 1,500 search engines in operation, ranging from the most comprehensive (AltaVista) to highly fragmented and specialized engines.

Several solutions have emerged to address the problem of low relevancy. Some search engines evolved into e-commerce search guides. There are hundreds of e-commerce guides on the web today. Some of these are general guides, but most specialize in a single area of e-commerce.

Guides and directories, such as LookSmart, GoTo.com, HotBot and Google, and meta-search engines that can search multiple search engines with one query, such as AskJeeves, are examples. These cover only a subset of the web and employ humans to physically check on an included web site to ensure its relevance and content. In principle, guides are distinguished from directories by their inclusion of additional editorial content, though the line between the two can be fuzzy.

The limitation of these sites as e-commerce entities is clear to any user: relevance and coverage remain unsolved problems. Usually, after the search is conducted, the user is essentially transported to another web site to do the shopping. Moreover, even if this problem were solved, these sites still deal only with a single cost category—search costs—and even this is only addressed in a partial way.

2. Electronic Superstores and Transaction Aggregators

The superstore phenomenon on the web is a natural extension of the real world parallels, e.g., WalMart, Macy's and Price Club. These retail entities aggregate products and services from a wide array of vendors and present them to buyers in a consistent environment, namely the store. Physical superstores reduce search costs and travel costs by providing a single place where a buyer can find much of what she wants in a single trip.

Similarly, numerous web-based superstores have emerged. Most superstores are little more than large aggregations of e-sellers. More modern superstores add value by creating a unified answer to a buyer's search—displaying results from a number of e-merchants in a consistent fashion.

In competition with the superstores, many search engines have evolved into portals, rich in content, organized like a communication or entertainment network. In most portals, humans maintain guides to the web, thereby increasing the relevance of search results obtained using those guides. The trend is for a portal to create a network of affiliated e-merchants and thereby begin to act as a transaction aggregator, which is just a variation of the superstore concept. E-commerce has become such a critical part of the portal business model that every major portal has developed its own shopping channel, e.g., AOL Shopping, Yahoo! Shopfind, Excite Shopping and AltaVista Shopping.

In the current design of all significant superstores, when a buyer runs a search, similar products from various e-sellers are listed in a coherent manner that promotes quick comparison—at least of price. However, to effect the transaction, a buyer is still handed off to an e-seller so integration costs remain high.

The portal-hosted shopping channels organize a relatively small group of sellers and are thus able to create a unified look-and-feel and allow comparison shopping within their limited universe. An important limitation to such sponsored sites is the buyer's awareness that only e-merchants in the superstore are affiliates of the host. This is similar to seeing a tourist guide in a hotel featuring the best restaurants in town, only to realize that those same restaurants paid to be featured. Another important limitation of these sites is that the price and other terms of the transaction are fixed. There is no tailoring of the transaction to meet the needs of an individual buyer, so bargaining costs remain high for the buyer.

3. Shopping Comparison Engines & Bots

Price comparison engines are limited because they only cover a small subset of the web.

Product and vendor searching is the stage of e-commerce where software agents have classically been deployed in retail electronic commerce. The goal is to find items that the user wants to buy. This involves identifying appropriate vendors, comparing their products, etc. Early search agents such as BargainFinder (from Andersen Consulting) looked for a specific product and compared vendors based on price alone. BargainBot and Fido extended this by allowing rough matches of the product name. In the future, comparisons will most likely be conducted based on user preferences defined on a larger set of features, including price, product attributes, delivery characteristics, details of financing offered, etc. Jango (from NetBot, bought by Excite) and AdHound already allow the user to specify the product by features, but they do not support tradeoffs among features. An example of such a tradeoff would be if a consumer could accept a longer delivery time for a lower price. Allowing the user to express tradeoffs enables the system to find the offerings that best suit the user's need. In other words, it allows the offerings to be ranked based on how desirable they are to the user. Furthermore, communicating this information on tradeoffs to the sellers allows them to redesign their offerings so as to create trades that are more desirable for both parties.

Shopping bots are a newer class of solutions that actually delegate the search and bargaining to a software process. A growing body of academic literature is focusing on e-commerce agents that can act autonomously on behalf of sellers and buyers. These software processes are not in common use because consumers are not yet willing to entrust their decisions to an automatic process.

In principle, shopping bots can reduce search costs, but they are of little use in reducing the costs in other categories. The buyer must still educate herself prior to giving instructions to the shopping bot. The bargaining costs in a negotiation between a buyer (bot) and a seller (bot) are high because the parties have incentives to misrepresent their true preferences in an attempt to get a better deal. In contrast, in a buyer's auction with near perfect information, the buyer has a strong incentive to reveal her desires accurately and the sellers are motivated to fulfill those desires as completely as possible in a cost-effective way. Finally, the integration costs for the buyer remain high because shopping bots only address a small piece of the overall problem.

B. Markets without Dynamic Offer Adjustments

According to neoclassical economic theory, it is possible in principle to create a perfect market even with simple posted prices, in which offers are not adjusted dynamically. In that theory, each seller simply posts a fixed price for every variety of every good that he offers. Then, if the prices are market-clearing ones, which means simply that supply equals demand for each good, the outcome is Pareto efficient. In this theory, nothing can be gained from the ability to adjust offers individually to each potential customer.

Neoclassical theory had its origins as a description of commodity markets. In those markets, the goods being traded were relatively few in number, so that the same good would be purchased by many buyers. In modern e-commerce, by contrast, it is entirely possible for each customer to buy a different good, distinguished by product features, warranty, delivery terms, date, location, and so on. Indeed, there are many possible specifications that will not be purchased by any customer. For such goods, it is prohibitively expensive to list all possible varieties and their prices in advance and there is no experience which permits the parties to know the market-clearing prices. These two facts greatly limit the practical usefulness of neoclassical markets without dynamic adjustments in an economy where flexible specialization in many firms can provide a wide variety of physical products on a wide variety of terms.

Within the category of markets without dynamic offer adjustments, one can distinguish four types, which are tabulated and discussed below.

TABLE 1

Markets Without Dynamic Offer Adjustments

|  | One Seller | Many Sellers |
|---|---|---|
| One Buyer | 1. Private sale without negotiation | 4. Fixed Price RFP/RFQ |
| Many Buyers | 2. Posted offers | 3. Matching services |

1. Private Sale without Negotiation (One Buyer, One Seller)

Private sales arise when the market intelligence and search costs are so large relative to the value of the transaction as to make information gathering and exchange uneconomic. In principle, they could also arise when there actually is only one potential buyer and seller and their identities are already known. Even in these situations, bargaining would normally ensue unless bargaining costs, too, are high. This unusual situation is one to which the present invention does not apply.

2. Posted Offers (Many Buyers, One Seller)

This is the most common form of an e-commerce market without dynamic offer adjustments. There are literally hundreds of thousands of e-commerce entities that serve as electronic intermediaries between buyer and seller. Their whole purpose for existing is to capture the value of reduced costs of running a market.

New types of electronic infomediaries also include virtual superstores and cybermalls. Electronic superstores typically specialize in just one product category, such as books, travel, or cars. Cybermalls serve as transaction aggregators that allow a buyer to interact with a number of primary providers of goods and services.

However, all of these electronic commerce web sites deal with only pieces of the problem. The e-commerce entities described in Table 1 all conduct business without dynamic offer adjustments. They cannot, even in principle, offer a comprehensive solution to eliminating search and bargaining costs and facilitating competitive intelligence, for several reasons.

First, prices and terms for goods and services at these sites are posted and fixed. This affords no opportunity for the parties to tailor an agreement that serves the mutual interests of the buyer and seller. Sellers cannot dynamically adjust their offers to match individual buyer needs. Bargaining costs thus remain undiminished.

Second, the selection is limited to the goods and services offered by the seller(s) at that portal, superstore, or cybermall. Buyers must still make decisions based on imperfect information, i.e., there may be another portal, superstore, or cybermall with a better total offer. There is no way for buyers to compare offers with differing terms across different commercial sites. As the number of these sites grows, the transaction costs will prohibit buyers from gathering all the relevant information about the sellers at each of these sites via existing search methods. Search costs thus remain too high and bargaining costs are not reduced.

Third, sellers are forced to make decisions based on imperfect information about the buyer and the competition, because these sites provide little or no information to the seller about the buyer's priorities or the seller's competition for a particular buyer at that instant in time. Competitive intelligence is not improved.

There are a number of existing mechanisms that sellers can use to gather information about their customers and their competition. These include hiring market research companies, subscribing to database publishers, using computer programs to monitor electronic markets, attending trade shows, and surveying their customers. These methods, however, are slow, expensive, and provide only aggregated information. They do not provide information about an individual buyer's goals or the seller's competition for a particular transaction. Thus, sellers today cannot dynamically adjust their offers for each buyer based on relevant trade information because there is no method available to gather this information in real time at low cost.

Market mechanisms based on fixed, posted prices are inherently limited in their ability to resolve the search, bargaining, and competitive intelligence problems. When offer adjustments are made at these sites, it is usually a global price change that applies to all customers. At present, these sites cannot tailor their offers to individual buyers because this would require using a direct sales force (i.e., human intervention), a method that is prohibitively expensive for most automated, web-based businesses.

3. Matching Services (Many Buyers, Many Sellers)

The classic rationale for monetizing a market (i.e., prices) is to reduce the cost of matching buyers and sellers. For markets that are inherently non-monetized, such as housing agencies, dating services and employment agencies, the role of an agent is critically important. The agent acts as infomediary.

Computers are particularly adept at matching. A computer can process an unlimited number of variables and find the best match for a specific individual. The rapid growth of web-based employment agencies shows that even for "high touch" services, the web is an effective tool for reducing the cost of matching. Current examples include successful web sites for jobs, dating services and apartment hunting. In the future, matching services will become even more specialized.

Although matching services do lower search costs, they do not address the other components of the problem. A person still has to educate herself about what type of match she is looking for, e.g., given the broad spectrum of possible jobs, which types of jobs is she interested in matching. Matching services do not provide any form of dynamic offer adjustment. They simply bring two individuals together. The rest is a one-on-one negotiation, so bargaining costs remain high. Integration costs also remain high because matching services only address one piece of the overall problem, i.e., search costs.

4. Fixed Price RFPs & RFQs (One Buyer, Many Sellers)

The oldest type of buyer's market is the Request for Proposal (RFP) or Request for Quote (RFQ) process, which predates the Internet. This process is used by large institutions such as government agencies and corporations that need to make high-value, complex purchases and can afford the transaction costs. Here, a large government or corporate buyer typically spends weeks or months developing a formal request for a proposal, which it then sends out to potential sellers. In many cases, the RFQ is only submitted to a carefully pre-qualified group of sellers. Interested sellers then spend weeks or months developing formal proposals, which are submitted to the buyer as sealed bids. The buyer then chooses the bid that most closely matches her needs. Needless to say, the RFP/RFQ process has very high transaction costs (both time and money) and often involves imperfect information between sellers (e.g., the sellers do not know each other's identities or bids).

The practical significance of the high transaction costs is reflected in the common auction features that aim to reduce these costs. One such feature is the pre-qualification and short-listing of bidders. Because preparing bids for an auction can be expensive, bidders want to be assured that they are not wasting their money preparing bids when they have no chance of winning. To the extent that evaluating bids is expensive, the buyer, too, may wish to limit bidders to those it believes can deliver on its promises.

Other features that signal high transactions costs are that the buyers in many auctions present detailed product specifications in advance or commit themselves to purchase from some bidder. These practices, too, help to protect the bidders from spending money on a fruitless cause. In the absence of significant transactions costs in the auction, one would never see pre-qualification of bidders, detailed prior specifications, or commitments by buyers.

Prior to the Internet, because of these high costs, RFPs and RFQs were primarily used for business-to-business trade. It was impractical for an individual buyer to issue personal RFPs or RFQs. The time and money that a buyer would spend contacting an indefinite number of potential sellers would far outweigh any benefit from doing so (e.g., getting better terms and conditions) for all but the largest purchases. The Internet, however, has enabled new types of buyer's markets in various industries. They all share common characteristics: the buyer creates a request by using a template provided by the infomediary or e-seller. The template is transmitted to the relevant e-sellers (unless the seller is the primary producer). The sellers respond to the buyer with a quotation. Often this process is conducted by humans and a negotiation follows in the traditional style.

There are many examples of consumer RFPs and RFQs conducted on the Internet, e.g., consumer RFQs for automobiles, air travel, mortgages and even household services. All of them have a fixed offer price—the consumer requests a quote, and the seller provides a posted offer.

These services are not designed to offer dynamic pricing. Hence, their central value is quickly matching buyers and sellers—a reduction in the search cost but not a reduction of bargaining cost. In addition, simple on-line RFPs and RFQs do not lower either market intelligence or integration costs. The buyer must educate herself beforehand and put the various pieces of the transaction together by herself.

C. Markets with Dynamic Offer Adjustments

To facilitate personalized, customized exchange, parties need to be able to adjust their offers dynamically. Auctions, which have existed for centuries, are the traditional market solution for creating dynamic offers. A series of electronic solutions—supporting either bargaining or auctions—has evolved to enable this type of market.

In contrast with the "posted price" web sites, an auction has no fixed posted offer (other than the reserve price). Sites that support dynamic offer adjustments can be divided into four main categories, discussed below. The present invention resides in one of the four spaces identified in the typology below—one buyer, many sellers (category number 4).

TABLE 2

Markets With Dynamic Offer Adjustments

|  | One Seller | Many Sellers |
| --- | --- | --- |
| One Buyer | 1. Negotiation classified ads | 4. Buyer's Auction includes the present invention |
| Many Buyers | 2. Seller's Auction e.g., traditional Yankee and Dutch auctions | 3. Exchange Auction e.g., stock & commodity trading |

1. Negotiation (One Buyer, One Seller)

This type of market is a negotiation, not an auction. They can be two party or multilateral (e.g. parallel one-on-one negotiations). It is included here for completeness.

Negotiations do not address market intelligence, search, seller execution or integration costs at all. Negotiations just adjust the elements of an ask/bid. However, as noted previously, the bargaining costs in a negotiation between a buyer and a seller are high because the parties have incentives to misrepresent their true preferences in an attempt to get a better deal. In contrast, in a buyer's auction with near perfect information, the buyer has a strong incentive to reveal her desires accurately and the sellers are motivated to fulfill those desires as completely as possible in a cost-effective way.

a) MIT Media Lab—AMEC—Frictionless—Tête-à-Tête

MIT Media Lab's Agent-Mediated Electronic Commerce project (AMEC) has produced a collection of companies, projects and research papers, mostly focused on collaborative filtering (Firefly), multi-dimensional evaluation and recommendation engines (Frictionless, Tête-à-Tête) and autonomous bots (AMEC). The latter involves autonomous software agents, "bots," that are focused on one-one-one negotiations with and without their owner's intervention. The academic question is whether such bots can be trusted and manipulated (corrupted) and whether their negotiations produce optimal results for both buyers and sellers.

In the Kasbah system (Robert Guttman, Pattie Maes et al. at MIT Media Lab), non-mobile software agents negotiate over price, conceding over time. The user is allowed to choose between three concession rates, but there is no justification why a rational agent would use those particular strategies.

In the Tête-à-Tête system (Robert Guttman, Pattie Maes et al. at MIT Media Lab; being commercialized by Frictionless Commerce), each user can specify preferences and a matching engine tries to satisfy both parties. Each user's utility function is assumed to have a particular parameterized form, and the user gets to adjust the parameters. The authors claim that the system does product brokering, merchant brokering, and negotiation, but Tête-à-Tête does not address the market intelligence, seller execution, or integration aspects of the overall problem.

The present invention is not concerned with autonomous negotiating bots and therefore the MIT-related work is interesting but not directly relevant.

2. Seller's Auction (Many Buyers, One Seller)

Physical seller's auctions are familiar—many people have seen or participated in a Yankee auction, whether at the county fair or at an art gallery. Their electronic counterparts have emerged as a successful form of e-commerce.

There are hundreds of seller's auction sites operating on the web today. The reason for their success is that they take advantage of the virtual nature of markets on the web. Auctions dispense with fixed prices—and both buyers and sellers seem to like it. Sellers find it easy to set up seller's auctions for new goods, remainders, used goods and services. Buyers find it both convenient and entertaining to engage in a bidding contest for goods and services. For every buyer suffering from winner's curse (overvaluing a product), there is a success story of someone winning an incredible bargain.

Just as buyer's auctions can reduce transaction costs when buyer wants are unique and sellers can adapt to those, seller's auctions can reduce transaction costs when the items being sold are fixed in character and buyers need to investigate and evaluate each item separately. As discussed below, however, seller's auctions generally do not minimize the transaction costs described above.

a) eBay and Related Examples

There are numerous variants to the seller's auction, each with its own set of auction rules. These auctions include, without limitation, a Yankee auction, a silent auction, a sealed bid auction, and a Dutch auction. The most common type of multiple buyer-one seller auction is the Yankee auction, in which buyers compete with other buyers by increasing their bid prices, all the buyers get to see each other's bids, and the highest bidder gets the good or service being offered by the seller. Web sites that currently use a Yankee auction include eBay, Onsale, and Bid.com.

Although these auction sites do enable real-time adjustment of prices, they do little to alleviate the central problem of reducing the buyer's transaction costs. A buyer must still go through the tedious, time-consuming process of finding auctions that have a particular product or service that the buyer may want. The buyer must then compare the product or service attributes (other than price) being offered at each auction site to decide which product or service at which site she should bid on. If several products appear satisfactory, the buyer must either limit herself to bidding on a single one, hoping that the price will be acceptable, or must track several auctions simultaneously to bid in each. In an active auction for a single item, most bidders have their bids rejected and are left to continue their search, adding to buyer search costs. Even the "winner" may end up buying a product or service at one site when another site had a different product or service that the buyer would have preferred at its closing price.

In addition, the only aspect of the transaction that is adjusted in these auctions is the price—all other terms are fixed. Thus, the buyer and seller may end up exchanging the product or service on sub-optimal terms.

Moreover, many buyers would find it too costly to participate effectively in a seller's auction, because effective participation requires accurate information about what the item should cost, which in turn depends on detailed knowledge of the whole product category. For example, an auction of a stereo may require not only that the buyer be familiar with the characteristics of the brand being offered but also how those characteristics compare to other available brands and what those other brands cost. Such buyers would not want to compete with other buyers for a particular good or service. Instead, these buyers would prefer to simply send out a request for an offer and then let the sellers compete with each other for the buyer's business. Similarly, seller's auctions do not meet the needs of sellers who want to be able to adjust their terms to create the most attractive package for the particular set of potential buyers in the auction.

b) Mercata, Accompany

The definition of "buyer" is changing because of the web. In the past, a buyer has been assumed to be either a person or a company. More recently, a buyer could be construed as a software agent (a bot). Also recently, the web has enabled the ability to create buying groups that act as a single entity. The groups combine their purchasing power and can thus cause sellers to lower their prices. Mercata and Accompany are buying groups with dynamic price adjustment. These systems share few characteristics with the present invention and have a number of limitations and shortcomings in providing a solution to the problems described above. These systems do not address market intelligence, search, or integration costs at all. Moreover, the systems are not necessarily auctions—it is possible for a seller to simply post an offer with a downward-adjusting price as more buyers sign on. In some ways, this is an automated form of a Dutch Auction. The systems adjust only price, not other terms. They do not offer a recommendation or evaluation (largely because it is a single-product auction, not one with choice). They, by definition, do not operate in real time—the auction is held open waiting for additional buyers to sign on and thus reduce the price for everyone.

3. Exchange Auctions (Many Buyers, Many Sellers)

Electronic stock and commodity exchanges are auctions with multiple buyers posting binding "bid" prices and multiple sellers posting binding "ask" prices. The most well known exchange of this type is NASDAQ. Access to NASDAQ is achieved via a number of successful on-line trading sites, e.g., Schwab, e*trade, DLJ and Ameritrade.

In exchange markets, buyers compete with each other to meet their "bids" and sellers compete with each other to secure their "asks." A buyer at one moment might become a seller at the next moment. This market has real-time adjustment of prices, with both buyers and sellers having near-perfect information about all prices and quantities.

These auctions also have important limitations. An inherent feature of their design is that the only aspects of the transaction that can be adjusted are quantity and price—all other terms are fixed. This may suffice for commodity goods and financial securities, but it can result in sub-optimal transactions for more complex goods and services. Moreover, because all the goods exchanged in the auction have the same price, these auctions cannot be used to sell non-identical goods. Consequently, they do not reduce the search costs of a consumer who wishes to compare these goods against similar but not identical goods.

Moreover, for the reasons noted above, many buyers do not want to compete with other buyers for a particular good or service. Instead, they want to simply send out a request for an offer and then let the sellers compete with each other for the buyer's business. Similarly, many sellers do not want to compete with each other in the presence of multiple buyers, but would prefer to tailor their offer to a single buyer whose multi-dimensional needs are explicitly understood by the sellers.

4. Buyer's Auction (One Buyer, Many Sellers)

The buyer's auction is the space in which the present invention resides. The Internet has enabled so-called "buyer's auctions" to be practical for a far wider range of goods and services than was previously possible. In these auctions, the buyer is the center of attention, with multiple sellers vying with each other for the buyer's business. Many of the existing buyer's auctions reduce the cost of transacting some types of business, but most do not eliminate or reduce the five transaction costs discussed previously.

There are several current examples of buyer's auctions that illuminate the limitations of today's approach and the new role for the present invention. Each example is described briefly below and important features are identified that distinguish it from the present invention. All of the current buyer's auctions are flawed in one or more significant respects, which prevents them from being full solutions to the problems described above. Moreover, none of the current buyer's auctions teaches or suggests the business methodology (revenue model) of the present invention for gathering and selling the marketing information generated by a buyer's auction with near perfect information.

It will be demonstrated in the next section that the present invention is a pure buyer's auction, differentiated from all previous attempts at creating such a market.

a) FreeMarkets

FreeMarkets conducts business-to-business auctions that enable large buying organizations to purchase industrial materials and components. The FreeMarkets process is similar in most respects to the traditional RFQ process described above, with the exception that all bidding takes place online.

The FreeMarkets process is time- and labor-intensive. A team of FreeMarkets employees is assigned to each project. The team spends weeks working with the buyer to develop a comprehensive RFQ with detailed technical, commercial, logistical, and quality specifications of the supplies to be purchased, so that only price adjustments can be made during the auction itself. The RFQ is distributed a few days to several weeks prior to the auction. Only pre-screened suppliers invited by the buyer can participate. As previously observed, this is itself a signal that the transaction costs of the auction are quite high.

During the auction, which takes place online, sellers can place bids for "lots" of supplies that they want to sell to the buyer. "Lots" are parts or line items that have been grouped together by the buyer. The sellers cannot place bids to sell individual parts or line items to the buyer. At the same time, the buyer is committed to awarding all line items within a lot together. Moreover, the buyer must commit to making an award to at least one seller at the beginning of the FreeMarkets process. The sellers remain anonymous to other sellers during the auction, but they can see the evolving market price for a lot, and they can respond with new bids. The only variable in the auction is the lot price. All other variables are fixed by the RFQ. A typical bidding session lasts two to four hours.

After the auction, sellers with competitive bids must go through further qualification steps, including submitting cost breakdowns to the buyer and supporting on-site visits by the buyer. Thus, the buyer can only consider non-price factors outside the auction itself.

FreeMarkets is a buyer's auction; however, the FreeMarkets solution differs significantly from the present invention and has several limitations and shortcomings in providing a solution to the problems described above. It has high transaction costs—both time and labor—before, during, and after the auction, which would be intolerable in many business-to-business, business-to-consumer, and individual-to-individual transactions. The buyer must approve the sellers beforehand, which is time consuming and can result in the buyer excluding a seller who unbeknownst to the buyer could have provided the best offer. The auction itself takes several hours and there are several additional time-consuming steps that the seller must go through prior to completing the transaction (e.g., hosting site visits by the buyer).

The only variable that changes during the auction is the price. Also, the buyer cannot change her mind and withdraw the RFP—the buyer is contractually committed to buy from at least one of the sellers from the outset as an inducement for sellers to expend the resources necessary to enter a proposal. These features are, as previously observed, indications of the high costs of the bidding process. Theses features also make the process inappropriate for inexperienced consumers who may want to see an offer before deciding whether or what to buy. In terms of the five costs discussed above, the process entails significant costs for the buyer in every category.

The sellers are also burdened with imperfect information. Although they do see the lowest price offered for a lot, they do not know the identities of the competing sellers. This lack of knowledge may lead a seller to make a sub-optimal bid. For example, a seller with an excellent reputation for service and support may erroneously decide to match the low bid of a competing seller with a poor reputation, thereby giving up the premium that he could have captured for himself because of his superior reputation (i.e., brand power). Moreover, the buyer can only consider important factors other than price outside the auction itself—for example, vendor-supplied financing, warranty, and all the other terms and conditions associated with complex purchases.

b) Orb|Bid

Orbbid.com is a web site that describes an RFP/RFQ concept that focuses on multidimensional RFPs and RFQs, facilitates multidimensional offers by human sellers and includes recommendations and evaluations using human experts.

Orb|Bid can conceptually operate as a buyer's auction; however, the Orb|Bid process differs significantly from the present invention and has numerous limitations and shortcomings in providing a solution to the problems described above. It does not address the buyer's market intelligence costs at all. As in a traditional RFP process, the buyer has to educate herself. Search costs also remain high. The Orb|Bid process does not automatically search for potential sellers. Instead, just like a traditional RFP, the buyer spends time and money to pre-qualify sellers or, alternatively, the buyer merely posts the RFP on her own web site and hopes that potential sellers come to her site and find it. Bargaining costs are higher in OrblBid than in the present invention's fully automated buyer's auction because of the high costs of human intervention in the OrblBid process. Seller offers are adjusted manually in OrblBid during the auction. Similarly, offers are evaluated by human experts during the auction. In addition to increasing the transaction costs, the intervention of human experts limits the practical size of the auction and means that the auction has to be scheduled in advance when the relevant experts are available. As with FreeMarkets, a system designed for industrial (large-scale, high-value, complex) RFPs and RFQs differs significantly from a system geared more towards consumer-oriented products and services.

c) Priceline

U.S. Pat. No. 5,794,207 describes a type of one buyer-multiple sellers process used by Priceline.com. In the Priceline process, the buyer submits a purchase offer coupled with a payment guarantee (e.g., a credit card account number) to an electronic intermediary. The buyer's offer is then communicated to a plurality of sellers. The first seller to accept the offer forms a binding contract with the buyer, thereby ending the process. Note that the Priceline process is not an auction in traditional economic terms because one requirement for an auction is a comparison of offers, with inferior offers rejected in favor of superior offers.

The Priceline approach has numerous limitations and shortcomings in providing a solution to the problems described above. Market intelligence and integration costs are not addressed at all. Moreover, there is no auction adjustment of sellers' offers. Indeed, from the buyer's point of view, there are no seller offers at all—just acceptance or rejection of the buyer's offer. From the seller's point of view, the auction is not iterative: it makes a single decision to accept or reject a proposed price (although seller counter-offers are possible). Plainly, bargaining costs are not reduced at all in this mechanism because there is no comparison of sellers' bids.

Priceline makes no attempt to create near-perfect information between buyers and sellers. The sellers do not have any information about competing sellers because the process uses sealed bids with no iteration in the bidding process. With no comparison of bids, it would be pure coincidence that the seller that accepts the buyer's offer is the seller who is willing to offer the lowest price and best product or service.

In Priceline, the buyer is blind to all sellers' offers except one. Moreover, the buyer does not have any information about the sellers prior to being bound to a contract with a particular seller. This process can lead to a sub-optimal decision by the buyer in several ways. For instance, the buyer may specify too high a price in her offer because she does not know the sellers' rock-bottom prices. Alternatively, the buyer may settle for lower quality service because she could not evaluate competing multi-dimensional offers (e.g., a buyer purchasing airline tickets may agree to more or longer stopovers at airports). In addition, the seller that accepts the buyer's offer may turn out to be a business with poor quality or service that the buyer would not knowingly choose if she had a revocable choice.

Unlike the present invention, the Priceline market forces buyers to accept any qualified offer. The Priceline market does operate in near-real time, but the buyer has to wait up to one hour for quotation and cannot reenter a new offer if her first offer is rejected. Priceline does not provide a recommendation to buyers or information about the market or the buyer's characteristics to sellers.

d) Travelbids

Travelbids.com is a web site that conducts two different types of buyer's auctions related to the travel industry, which Travelbids calls "Regular Listings" and "Full Service Listings."

For Travelbids' "Regular Listings," the buyer does all of the market intelligence regarding a trip by herself. She also does all of the searching for an airline (or airlines) that will take her where she wants to go. She makes all the reservations with the airline(s) and gets the airlines' posted prices, but she does not purchase the tickets directly from the airline. Instead, she lists the reservation with Travelbids. Travel agents then bid to sell the tickets to the buyer in a buyer's auction. The travel agents can see the bid amounts during the auction (but not the bidders' identities). The travel agent bidding the highest rebate (discount) of his commission takes over the reservation, charges the buyer's credit card, and sends the tickets to the buyer. The buyer must accept the winning bid.

Although Regular Listing auctions are beneficial to the narrow market niche that they serve, they have numerous limitations and shortcomings in providing a solution to the problems described above. Market intelligence, search and integration costs are not addressed at all. The buyer has to do all this work herself (which is one reason why travel agents are willing to rebate some of their commission to her). Moreover, the only variable that can be adjusted during the auction is the discount price. All other terms are fixed.

For Travelbids' "Full Service Listings," the buyer lists her specifications for the proposed trip, and a maximum of three travel agents can e-mail their proposals to the buyer. The buyer is not obligated to buy any of the three proposed trips.

Like Regular Listing auctions, Full Service Listing auctions have numerous limitations and shortcomings in providing a solution to the problems described above. Market intelligence and integration costs are not addressed. Sellers are blind to each others' offers, the number of sellers is limited to three, and there is no iteration in the bidding. Thus, bargaining costs are not reduced as much as they would be if sellers had complete information about each other's bids, if more than three sellers were allowed to bid, and if sellers could adjust their initial offers.

IV. The Solution: A Buyer's Auction with Near Perfect Information

The present invention is focused on solving the problems and limitations discussed above. From an architectural perspective, the invention is referred to as a "system," whereas from a service perspective it is referred to as an "Auctioneer." The detailed methodology for accomplishing these tasks is described below (see the Detailed Description of the Invention), but its primary attributes include the following:

a) The system implements a buyer's auction that is fundamentally designed to minimize market intelligence, search, bargaining and transaction execution costs and thus create more competitive, frictionless markets.

b) Buyers and sellers can efficiently conduct the buyer's auction within the Auctioneer's unified environment, thus minimizing buyer integration costs.

c) The buyer's auction generates valuable proprietary information for both buyers and sellers and a revenue stream (hence a robust business model) for the Auctioneer offering such a service.

A. Nine Key Discriminators

The present invention can be described in terms of nine attributes that, in various combinations, distinguish it from the prior art.

1. The Buyer Requests the Offer.

The buyer initiates the process by requesting an offer. In a preferred embodiment, participation in the auction can be free for both buyers and sellers. This encourages the maximum number of buyers and sellers to participate, thereby creating the greatest numbers of RFOs and actual offers.

One object of the present invention is to perfect markets for consumer goods and services. The products and/or services that consumers want to buy vary over time, with many items (particularly durables) purchased only infrequently. Sellers of these goods and services, however, tend to have a lasting presence in the market that does not vary greatly from day to day, which makes it relatively inexpensive for sellers to set up sites to present their goods and services and to use seller bots to negotiate with potential buyers. Thus, transaction costs for ordinary consumer transactions are lowest when the sellers are the ones who maintain stores or websites and make the initial offers to buyers in response to the buyer's stated criteria.

2. There is an Auction Adjustment of Sellers' Offers.

Because different buyers have different priorities and preferences, the sellers' offers in a perfect market need to respect that and be tailored to the particular buyer. To economize on market intelligence, sellers also need to be made aware of existing competition before proceeding. Without auction-style adjustment, offers could not be tailored so accurately to the buyer's individual preferences and to the competitive situation.

3. The Auction Process is Fully Automated.

The auction process is fully automated, including buyer's rules and sellers' rules. This design rule is important because employing software processes (bots) to conduct at least a portion of the auction reduces some of the transaction costs, including time costs. Without this feature, limiting auction costs would require employing the kinds of the cost limiting devices used in traditional auctions, such as forcing buyers to commit, pre-qualifying sellers, limiting the number of rounds, and so on.

In mass market oriented systems, any human intervention imposes labor costs that can easily make the business model infeasible. Hence, the system has to be designed from the ground up without human intervention by sellers and minimum human intervention by buyers. On the other hand, people today do not trust automated processes (bots) to perform decisions for them. Buyers, for example, are unwilling to delegate the bargaining tasks to a bot. The single exception found in consumer markets is programmed trading. The present invention is designed to support the critical aspects of the buyer's auction that are appropriate for automation, including market intelligence, search and sellers' adjusted offers.

4. The Offer Adjustment can be Iterative.

The auction can be set to have one or multiple rounds with adjustment for length of time. However, in the preferred implementation, an open-ended iterative procedure is used in which bidders must improve their offers at each round or cease bidding.

The reason for using an open-ended procedure is that efficient outcomes are reliably achieved only in markets in which the parties have an opportunity to make offers that overturn any inefficient outcome. That happens most reliably in an iterative process, in which sellers learn about the best standing bid and have an opportunity to respond. (There are also auction designs, such as the Vickrey auction, that mimic the outcome of an iterative process in a single stage process. The iterative adjustment is therefore not a necessary feature of the process.)

5. Both Price and Other Decision Factors May be Adjusted in the Bidding.

The request for offers (buyer's RFO) and answers (sellers' adjusted offers) are matched in multiple dimensions, agreed upon in advance via an electronic template so as to minimize market intelligence, search and bargaining costs. If a seller were limited to adjusting his price, the opportunity to tailor the deal to the customer would be lost and the problem of bargaining costs would not be overcome.

6. There is Near-Perfect Information Available to Both Buyers and Sellers.

In a preferred embodiment, the buyer sees all the sellers' offers and the sellers see both information about the buyer preferences and all the information about each others' offers. Without near-perfect information, all the anomalies and sub-optimal results seen in the physical world would reappear in the virtual world. (As used herein, the terms buyer and seller respectively include buyer's bots and seller's bots.)

Near-perfect information requires, among other things, enough information for the buyers and sellers to tailor their deal optimally and for sellers to respond to their competitors' offers. Without these two characteristics, either bargaining costs or competitive intelligence costs would prevent efficient outcomes.

7. The Buyer can Withdraw.

The buyer's ability to withdraw its RFO allows the inexperienced buyer an opportunity to experiment, learn, and refine the description of her preferences. This permits more effective search and bargaining and affords the buyer an opportunity to discover whether there is anything being offered that meets her needs. Without the right to withdraw, the buyer might be too fearful of making mistakes in a multi-attribute search to be willing to participate in the process.

8. The Auction can Operate in Real Time.

The process operates on-line and in real time. The time required to create and clear the market is a resource, and using it entails a significant cost. Minimizing time and effort by both buyers and sellers reduces total cost for everyone.

Real-time operation can help to drive buyer search and bargaining costs close to zero. If the auction is slow, the need to conduct repeated auctions with different criteria could discourage the buyer, leading her to give up on searching for a better deal or trying to express her preferences more precisely before gathering full information.

9. The System Provides a Recommendation to Buyers and Bid-Relevant Information to Sellers.

Buyers receive recommendations about the desired product or service. The recommendation is based on a complete evaluation of all dimensions of all offers measured against the buyer's stated and/or previously archived criteria. Sellers can receive information about the how winning bidders adjust their offers based on the buyer's stated preferences, utility function and profile.

This mechanism helps to create the conditions of near-perfect information. Without it, the buyer would be faced with an overwhelming set of offers to assess and sellers would be left to guess about what buyers wanted.

B. A System to Minimize Total Transaction Costs

The features and attributes of the present invention—as described in the section immediately above—will now be mapped onto the five types of transaction costs that need to be minimized. A system is described whose process directly attacks each of the goals identified previously.

In the preferred embodiment, the system is a service operated by an Auctioneer. Other embodiments of the system could include a private label, embedded service provided on an outsourced basis to a third party, e.g., Portal buyer's auction "powered by system name." Alternatively, the system can be a non-labeled service operated by a third party. In such cases, the system is simply technology licensed to the third party service provider.

Regardless of the specific business arrangement, the result is an Auctioneer service offering a buyer's auction with design goals that are specifically targeted on minimizing a set of five interrelated costs, as follows:

1. Minimize Market Intelligence Cost a) Buyer Expresses Initial "I want to Buy" and Decision Criteria The system preferably offers the buyer a natural language inquiry to express the initial "I want to buy . . . ."

The system preferably offers the buyer expert assistance on refining and structuring the desired product/service in the form of an electronic decision criteria template.

The system preferably supports the buyer's need to iterate on the template, trying out various formulations, until the buyer is satisfied that she understands the relevant factors of a decision.

b) Buyer Sets Personal Priorities

The system preferably offers the buyer expert assistance in defining personal goals and tradeoffs in the form of a priorities template.

At the buyer's option, the system can provide a variety of automated assistance to help the buyer set her priorities, e.g., archival knowledge of what the buyer has opted for before, of the buyer's peer group goals; and of third party experts' opinions on priorities.

c) Sellers can be Informed about Buyers.

Sellers can receive various types of information about a particular buyer before, during, or after a buyer's auction with that buyer, if the buyer permits. In addition, sellers can receive statistical information from the buyers' "I wants" to help them assess what product offerings would be most desired by their customers and what kinds of bids have been winning customers. This data mine is current and can take into account all the proprietary information resulting from previous buyer's auctions that occurred within the system.

d) Sellers can be Informed about Current Competitors.

Before bidding for a particular customer, sellers can receive the same search results as were available to the buyer, providing them with valuable information about the current state of competition in the market.

2. Minimize Search Cost a) Buyer and Sellers can See all Competitive Posted Offers The system applies the buyer's decision criteria and priorities template against a database of instantaneous market choices (posted offers). In contrast to systems that sell position in a list or that have a small and exclusive set of sellers, this system can prioritize sellers using the buyer's own criteria.

The system provides a rich set of constraints that can be set by the buyer (or set via defaults) to delimit searches, e.g., by geography, by various characteristics of the product; or by characteristics of the seller.

The system can select a subset of the market choices and presents them to both the buyer and sellers in a directly comparable format.

b) Buyer Receives an Evaluation and Recommendation

The system offers the buyer an evaluation and recommendation on the best match between the buyer's decision criteria and priorities compared to the posted market offers. This feature helps the buyer sift through the many offers to identify the ones that are most promising according to her specified criteria.

The system supports the buyer's possible need to iterate on her features template and priorities after she has seen the market choices. This iteration refines and solidifies the buyer's demand and moves her closer to a buying decision. Of course, a buyer can also choose to skip seeing the posted offers and go directly to the buyer's auction.

c) Sellers have Relevant Customers Identified to them.

Sellers do not need to incur substantial advertising costs to find customers. Merely by providing a good deal to their target customers on their website, the relevant buyers will be identified to them, allowing them to make an offer for free. The same information is scattered throughout the web (and is therefore non-proprietary), but the system reduces the cost to the seller by providing it at the right time in the right form, i.e., precisely at the moment when a motivated buyer emerges and about the exact product or services that are relevant.

3. Minimize Bargaining Cost a) Buyer Requests an Offer—"Make Me an Offer"

The system creates a personalized auction for buyers. The system presents bidding sellers (i.e., their automated proxies operating within the system's servers) with the buyer's statement of demand (i.e., request for offer) and product feature decision criteria. In addition, if the buyer permits it, the system can provide sellers with the buyer's personal priorities template, archival data and profile.

b) Seller Sets Business Rules

The system presents bidding sellers with a business rule format containing variables that map onto the buyer's priorities (e.g., total cost and quality) with the goal of capturing the demand.

The system supports seller business rules that are either set within the system or are set on the sellers' servers (proprietary to the seller).

c) System Automatically Presents Adjusted Offers to Buyer and Bidding Sellers

The system simultaneously presents to bidding sellers near-perfect information regarding the buyer's priorities, profiles, and all other competitors' posted offers compared to the sellers' posted offer.

The system adjusts bidding sellers' posted offers by applying sellers' business rules.

The system simultaneously presents the result of a request for adjusted offers to buyers and to all other bidding sellers.

The system can present the buyer with an evaluation and recommendation on best matches between a buyer's decision criteria and priorities as compared to sellers' offers. Evaluations and recommendations can be given before, during, or after the auction process. Sellers can receive analogous information.

The system can present to bidding sellers an analysis of the transaction that helps to explain why the winner captured the demand and/or why a seller lost.

d) Auctioneer can Automatically Attach Complementary Offers to the Buyer

The system (representing the Auctioneer) can present complementary offers that are related to and increase the value of the offer in response to the buyer's request for offer. The offers made by the Auctioneer (i.e., the service) can increase the value of one of the criteria in the electronic template defining the characteristics of the product, e.g., product features or upgrades; or can increase the value of one of the criteria concerning buyer preferences, e.g., better financing, warranty or delivery terms. The auctioneer can attach such complementary offers by purchasing these ancillary benefits from a third party or by making an arrangement with a third party to attach their services to the adjusted offer. In this manner, the buyer is assured that using the service can always result in a benefit.

4. Minimize Seller Execution Cost a) The System Archives Auction Data.

The system captures all relevant data resulting from all phases of the auction, including data about why a purchase was not made. This minimizes the buyer's and sellers' need to exchange data, even when the buyer is dealing with a new seller for the first time.

b) The System can Deliver a Complete Order to Seller and Confirmation to Buyer.

The system stores all relevant information necessary to create a purchase, transfer funds and effect delivery. This can reduce or eliminate the need for additional communication between the buyer and seller after the auction to consummate the transaction.

c) The System can Collect Funds from the Buyer and Transfer them to the Seller.

The system provides a modern, secure and efficient transactional environment. This provides assurances of delivery to the buyer and collection to the seller, while also streamlining the process.

d) All Buyer's Data, Sellers' Data and Outcome of the Buyer's Auction can be Archived and Integrated as Inputs to the Next RFO Cycle.

The system captures all the data about an auction. A multi-round, iterative procedure can become burdensome if information is not intelligently archived and integrated. The system can perform these functions.

5. Minimize Buyer Integration Costs

The entire experience—from first identification of a need, to search, to bargaining, to transaction, to post-sale service—can be considered as an integrated flow. This integration presents a major opportunity to minimize the total cost to both buyers and sellers. Even if each of the individual stages in the pipeline described above were available elsewhere, the total cost of doing them separately will always be higher than the cost of doing them in a unified fashion.

a) Step-by-Step Content for Buyers

The system can provide the buyer with all the information and ancillary support services needed to complete successfully the entire process—from first identification of a want through execution of a purchase transaction.

b) Consistent User Interface for Buyers

The system maintains a consistent user interface for the buyer throughout all stages of the process (market intelligence, search, bargaining and transaction execution).

c) Integration of Third Party Content

The system integrates within a common interface a rich variety of diverse, heterogeneous, third party content to provide market intelligence for the buyer while maintaining a consistent environment. This extensible framework enables the system to add new templates as they become available from third parties.

d) Templates for Communication Between Seller and Buyer

The system arranges for low cost communication between the buyers and sellers by providing common templates, e.g., for expressing feature priorities and optimizing goals. This has two effects—it reduces the amount of time needed by buyers and sellers to enter data; and it provides a protocol that makes the communication between buyers and sellers and the computation about the offer both relevant and efficient.

e) Automatic Archiving

The system leverages its institutional memory (archives) about all buyers and all auctions—who won, who lost and why—to the benefit of both buyers and sellers. In most systems, the need to enter data is a major inhibitor to use. This system captures data on the fly wherever possible and can reuse it both for specific (individual buyer or seller) and aggregate (large-number auction analysis) purposes, provided that user privacy concerns are addressed.

f) In-Situ Transaction

The system enables the buyer to accept an adjusted offer and consummate the transaction within the Auctioneer's site. This removes from the buyer the integration cost of interacting with a third party system (i.e., the successful seller), e.g., re-registering, learning to navigate a new environment, and re-entering data that have already been entered elsewhere before.

g) Post-Sale Service

The system supports near-automated post-sale service by maintaining a complete archive of the transaction. The archives are maintained for each buyer, each seller and each auction. In the event that post-sale service is required, all the data about that transaction are available in archived form. The archiving is fully automated. Hence, the creation of these archives requires no additional effort by the buyer or the seller. Moreover, the system ensures that the privacy concerns of the parties are met.

C. The System is Supported by a Robust Business Model

1. Goal—Maximize Participation and Information Revelation

The system business model is designed to encourage maximum participation by both buyers and sellers by keeping costs low for both sides of the market. For buyers, the system is without charge and easy to use. For sellers, no charges are levied that don't have offsetting benefits. For sellers, the most basic level of participation (submitting posted offers) costs nothing, thus removing all price barriers. There is no reason not to participate merely because many other sellers are participating.

At the same time, because low seller costs promote wide seller participation in the auction, the buyer's incentive to conceal her preferences is usually eliminated. Competition among the sellers using the buyer's stated preferences makes it difficult or impossible to exploit the buyer's preferences as could happen in a bargaining or negotiation situation. Thus, the multidimensional auction itself solves one of the key information problems.

2. Products and Pricing

The system creates value as an infomediary by delivering two kinds of products to sellers: a market information product and an Auctioneer success fee product. The pricing structure should be set so that it remains robust as the business grows and the products should be reliable and difficult to redistribute in ways that preserve their value.

a) Information Products (for Sellers)

The system solves the problem of an apparent market failure for information by producing timely and relevant information for both buyers and sellers. Buyers receive all market and archival information at zero cost. Sellers can subscribe to a variety of information packages that can be bundled and price discriminated according to their perceived value. A simple example is two bundles of information:

(1) Non-Proprietary Information Bundle

The non-proprietary bundle theoretically should include all information that sellers could extract from the web with some effort, i.e., it is either posted publicly or can be purchased by a subscription from third parties. For example, sellers can replicate the functionality of extracting instantaneous comparisons of their products with all other competitive products then-posted on the web by using a sophisticated search engine, e.g., the Inktomi Shopping Engine. Also, sellers can purchase profile information from third party sources, e.g., Acxiom. However, a byproduct of the system is a clean, relevant and timely compilation of those data. Those data are valuable and support the revenue model.

(2) Proprietary Information Bundle

The proprietary bundle theoretically should include all information that sellers cannot extract from the web with effort, i.e., it is neither posted publicly nor can it be purchased by a subscription from third parties. For example, sellers cannot replicate the functionality of the auction, hence sellers cannot see: (i) who bid, (ii) what elements of the offer they adjusted, (iii) who won the round, and (iv) why they won the round. However, a byproduct of the system is a clean, relevant and timely compilation of these proprietary data.

Because the proprietary data are produced as a byproduct of the buyer's auction, neither buyers nor sellers are required to expend additional effort (cost) to generate this information. Yet this information is extremely valuable to both buyers and sellers. The difference between its production cost (near zero) and its market value (high) represents the potential profit margin that can be extracted by a service using this invention.

Importantly, the data generated within the system is most valuable when used immediately. That is, the information is useful for making a sale to this customer who is requesting an offer right now. By running the sellers' bidding-offer bot internally on the system, no information leaks from the system during the period when that information is most useful. Because the information does become available later, its accuracy is subject to verification, but not before its usefulness to the seller has diminished.

Logically, the data that are exclusively available via the system as a direct result of the buyer's auction are valuable and provide support for the revenue model. The system reallocates the value gained by making a transaction more efficient into a proprietary information product. The price of that product to sellers can always be set to be less than its value. Thus, the reallocated benefits of a buyer's auction accrue in three directions: to the buyer (by producing a zero-cost optimal result in response to an "I want"); to the seller (by producing low cost proprietary information that can be leveraged across all transactions); and to the system (by producing a robust and sustainable revenue stream for the infomediary).

b) Auctioneer Success Fee Product

From the seller's point of view, the second product is the role of the system as Auctioneer and the opportunity to participate in the buyer's auction. The business model for traditional (Yankee) auctions is well-established on the web. Companies such as eBay extract between 2.5% and 7% of the value of a completed transaction. Because these are "success fees", they logically do not inhibit sellers from becoming active bidders. And because the auction is fully automated, other costs of participating are also low enough not to discourage participation. As with all success fees, only the winner pays. Everyone else has a free ride. The purpose of the information products (above) is to more fairly allocate the cost of running the system between all sellers.

When compared to other auctions that charge an identical transaction success fee, this system produces greater value for sellers. The reason is that most auctions (or posted price sales) randomly perform a best match between buyer's demand (utility function) and sellers' offers (production function). This system is optimized to perform the best match. The difference between the optimized approach must produce equal or greater value for sellers versus the random approach. Hence, even when comparing two systems with identical success fees, this system will be more beneficial to sellers.

3. Revenue Sources Eliminated from the Business Model

An important goal of a buyer's auction is to encourage as many buyers and sellers as possible to participate. Markets work best when the most people play in a competitive environment with near-perfect information. Anything that unfairly discourages buyers and/or sellers from participating should be eliminated.

Note that the core revenue model specifically excludes several types of revenue so as not to create disincentives and resistance for either buyers or sellers. The presence of these revenue sources could discourage buyers and/or limit the number of sellers.

"Pay to play" fees are a small entry fee, as in the "ante up" in a card game. These fees are eliminated because they discourage the bidders who lose repeatedly (small market share) at the expense of larger sellers. Discouraging such bidders would prevent the number of sellers from growing as the business grows.

Two other sources of revenue are eliminated because they would likely undermine buyer confidence in the objectivity of the system's recommendations. One such source is banner advertising fees, which may both raise buyer suspicions and skew the auction in favor of larger sellers who are able to advertise heavily. This is the same principle as barring campaign advertising next to a polling booth during an election.

Position placement fees are eliminated because they unfairly skew the results of the auction in favor of larger sellers who can purchase a position even though their total score was not the highest. Also, they throw the credibility of the system into doubt in the buyer's mind, thus inhibiting buying.

V. Application Scenarios—Commerce Themes

The mechanism of a buyer's auction has wide applicability. The present invention can be applied to many situations including goods and services, from low end to high end. The particular framing of the "I want to . . . " illustrates the range of applications. In some cases, goods and services are bundled together, e.g., a contractor building a house; an auto mechanic repairing a transmission.

"I want to . . . " examples include, without limitation, the following goods and services:

A. Health

| | goods | services |
|---|---|---|
| high end | intensive home care equipment e.g., monitoring instruments uninsured prescription drugs | non-elective surgical procedure that needs to be reserved quickly, e.g., heart bypass, ovarian cancer health insurance |
| low end | insured prescriptions drugs drug store SKUs | minor elective clinical procedure, e.g., dental hygiene coupons for personal hygiene services |

Goods:

"I want to rent a convalescing bed for three months . . . "

"I have five prescriptions I need to fill every month. I want to get a price for the whole bundle from one company . . . ."

"I want to do my drug store shopping list . . . "

Services:

"I want to find a surgical center that can schedule a _____ procedure immediately . . . ."

"I want to find a better group health plan for our small business group . . . "

"I want to receive offers from physical therapy centers near my home—have a sports injury to my knee. Doctor prescription . . . ."

B. House & Garden

|  | goods | services |
| --- | --- | --- |
| high end | new house | install new roof |
|  | living room furniture | home insurance |
| low end | bed and kitchen goods | garden maintenance |
|  | grocery, household supplies | ISP |
|  |  | newspaper delivery |

Goods

"I want to buy living room furniture—must have great financing . . . "

"I want to get a mid-range refrigerator. Include installation and delivery . . . ."

"I want to subscribe to five magazines, a book club and a DVD club . . . "

"I want to get coupons to the following list of items . . . "

Services:

"I want to buy a house for lower commission than 6% . . . "

"I want to refinance my home . . . "

"I want to get an ISP that can host my family web page . . . "

"I want to get the best telephone rates . . . "

"I want to be find all department store sales the minute they start . . . "

"I want to join . . . "

C. Personal Finance

|  | goods | services |
| --- | --- | --- |
| high end | computer and SW | mortgage, insurance |
|  |  | brokerage account |
|  |  | credit & debit cards |
| low end |  | tax return, CPA |
|  |  | commercial bank services |
|  |  | traveler's check, foreign currency |

Goods

"I want to get a PC and printer and tax preparation software . . . "

Services:

"I want to refinance my home . . . "

"I want to I want to do online trading and get low commissions . . . "

"I want to get new home insurance including earthquake . . . "

"I want to get better rates and higher limits on my credit card . . . "

D. Automobile

|  | goods | services |
| --- | --- | --- |
| high end | car | major collision repair |
|  | major car parts, audio system | auto insurance |
|  |  | major mechanical repair |
| low end | replacement car parts, tires | oil change |
|  | gasoline |  |

Goods

"I want to buy a car . . . "

"I want to get an audio system for my truck . . . "

"I want to find a great deal on tires . . . "

"I want to get coupons for gasoline . . . "

Services:

"I want to find a body shop to fix my car—insurance claim . . . "

"I want to find auto insurance for my 16 year old boy . . . "

"I want to get a complete transmission overhaul . . . "

"I want to get 60K maintenance done on my 1993 Ford Taurus . . . "

E. Leisure, Travel, Entertainment & Sports

|  | goods | services |
| --- | --- | --- |
| high end | pleasure boat | luxury cruise, all-inclusive resort |
|  | new golf clubs | weekend getaway |
|  |  | theater, pro sports |
| low end | sports and camping equipment | dance clubs |
|  | luggage | restaurants |
|  | sports clothing | movie |
|  | CDs, books, videos, DDS |  |

Goods

"I want to buy a power boat . . . "

"I want to find a set of golf clubs . . . "

"I want a complete set of camping equipment for a family of four—tent, sleeping bags, cooking equipment . . . "

Services:

"I want to book a cruise to Mexico including airfare and trip cancellation insurance . . . "

"I want to rent a car for a week in Florida . . . "

"I want to find a weekend getaway for two in Napa . . . "

"I want to go swing dancing tonight . . . "

"I want to find a French restaurant, reservation at 8:00 p.m. for four . . . "

F. Small Office, Home Office

|  | goods | services |
| --- | --- | --- |
| high end | business machines | office rent |
|  | office furniture | group health insurance plan |
|  |  | legal and accounting services |
| low end | office supplies | telecommunication, ISP |
|  |  | janitorial |

Goods

"I want to buy five PCs for my company . . . "

"I want to get a [particular brand] office setup . . . "

"I want to find a supplier of [part brand] ink cartridges . . ."

Services:

"I want to rent an office, 2,000 sq ft, Palo Alto area . . ."

"I want to get a group health plan for five people . . ."

"I want to get bids for our telephone service . . ."

"I want to find a janitorial service, daily . . ."

G. Brokers and Agents

|  | goods | services |
|---|---|---|
| high end | — | agent to sell my house |
|  |  | art auction |
|  |  | agent to sell my car |
| low end | — | stock broker |
|  |  | insurance broker |
|  |  | consignment agent for furniture |
|  |  | travel agent |

Services:

"I want to sell my house and want bids on commission rates . . ."

"I want to sell my antique bed and want bids from antique dealers on consignment rates . . ."

"I want to trade on-line and want bids on commissions . . ."

"I want to buy air travel and want bids on commissions . . ."

H. Education

|  | goods | services |
|---|---|---|
| high end | PC, printer | private college |
|  |  | technical and vocational training |
| low end | books | college prep course |
|  | school supplies | self-help course |

Goods

"I want to get all the school supplies for my five kids, one time . . ."

Services:

"I want to find a college that can give me a scholarship . . ."

"I want to learn Spanish . . ."

"I want to receive technical training on _____ (subject) . . ."

"I want an SAT prep course . . ."

"I want to get re-certified as a real estate agent in California . . ."

I. Personal Matters

|  | goods | services |
|---|---|---|
| high end | — | lawyer |
|  |  | accountant |
|  |  | private investigator |
| low end | — | employment counselor |
|  |  | tutor |

Services:

"I want to change jobs . . ."

"I want to track down my long-lost aunt . . ."

"I want to find a divorce lawyer that charges less than . . ."

"I want to find someone to do my taxes right away . . ."

"I want to find a masseur who knows how to . . ."

"I want to find someone to teach me how to . . ."

"I want to find an organization that . . ."

"I want to join a club that does . . ."

"I want to find a great yoga center . . ."

"I want to find a _____ (man, woman) for a casual relationship . . ."

J. Electronics & Computers

|  | goods | services |
|---|---|---|
| high end | home theater | technical consultant |
|  | PC, printer, etc. | installation & repair |
| low end | portable tape player | ISP |
|  | batteries, cables, supplies |  |

Goods

"I want to get the following supplies for my office, on a regular basis . . ."

Services:

"I want to get an expert to set me up with PCs, software and teach me how to use it . . ."

"I want to find someone to design, install and maintain a home theater . . ."

The various embodiments described above should be considered as merely illustrative of the present invention and not in limitation thereof. They are not intended to be exhaustive or to limit the invention to the forms disclosed. Those skilled in the art will readily appreciate that still other variations and modifications may be practiced without departing from the general spirit of the invention set forth herein.

VI. Mitigating Potential Negative Effects: Auction Design Rules

Every market has the potential to be distorted or corrupted. The present invention contemplates such negative influences. The auction rules are designed to minimize or completely eliminate undesirable side effects. In that sense, the invention encompasses methods and constraints on its own mechanism, much as the preferred embodiment of a jet engine might contain sensors, governors and fire extinguishing systems to keep it from causing damage.

A primary method of mitigating the potential negative effects of this powerful market mechanism is embodied in the auction design rules. Those rules are an extensible framework that can be changed as potentially pernicious symptoms become apparent. For example:

A. Collusion and Price Fixing

When sellers behave competitively, perfect information helps to support perfect market outcomes. However, when sellers are seeking to collude, excessively good market intelligence can make collusion easier. The rules of the auction and the information products can be adjusted to make collusion and price-fixing more difficult. For example, in highly concentrated markets, it may be desirable to hide the identity of the bidders to limit the use of that information to enforce a collusive agreement. Adding such a feature has been contemplated and can be built into the auction design rule.

B. Predatory Pricing

Similarly, bidders in an open auction could, in principle, use the information to prevent a particular competitor from obtaining any business, or any business that meets certain profitability criteria. Again, the auction rules can be designed to hide enough information to make such strategies difficult or impossible. Adding such a feature has been contemplated and can be built into the auction design rule.

C. Price Discrimination

A potential concern about the distribution of so much information to bidders is that they will use it to engage in price discrimination. Indeed, we would expect that bidders might well bid aggressively for the consumers who are most likely to bring repeat business or to purchase profitable products. The result may well be lower prices for richer customers.

One solution to this problem is group-buying. The present invention can include group-buying features. Adding such a feature has been contemplated and can be built into the auction design rule.

In addition, the present invention gives buyers control over what information about themselves can be given to prospective sellers.

SUMMARY OF THE INVENTION

The present invention is a methodology, system and business model for facilitating an online buyer's auction in which the major categories of transaction costs are significantly reduced by providing the buyer and the sellers with near-perfect information about one another.

The process is initiated by the buyer, who is assisted in creating a template that specifies her preferences to potential sellers. The buyer's request for an offer is based on a flexible "I want" that enables a fast, comprehensive search to be conducted to provide relevant feedback based on the buyer's preferences.

During the auction period, seller bots adjust the sellers' offers based on near perfect information about the buyer and the competition. This near perfect information can include detailed information about the buyer's current preferences, demographics, and previous buying history. In addition, it includes detailed information about competing sellers' offers. The offers are multidimensional, i.e. based on more than just price, which allows sellers to tailor their offers to the buyer. The use of seller bots enables fully automated submission of sellers' offers to the buyer in real time.

The system also provides an automated recommender to help the buyer identify the best offers according to the buyer's preferences.

The system provides the basis for an integrated solution to market intelligence, search, bargaining and transaction execution costs, thereby eliminating the integration costs of a piecemeal approach. In addition, the system provides the support for a revenue model for the sale of proprietary and non-proprietary marketing information derived from the auction.

BRIEF DESCRIPTION OF THE FIGURES

FIGS. 31-60 are diagrams illustrating exemplary computer displays seen by users of the present invention.

FIG. 31 is an exemplary user interface U100 in which a buyer enters a description of the product or service she wants to purchase.

FIG. 32 is an exemplary user interface U200 that displays research or advice requested by a buyer.

FIG. 33 is an exemplary user interface U300 that displays a buyer's priorities for product or service features.

FIG. 34 is an exemplary user interface U310 that lets a buyer choose the level of expert assistance provided to the buyer.

FIG. 35 is an exemplary user interface U400 that lets a buyer constrain her search.

FIG. 36 is another exemplary user interface U410 that lets a buyer constrain her search.

FIG. 37 is an exemplary user interface U500 that lets a buyer create an automated bot.

FIG. 38 is an exemplary user interface U600 that displays initial seller offers to a buyer.

FIG. 39 is an exemplary user interface U700 that displays value scores for seller offers.

FIG. 40 is an exemplary user interface U800 with a buyer registration form.

FIG. 41 is an exemplary user interface U810 that lets a buyer limit the number of seller offers displayed to the buyer.

FIG. 42 is an exemplary user interface U900 that displays a list of final adjusted offers along with a score for each offer.

FIG. 43 is an exemplary user interface U910 that includes value added products or services or other offers to enhance the overall offering to the buyer.

FIG. 44 is an exemplary user interface U1000 that lets a buyer execute a transaction.

FIG. 45 is an exemplary user interface U1100 that shows an adjusted offer evaluated with respect to a buyer's priorities.

FIG. 46 is an exemplary user interface U1200 that displays the results of a suggestion search.

FIG. 47 is an exemplary user interface U1300 that lets a buyer access information related to the buyer that is stored in a database.

FIG. 48 is an exemplary user interface U1310 that displays an archived record of a buyer's transactions.

FIG. 49 is an exemplary user interface U1320 that shows a report of a rewards program for a buyer.

FIG. 50 is an exemplary user interface U2000 that provides an overview to a seller, with links to sections discussing the rights and responsibilities accepted by the seller.

FIG. 51 is an exemplary user interface U2100 that illustrates possible types of affiliation.

FIG. 52 is an exemplary user interface U2200 that summarizes exemplary types of information available under each type of affiliation.

FIG. 53 is an exemplary user interface U2300 for specifying a seller's business rules.

FIG. 54 is an exemplary user interface U2400 for specifying a seller's loyalty program.

FIG. 55 is an exemplary user interface U3000 that shows information about an anonymous buyer that may be seen by a seller.

FIG. 56 is another exemplary user interface U3100 that shows information about an anonymous buyer that may be seen by a seller.

FIG. 57 is an exemplary user interface U3200 that shows records of posted offers that may be seen by a seller.

FIG. 58 is an exemplary user interface U3400 that shows records of adjusted offers that may be seen by a seller.

FIG. 59 is an exemplary user interface U3500 that displays the terms of an offer eventually accepted by a buyer.

FIG. 60 is an exemplary user interface U3600 that displays aggregate information about and analysis of auctions occurring during a certain time interval.

DETAILED DESCRIPTION

I. System Architecture

The architecture of a preferred embodiment of the invention is shown in block diagram form in FIGS. 1-22. The implementation of the architecture will be readily apparent to those skilled in the art because of the use of standard components and technologies, and need not be described in detail here because their use, functionality and interrelation will be readily apparent in the next section (System Operation).

Various aspects and features of the invention will now be described with respect to an exemplary embodiment of the invention as shown in FIGS. 1-22. However, this embodiment is just one of many possible alternatives. There are a variety of ways in which one of ordinary skill in the art might architect the invention, including combining many servers and databases into a more condensed architecture to utilize less physical hardware. Tradeoffs of serviceability, service availability, scalability and other reasons could lead a designer of ordinary skill in the art to architect the service in a different configuration than that described herein, without departing from the general spirit of the invention.

In addition, this technology could be implemented in whole or in part by third parties as a service, as an outsource service, as a desktop or server application or suite thereof, in a variety of manners that are well known to those of ordinary skill in the art and which need not be described further here.

Figure 1:
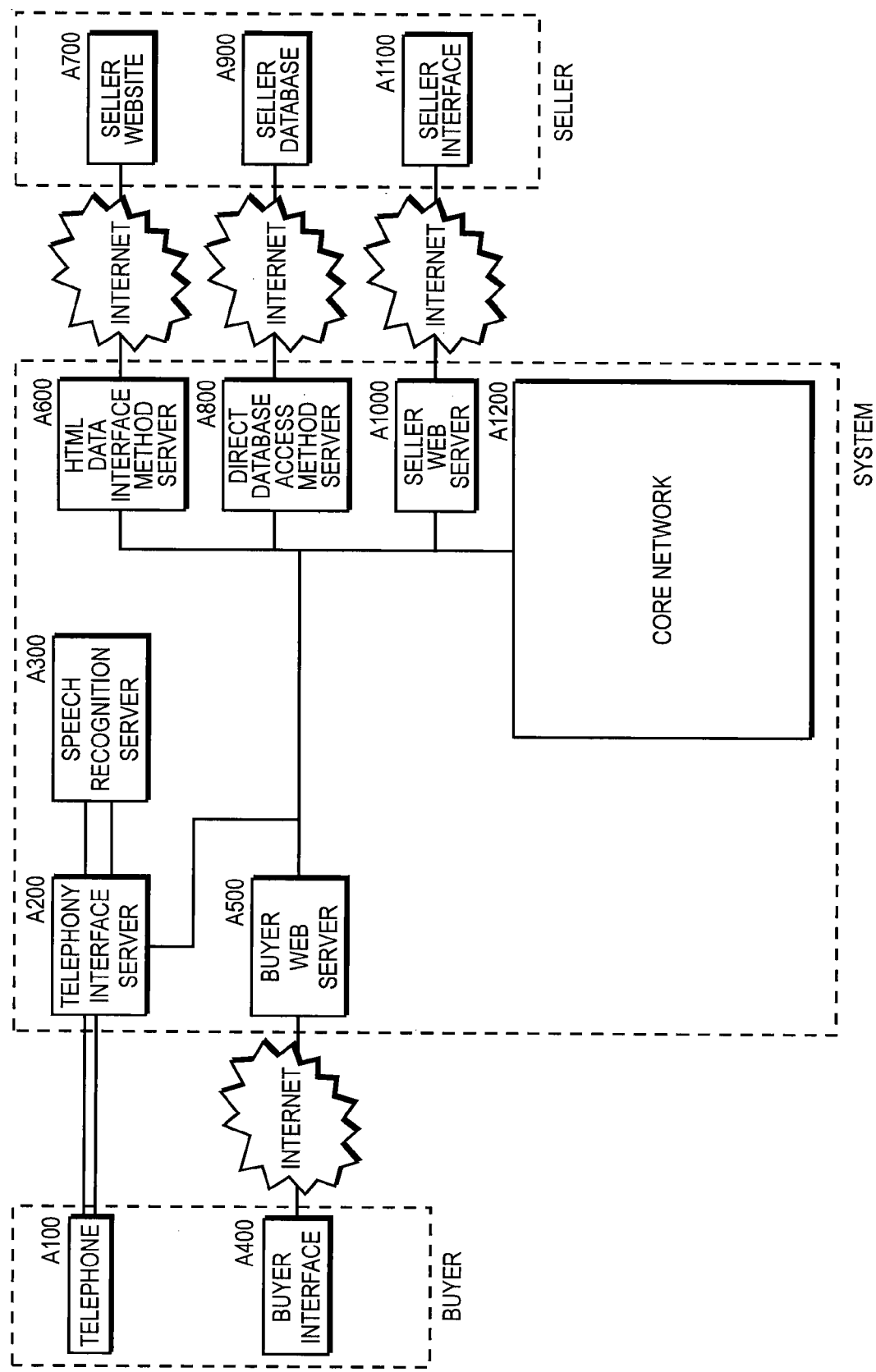
FIG. 1 is a block diagram illustrating the overall structure of the present invention.
Figure 2:
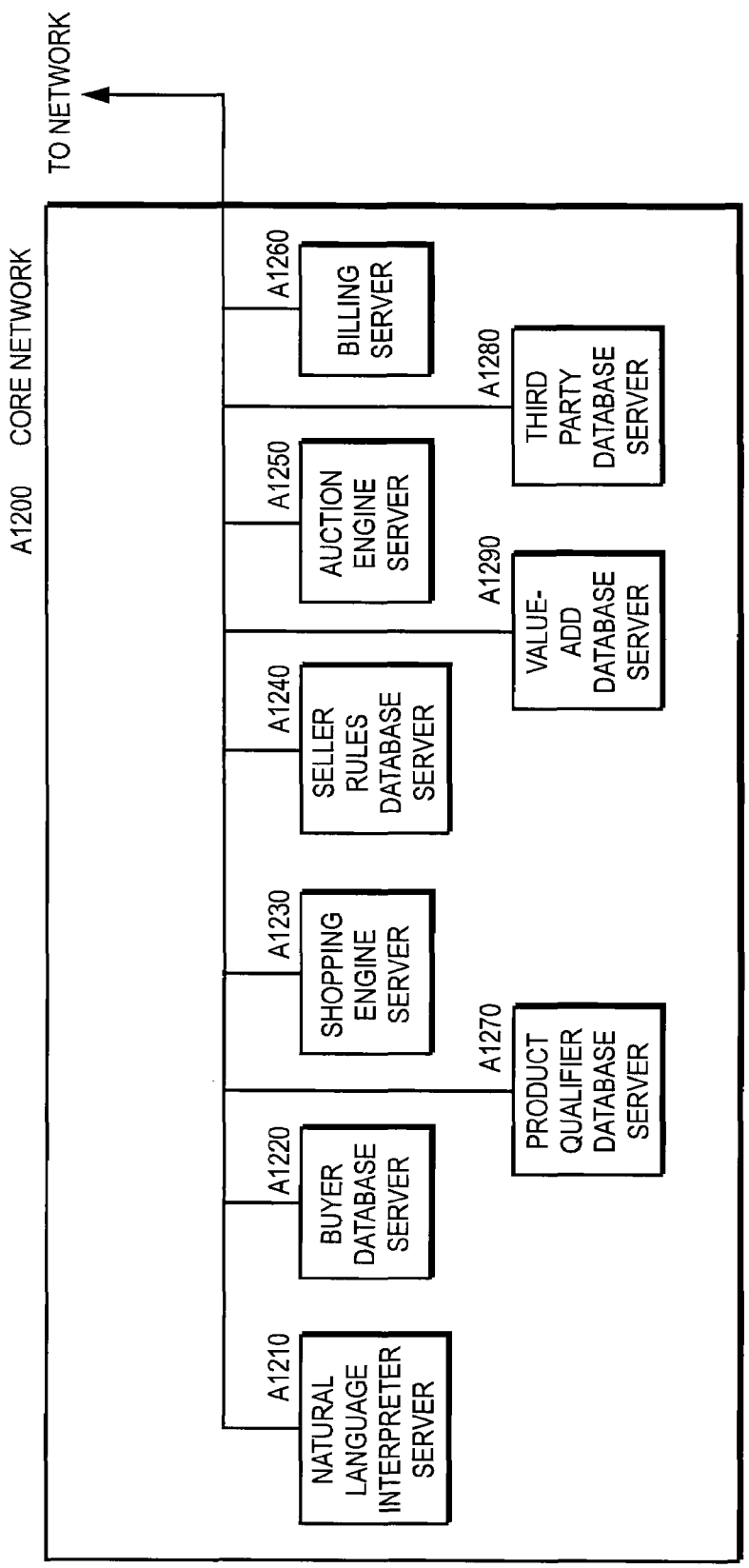
FIG. 2 is a block diagram illustrating one embodiment of the core network.
Figure 3:
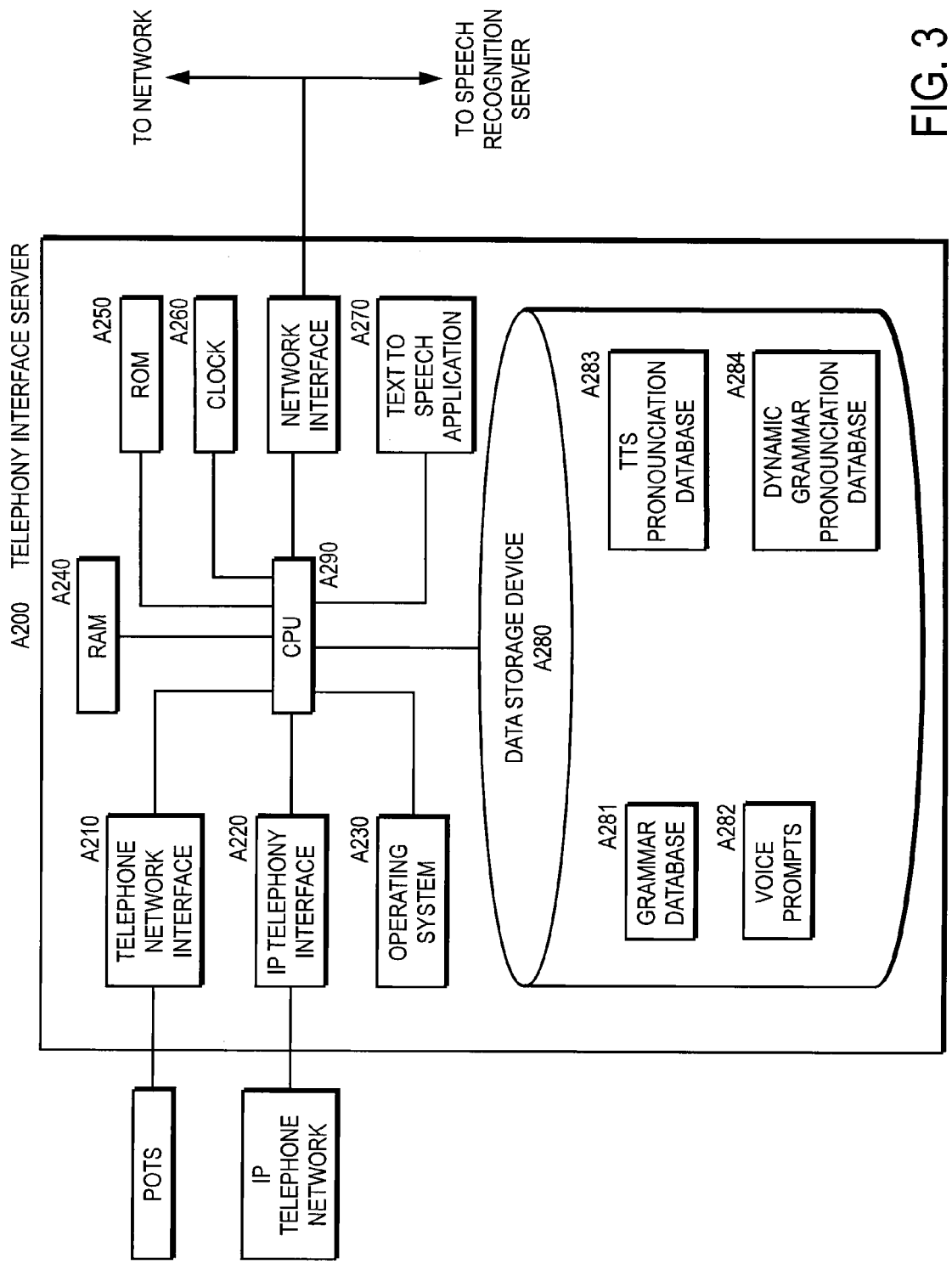
FIGS. 3-22 are block diagrams illustrating exemplary embodiments of the individual components of the present invention.
Figure 4:
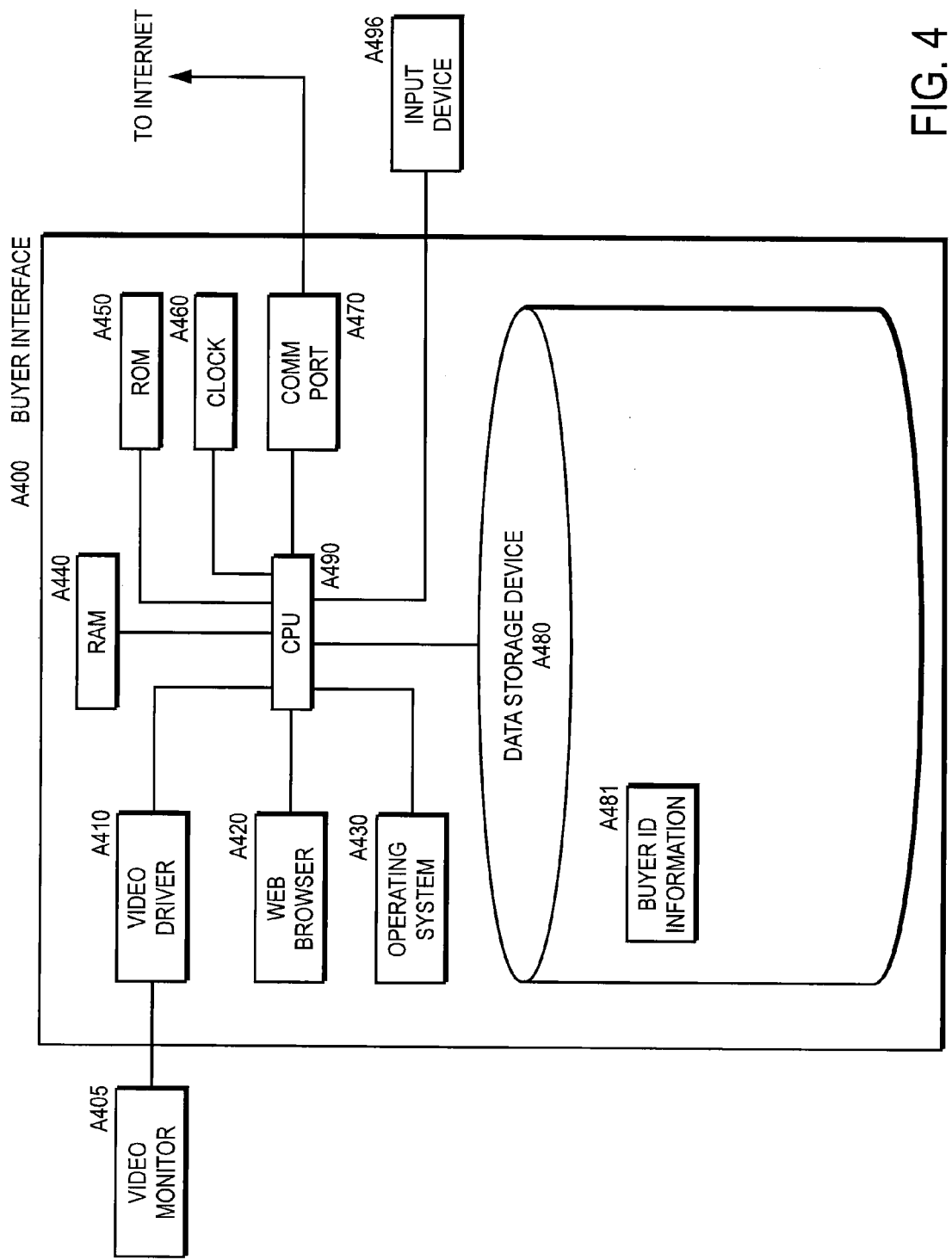
Figure 5:
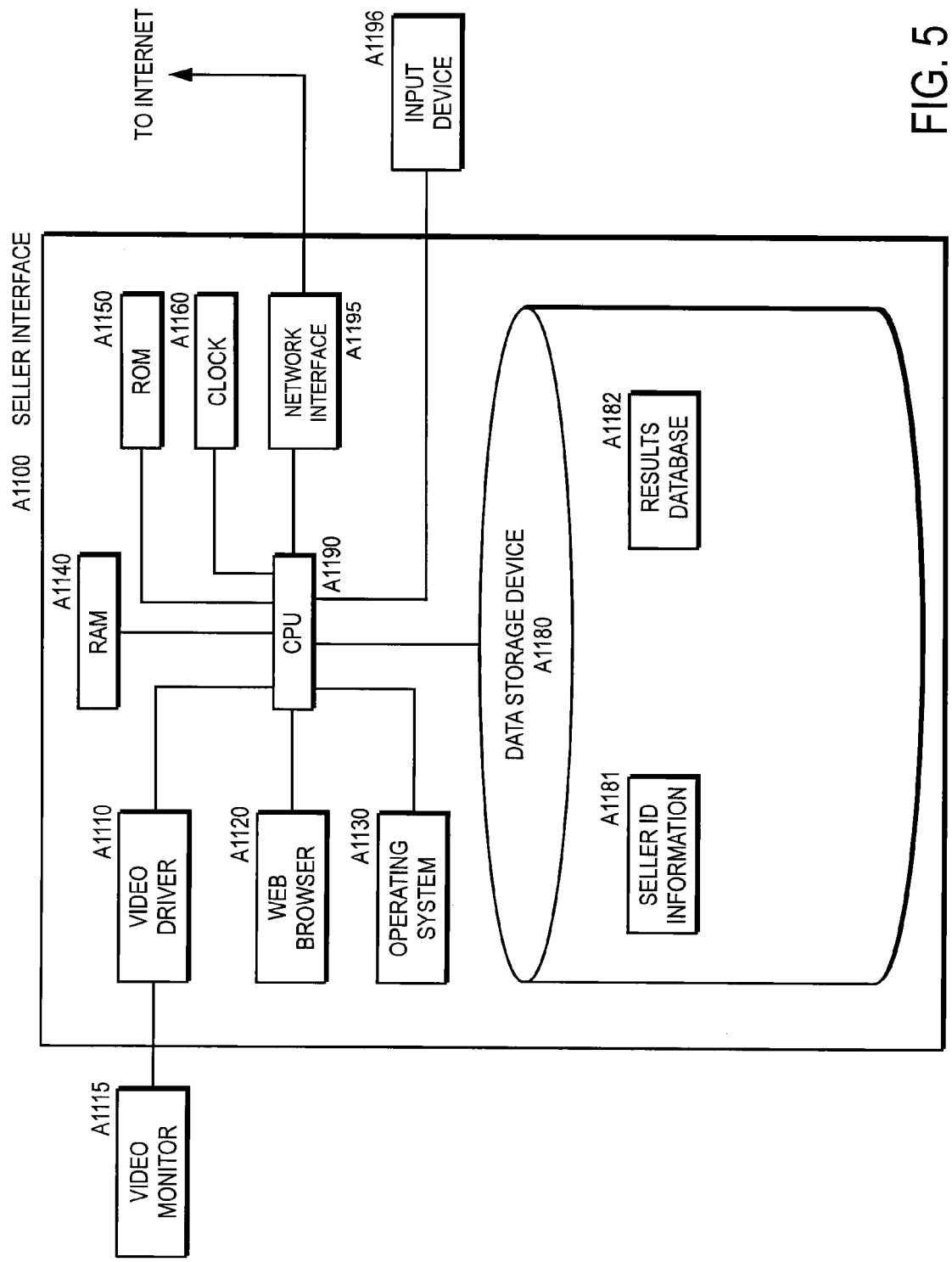
Figure 6:
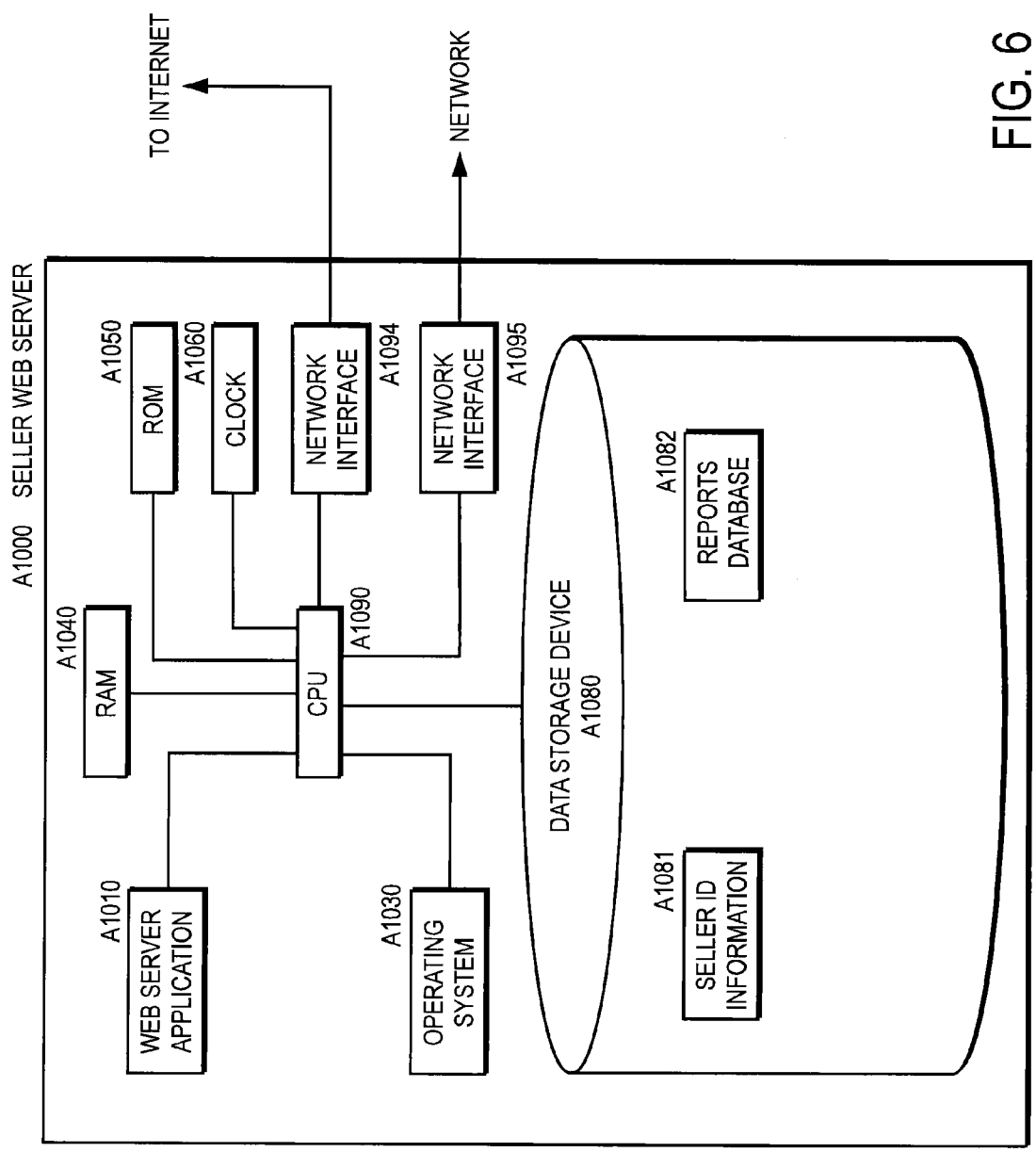
Figure 7:
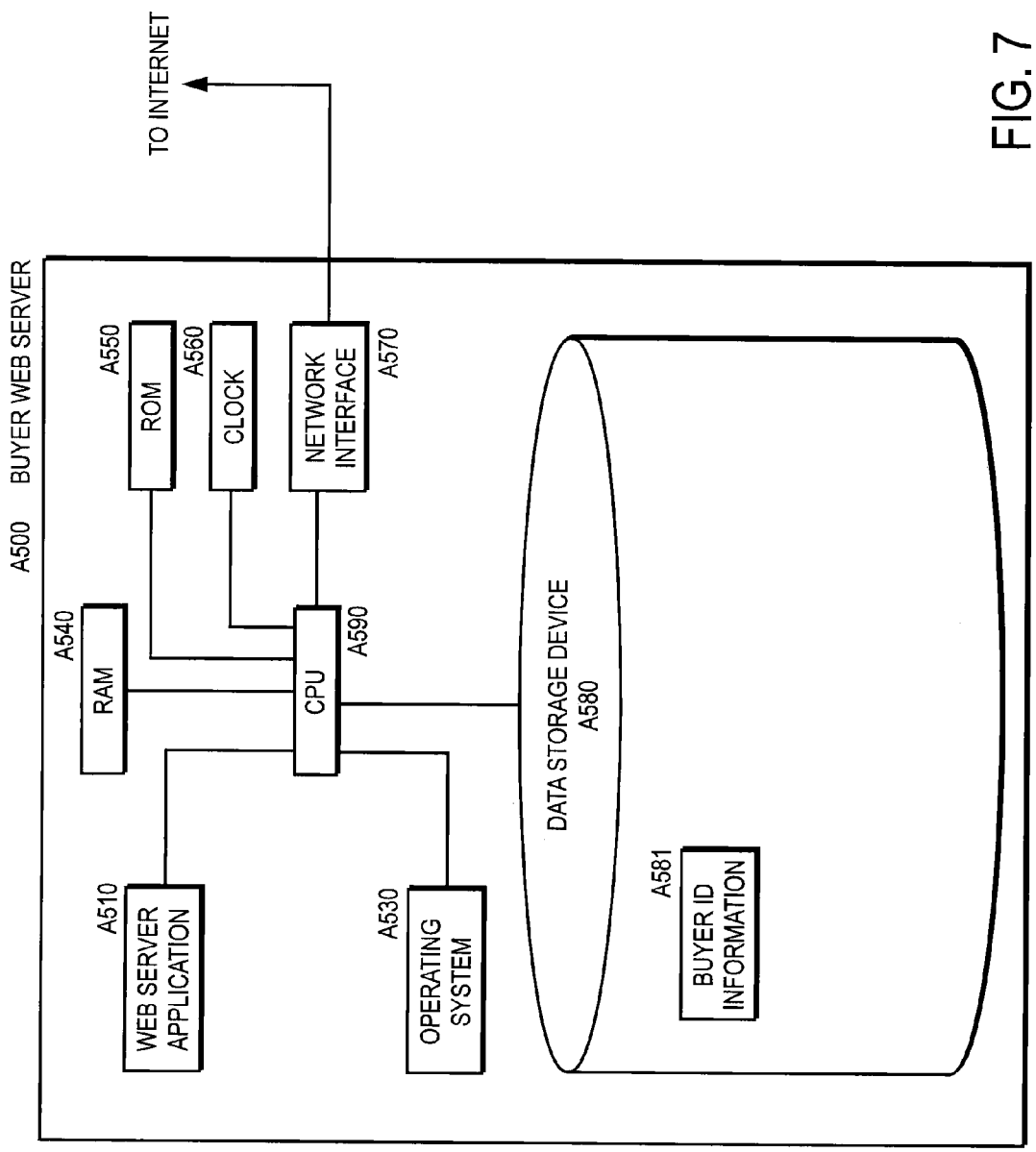
Figure 8:
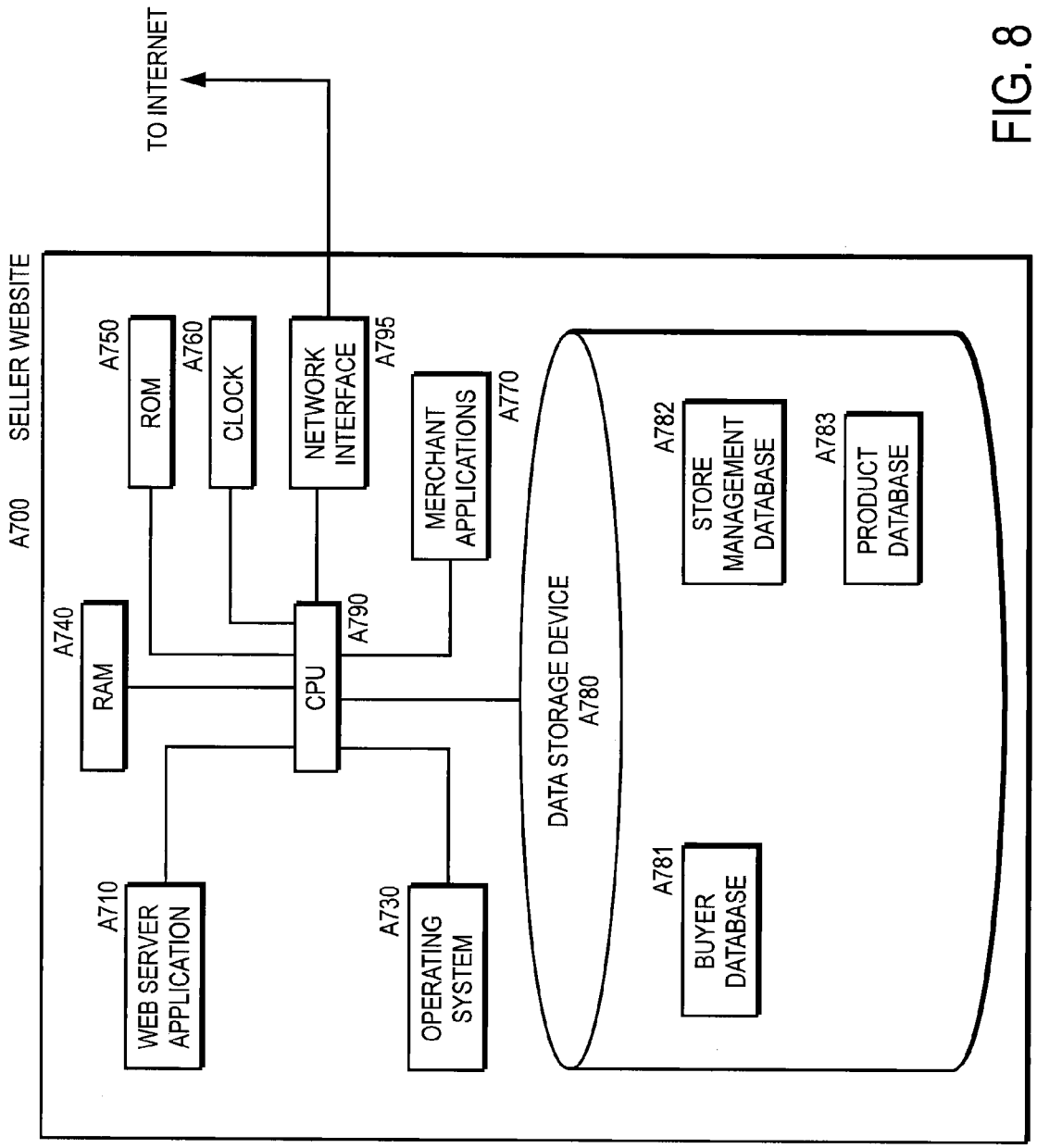
Figure 9:
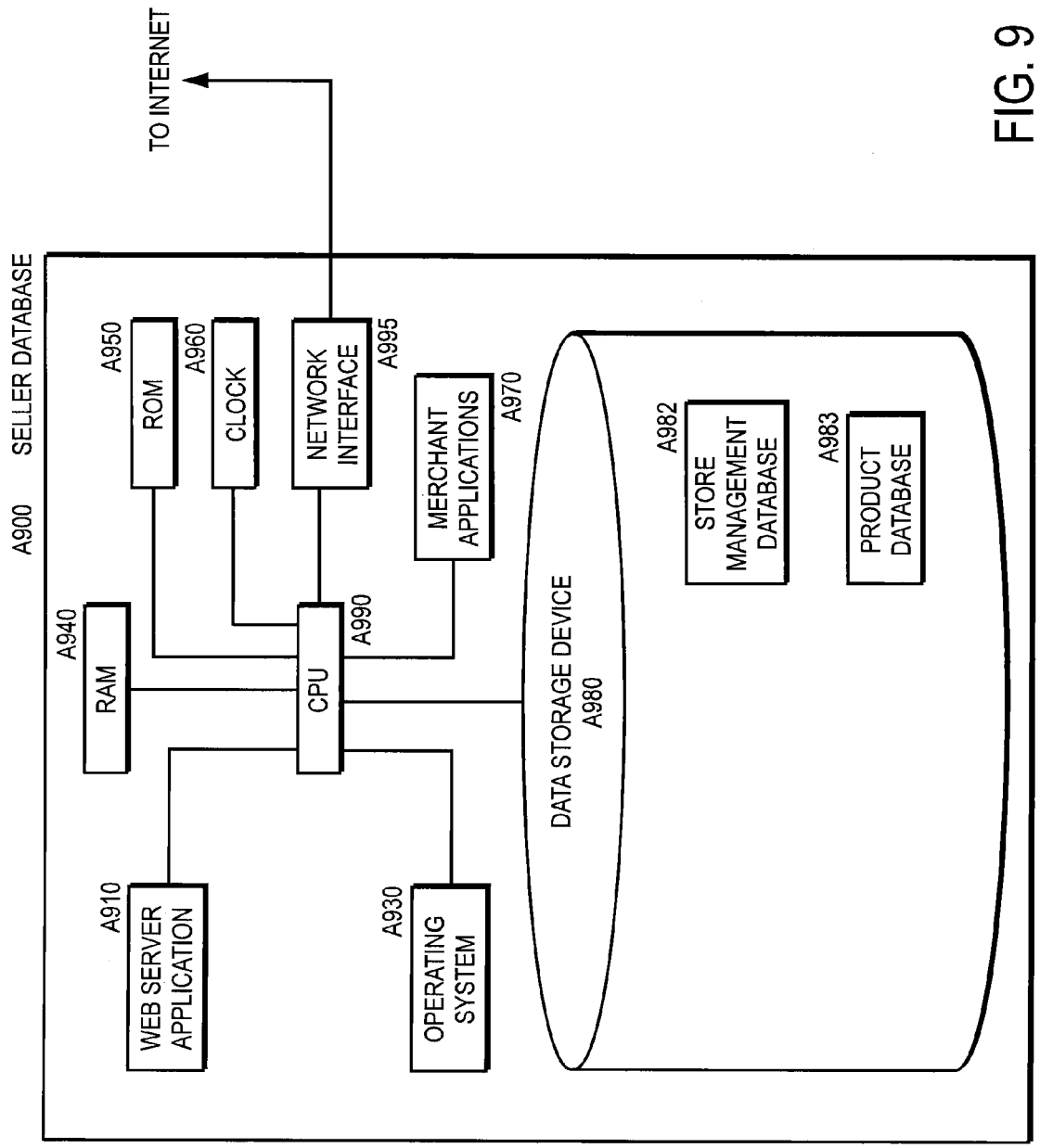
Figure 10:
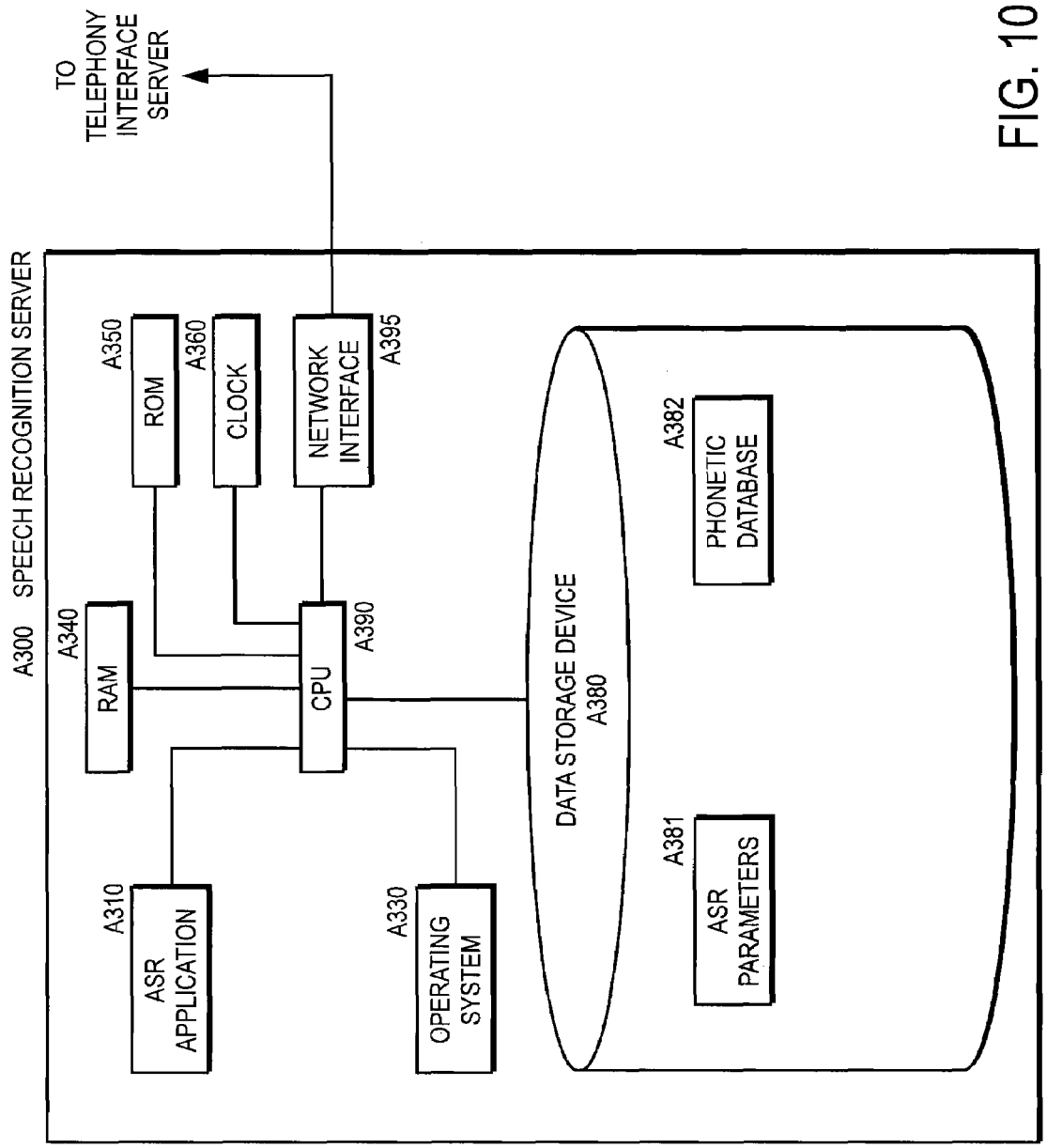
Figure 11:
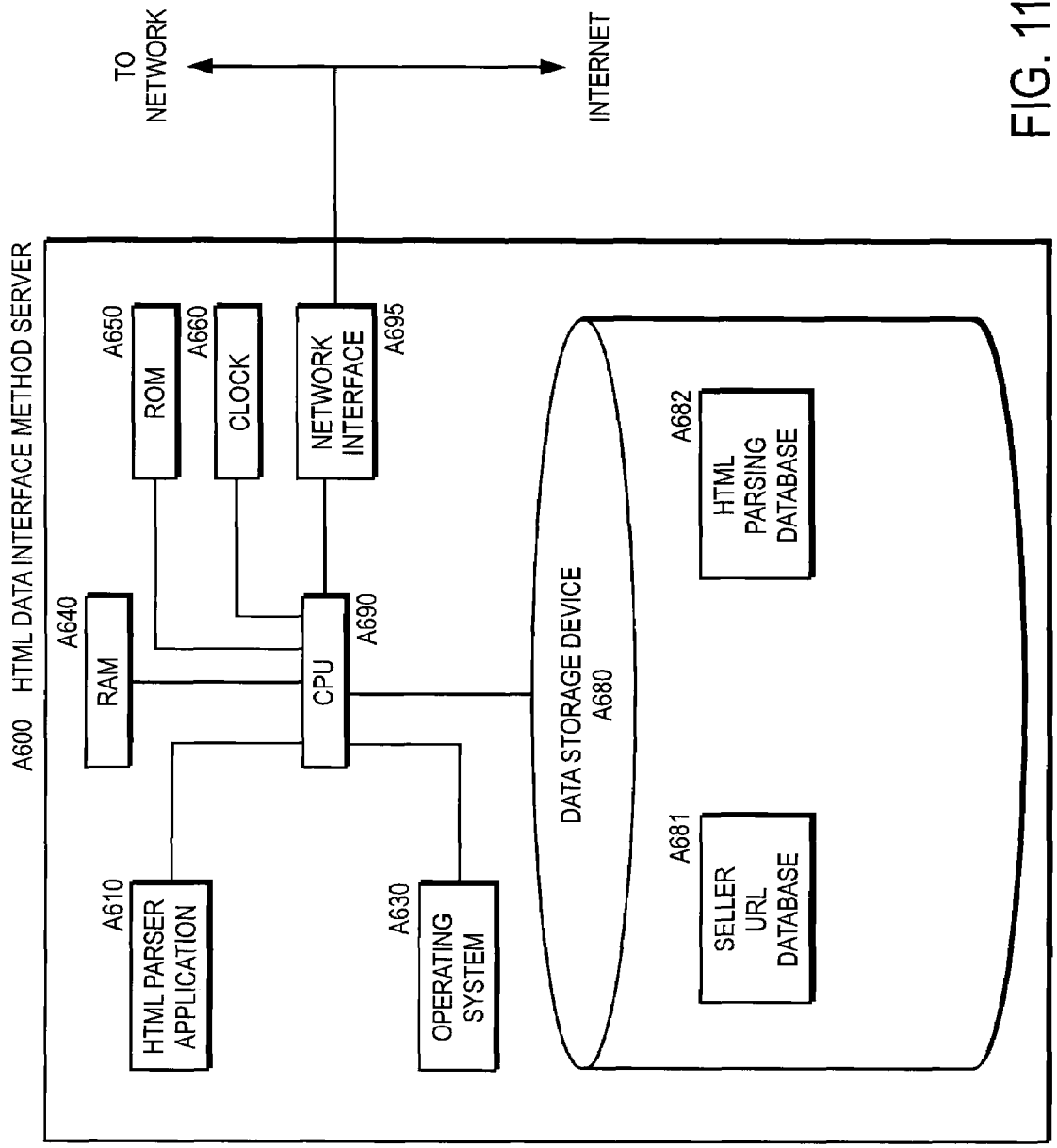
Figure 12:
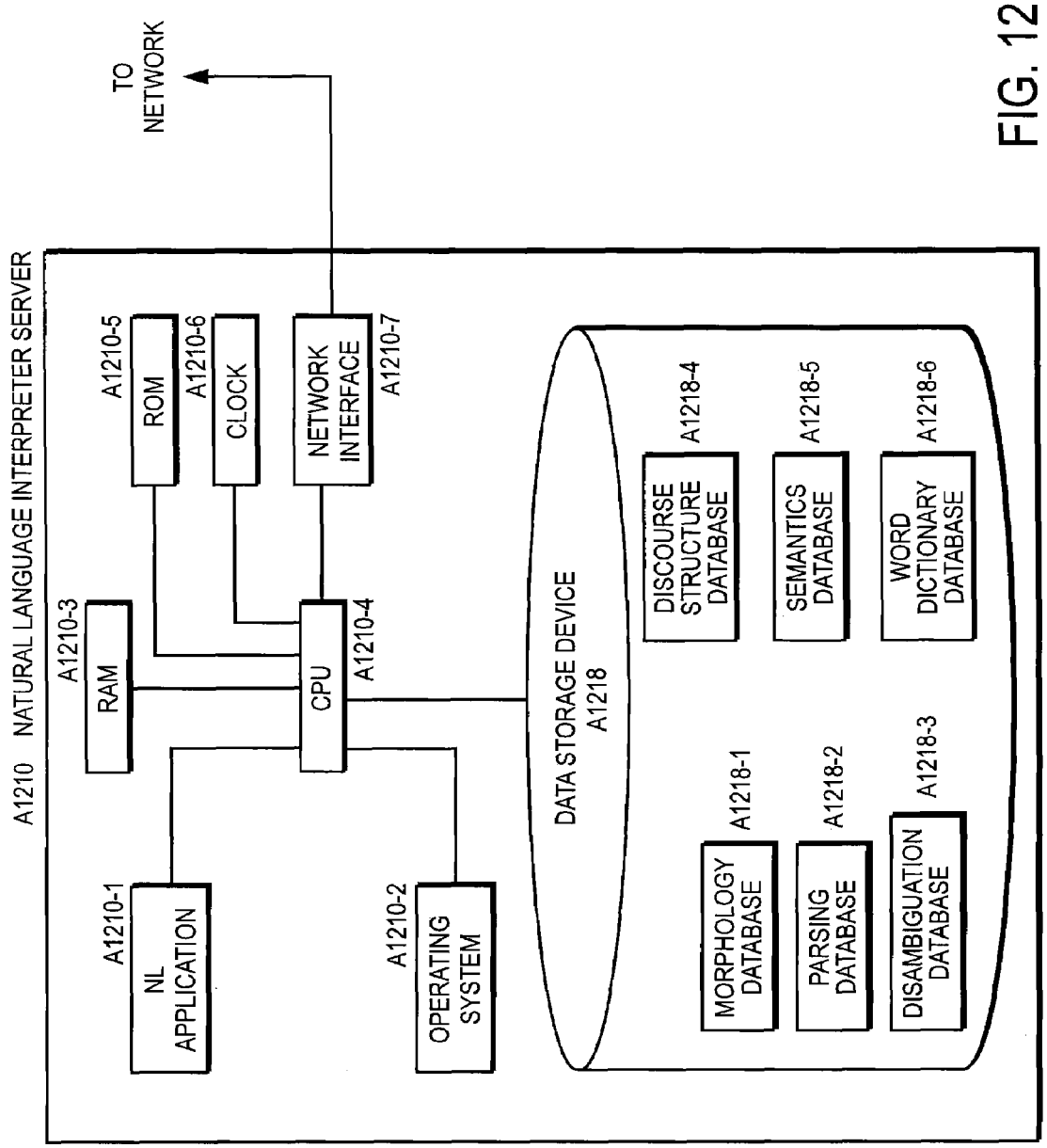
Figure 13:
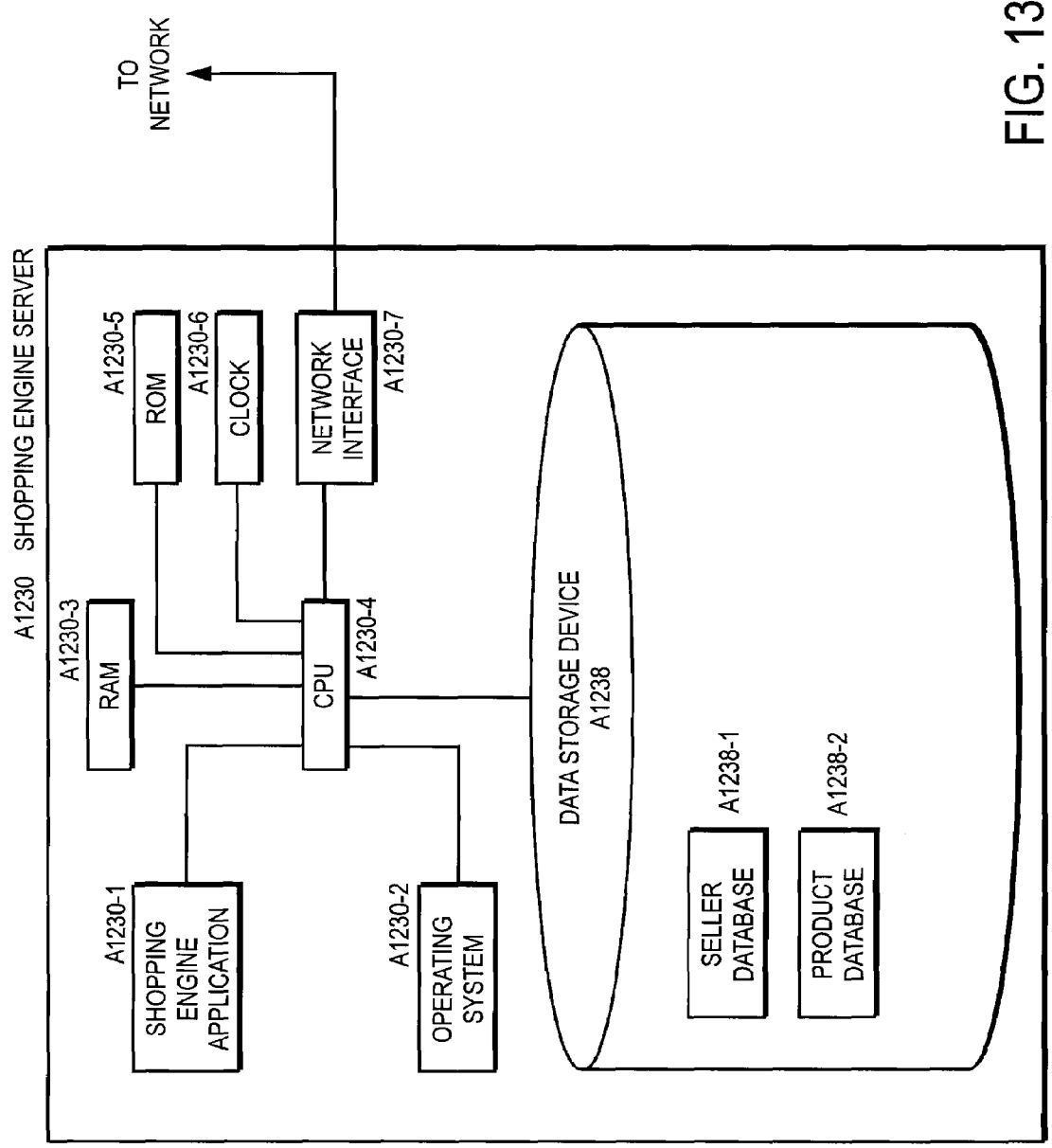
Figure 14:
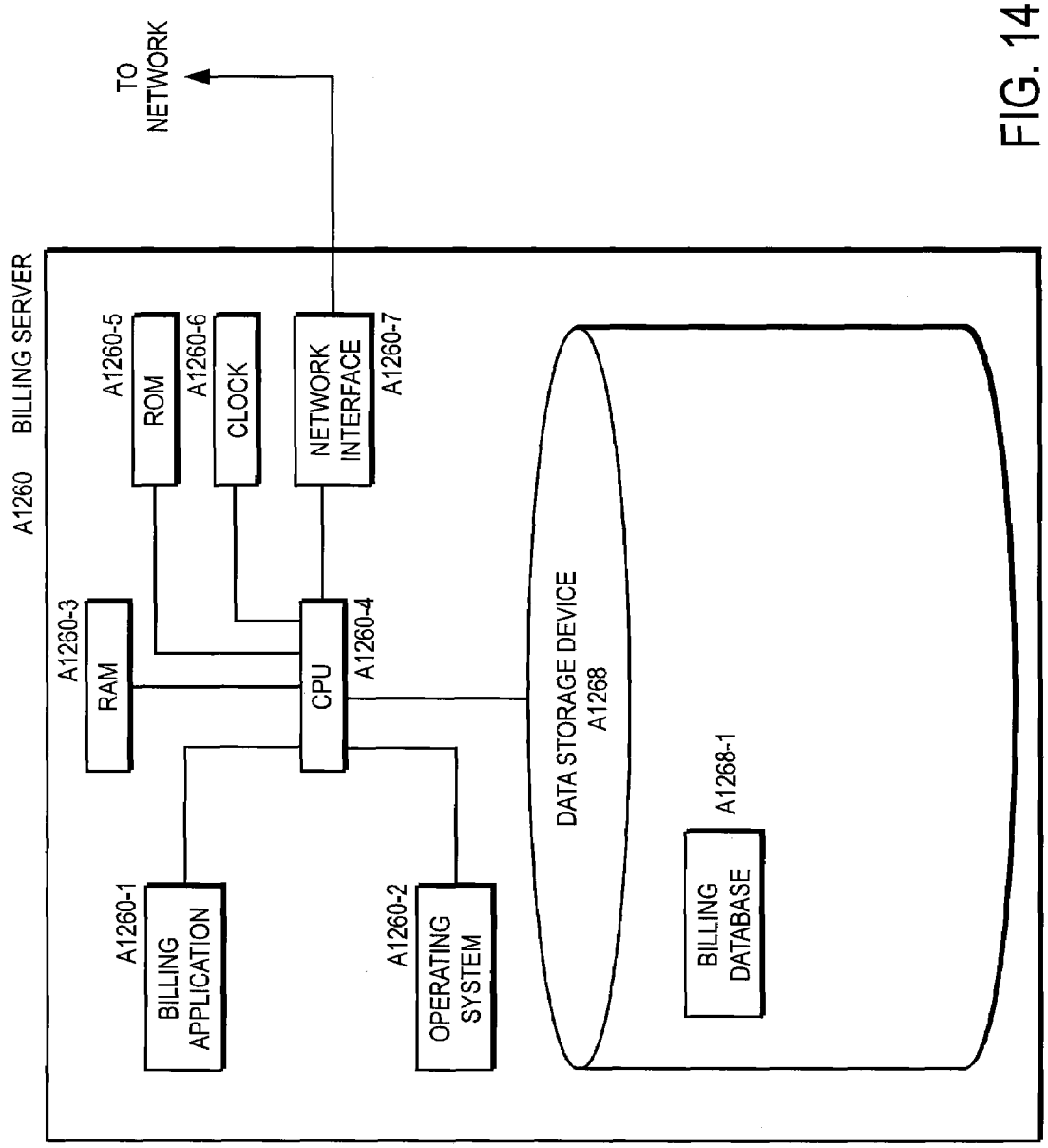
Figure 15:
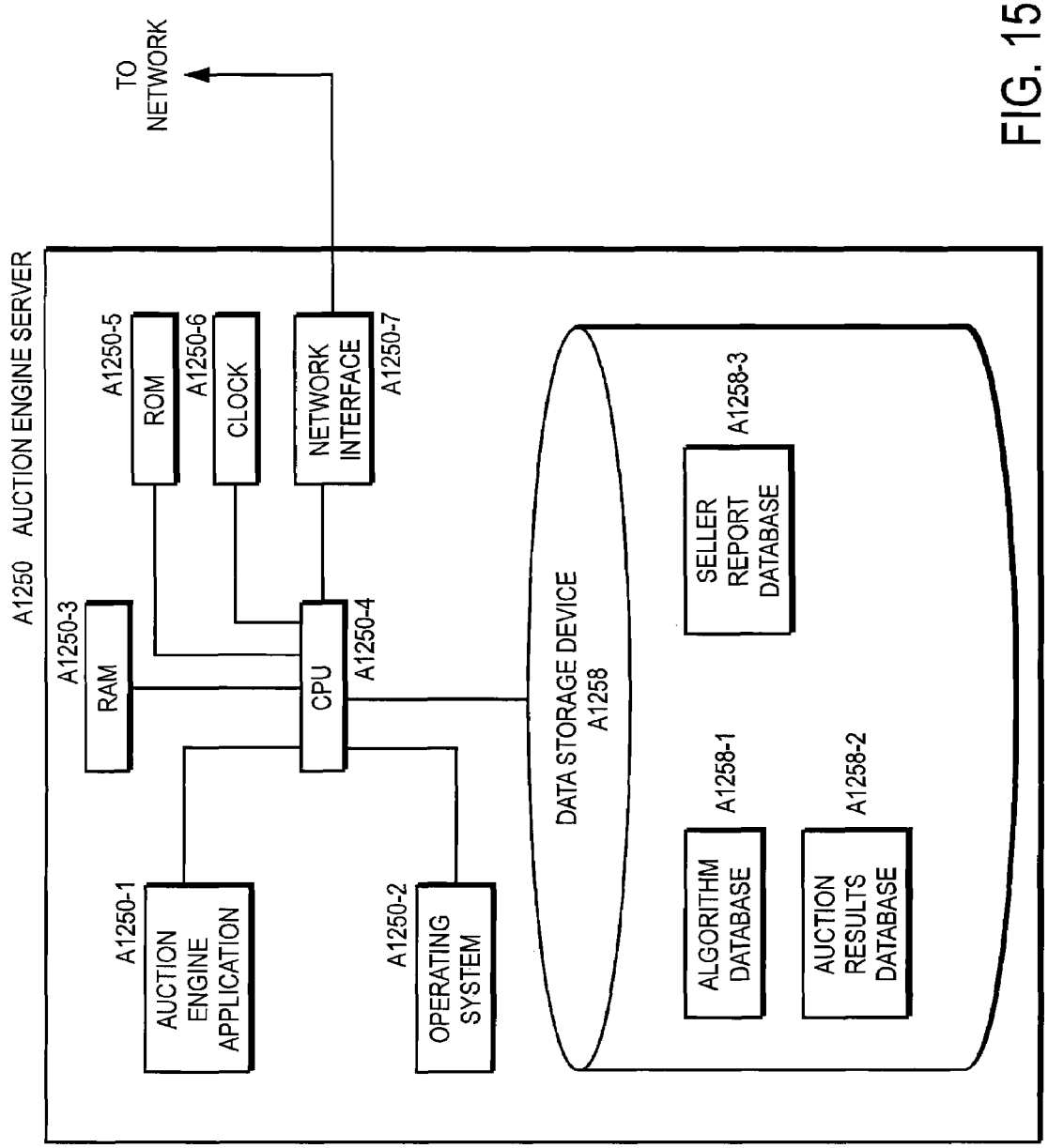
Figure 16:
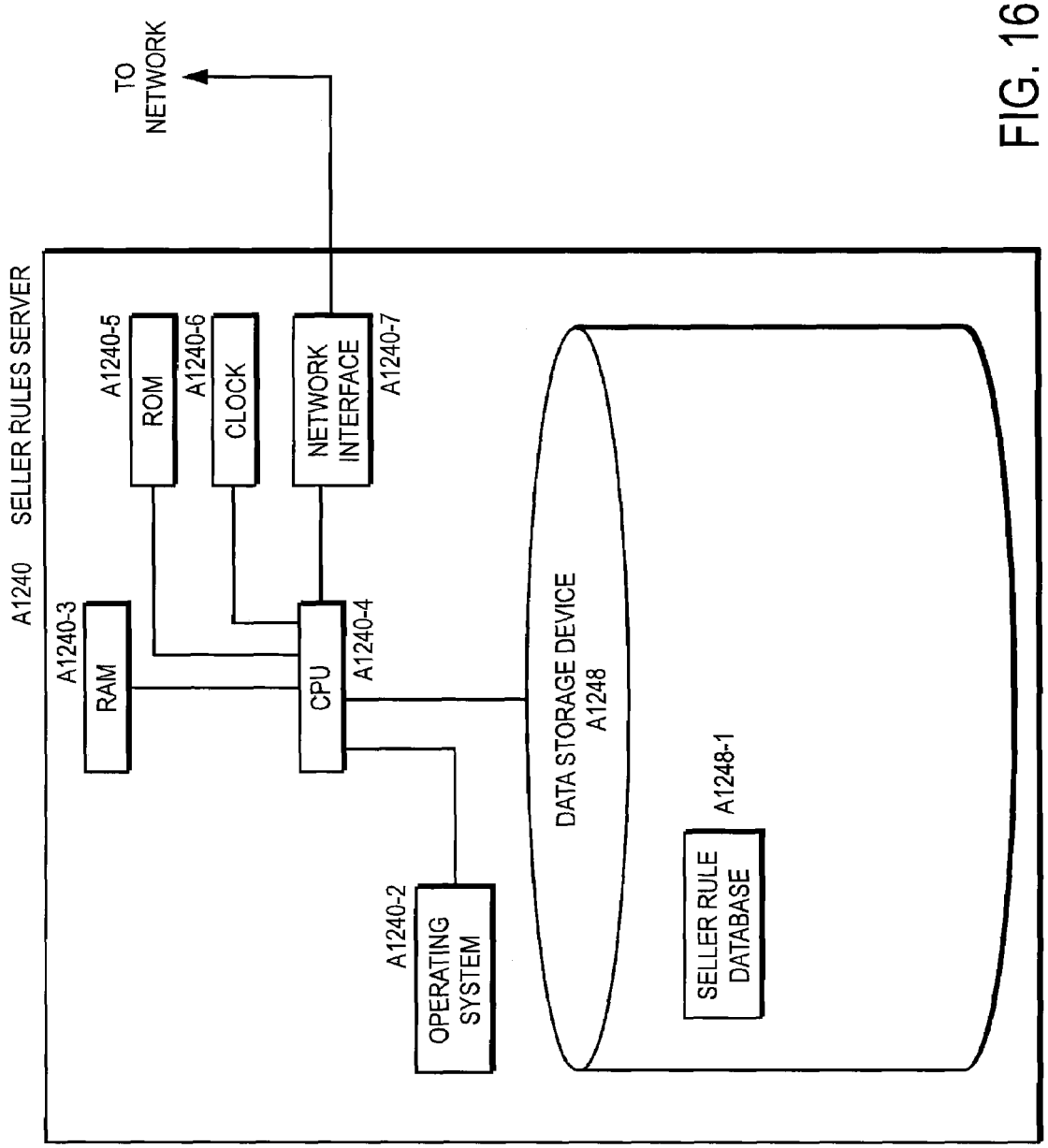
Figure 17:
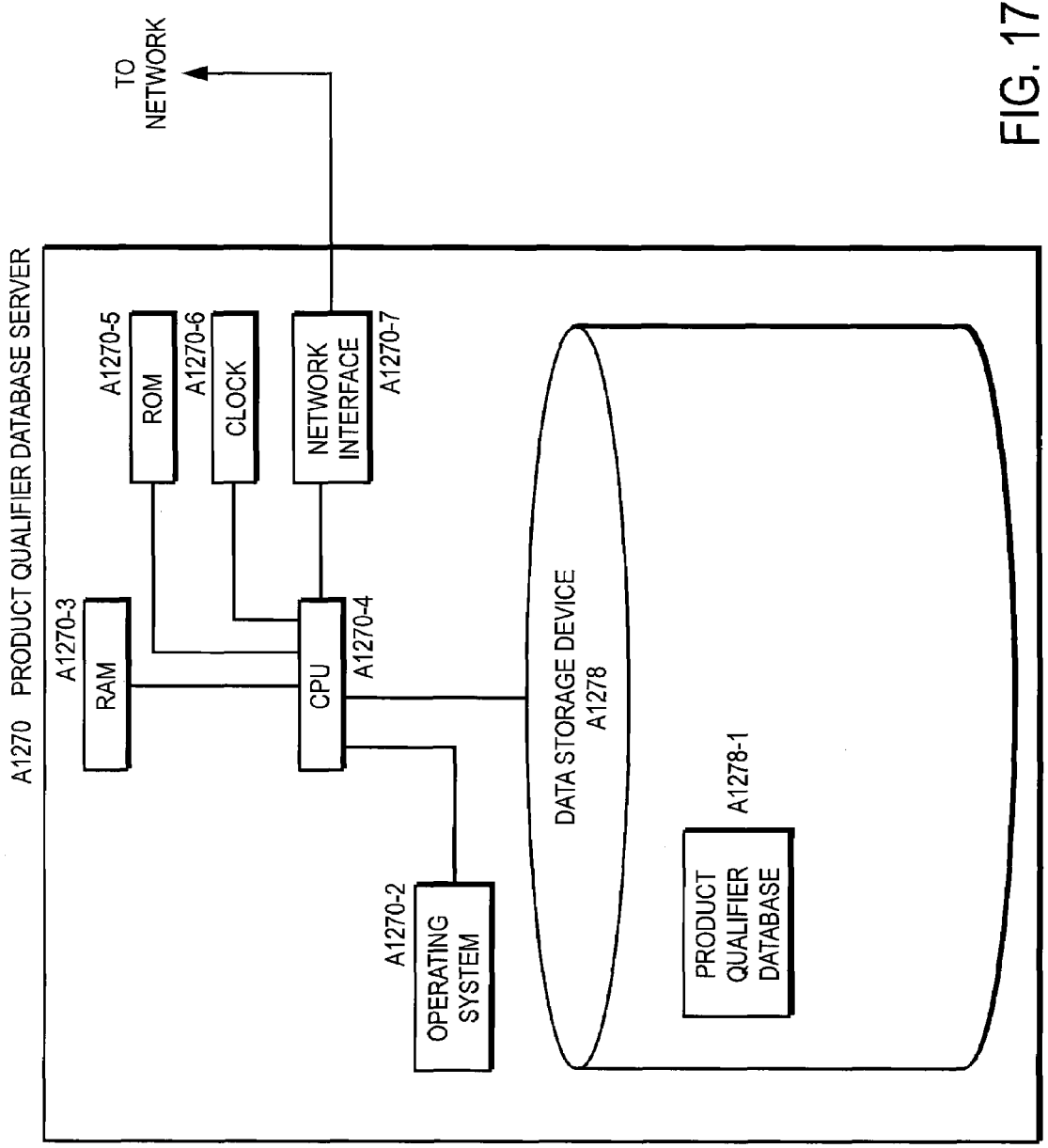
Figure 18:
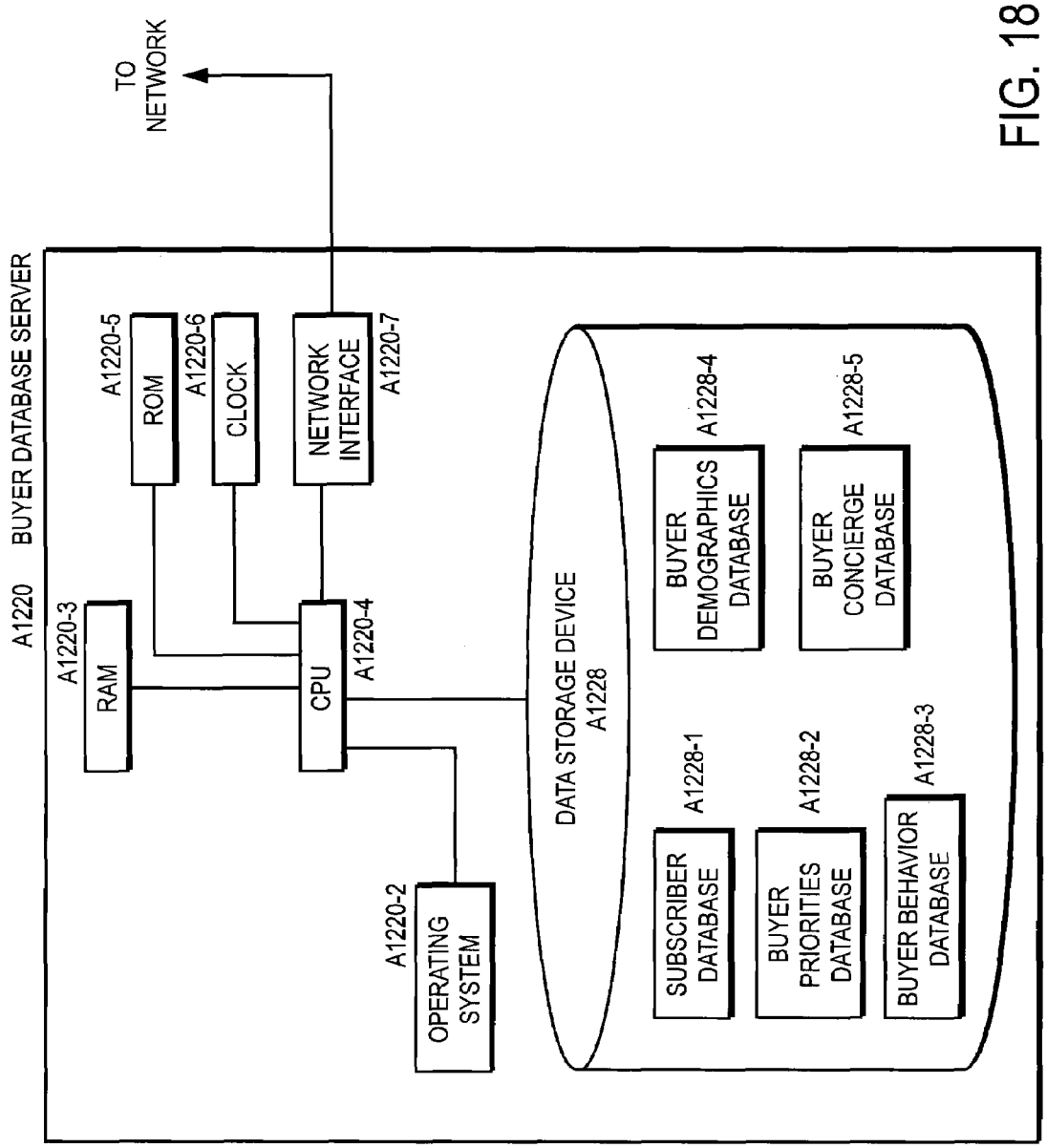
Figure 19:
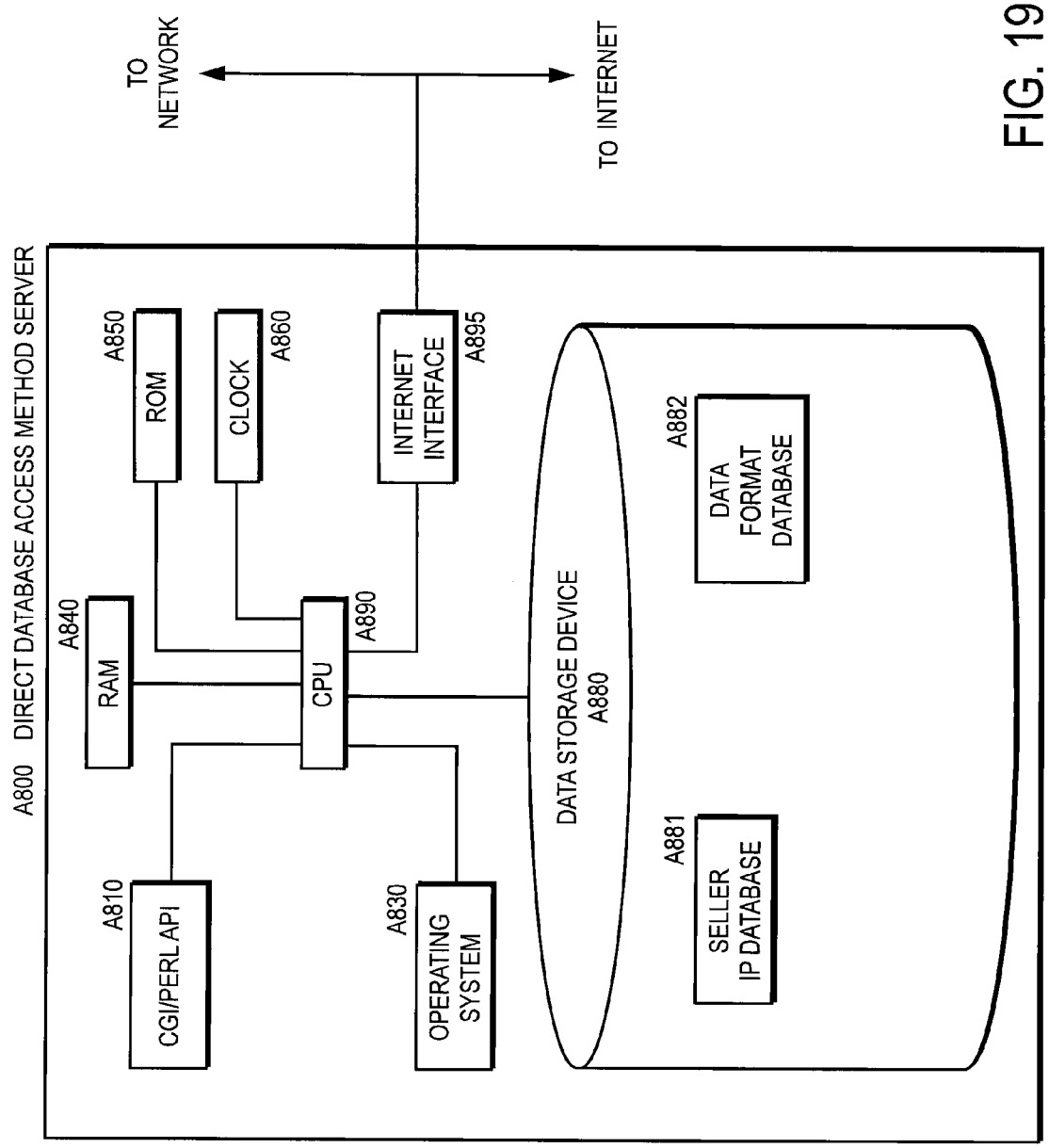
Figure 20:
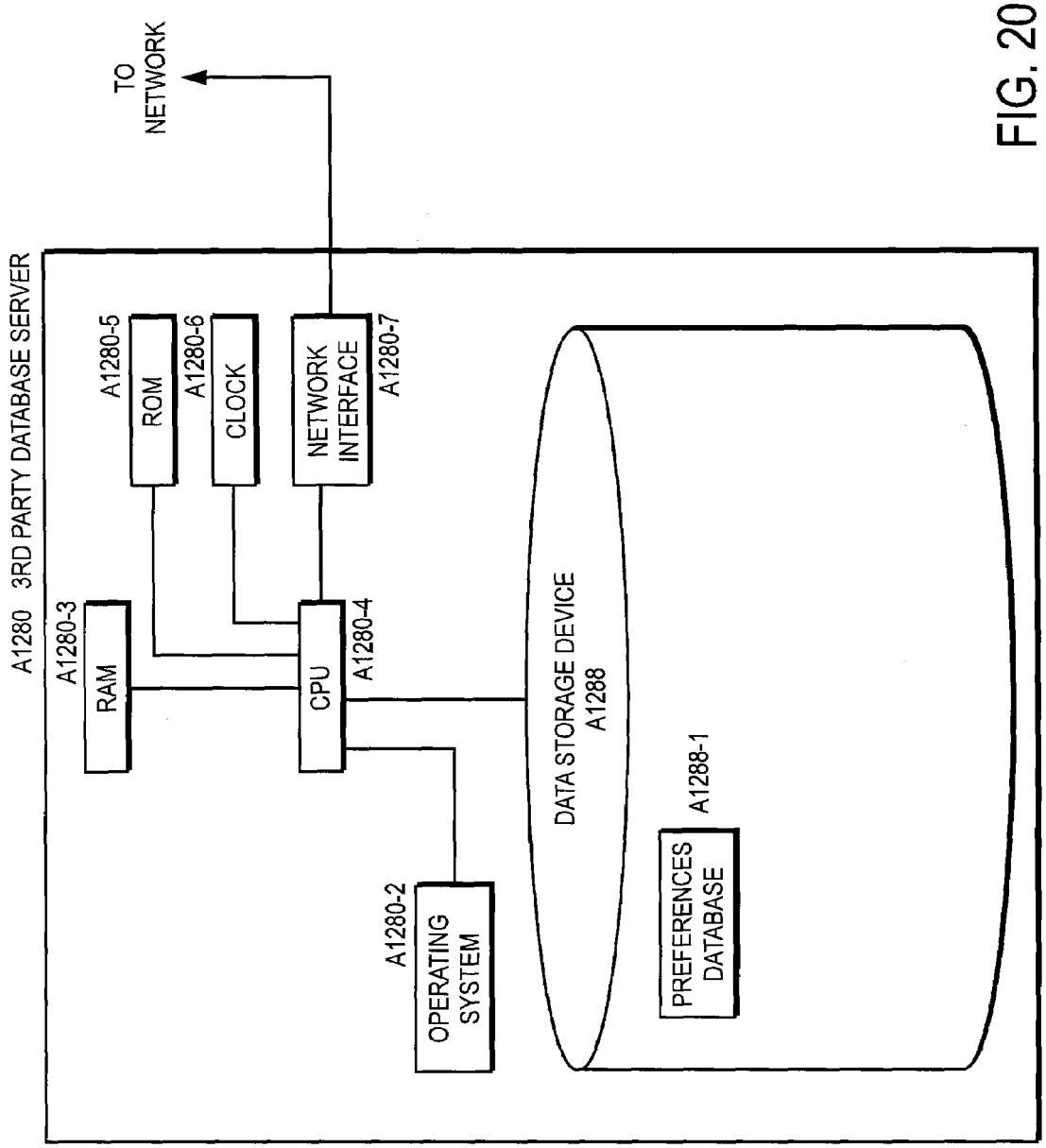
Figure 21:
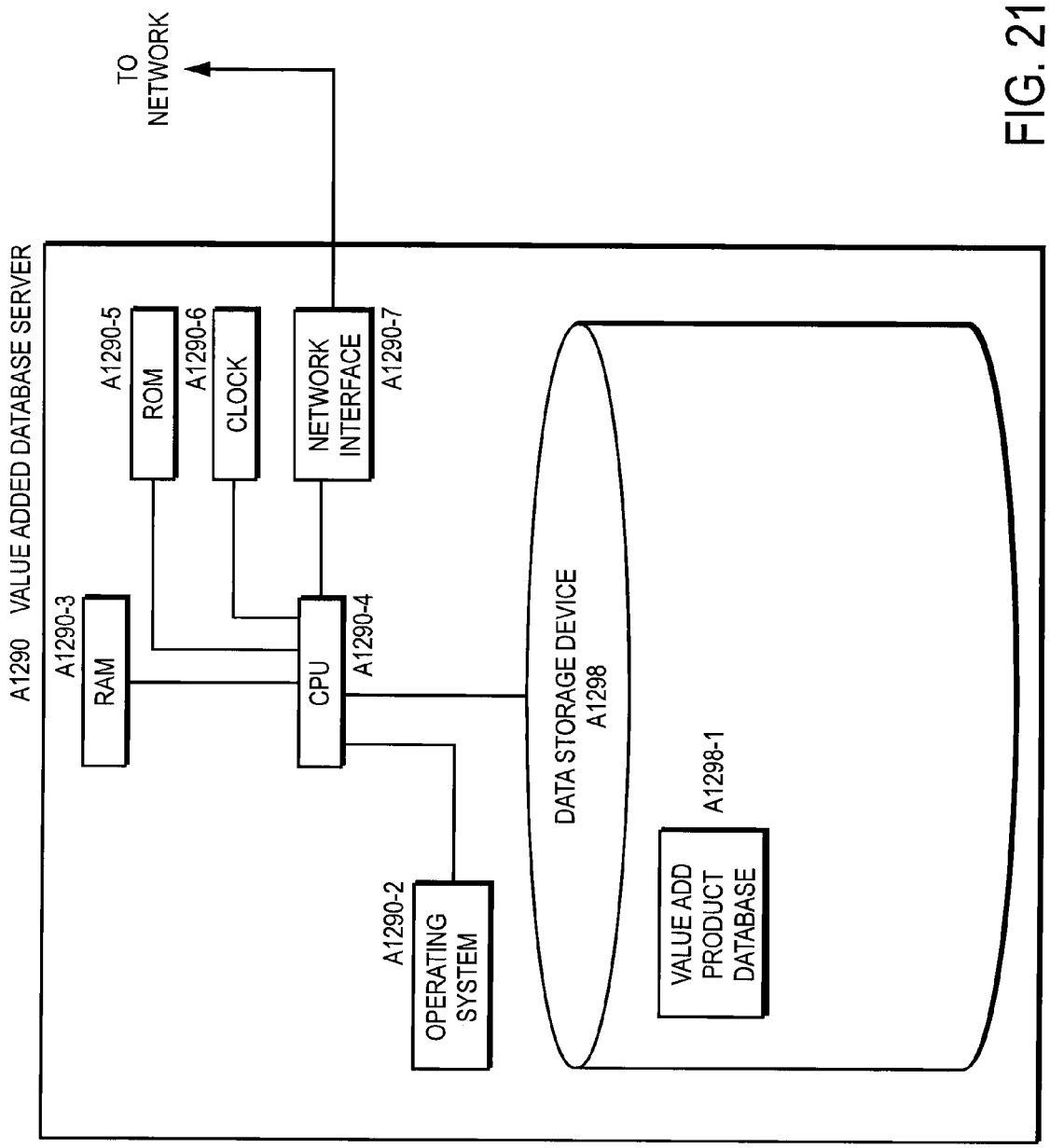
Figure 22:
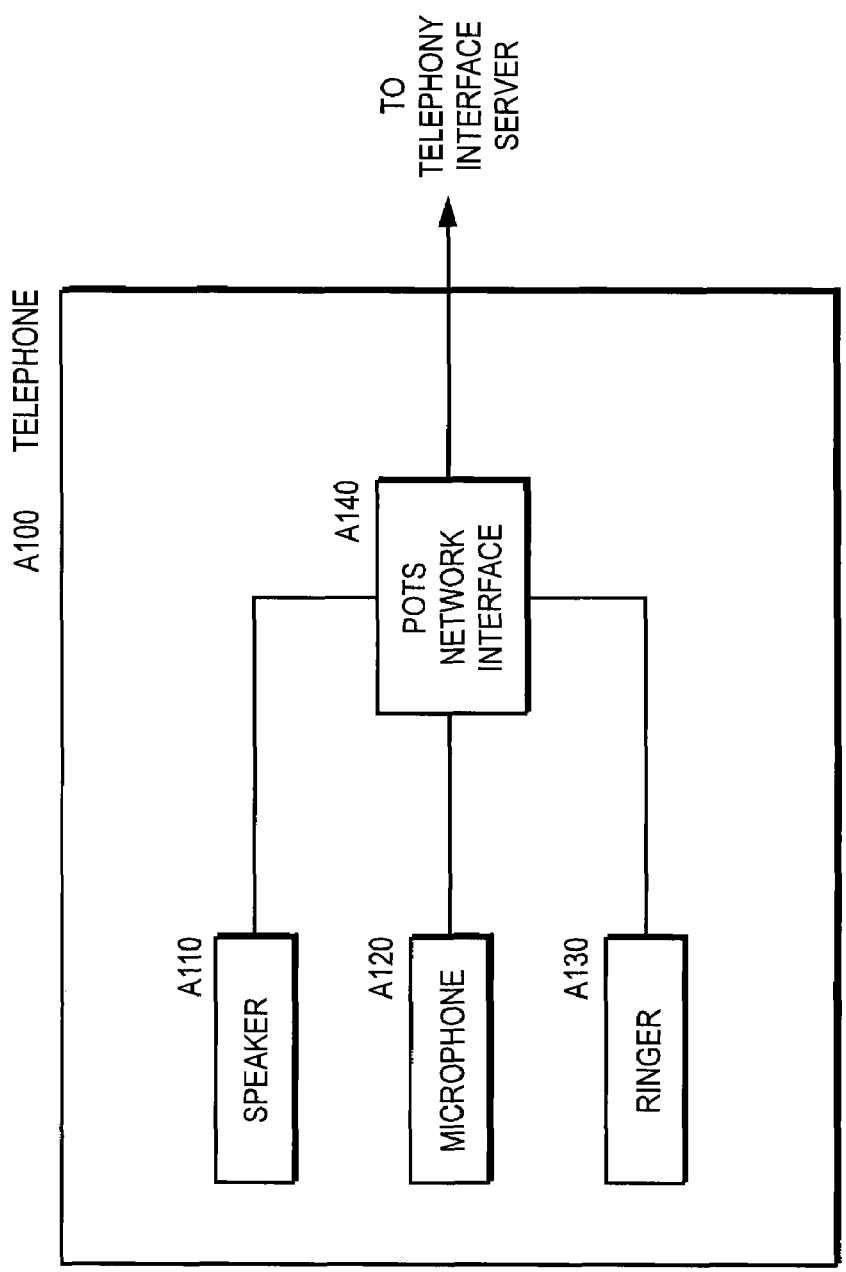

Referring now to FIG. 1, TELEPHONE A100 is a standard telephone attached to a telephone service (but could also be implemented as an IP based telephone, wireless telephone, satellite telephone, or other similar devices which generally include a speaker and a microphone).

In this embodiment TELEPHONY INTERFACE SERVER A200 includes a telephone interface card (such as those from Dialogic or NMS) as well as central processing unit (CPU), memory, disk drive, operating system, network adapter (such as Ethernet) and other components typical of network servers. This server provides access to the telephone system using T1 or analog lines, but could also provide access through voice over IP. The server typically has the capability to ring (place calls) as well as answer telephone lines. It can receive and capture electronically, typically with .wav or similar file types, what the buyer is saying and either store this information, or send it to the SPEECH RECOGNITION SERVER A300 which can interpret the spoken material and compare it against a known grammar. Of course, A200 and A300 could easily be combined into a single physical server.

BUYER INTERFACE A400 is typically a standard computer, such as those which run the Microsoft Windows or Apple Macintosh operating systems, but could also be a network computer (a simple terminal with a small operating system), a screen based telephone, a WebTV box (or similar), a hand-held computer with remote communication capability, or other devices which could be used to interface with information on the World Wide Web of the Internet. Such devices may use a modem (line, cable, satellite, ADSL, wireless etc.) or network adapter to a Local Area Network connected to the Internet, to interface with information on the Internet. The BUYER INTERFACE A400 may use an Internet Service Provider to connect to the Internet, but may utilize other means as well. A buyer would typically utilize such a device in order to view and interact with web pages.

INTERNET as referred to in the drawings includes a worldwide network of interconnections and routers connecting computers and databases worldwide, which is also typically accessible locally by Internet Service Providers and other means.

BUYER WEB SERVER A500 is a standard server that serves web pages (which may contain HTML, Java, ActiveX and other constructs). Such servers may run applications such as Apache, Microsoft IIS, Netscape SuiteSpot, or other web server software. It is used to provide access to web pages to buyers and others using BUYER INTERFACE A400 or the like.

HTML DATA INTERFACE METHOD SERVER A600 is used to interface with the SELLER WEBSITE A700 by reading HTML and other web pages utilizing the Internet or by other well known methods to send and receive such data. It has a CPU, memory, disk drive, operating system, network adapter (such as Ethernet) and other components typical of network servers.

SELLER WEB SITE A700 is a standard server that serves web pages (which may contain HTML, Java, ActiveX and other constructs). Such servers may run applications such as Apache, Microsoft IIS, Netscape SuiteSpot, or other web server software. It allows users of the INTERNET to access sellers' websites.

DIRECT DATABASE ACCESS METHOD SERVER A800 is used to interface directly with the seller database A900 using the Internet or other methods to send and receive such data. It has a CPU, memory, disk drive, operating system, network adapter (such as Ethernet) and other components typical of network servers.

SELLER WEB SERVER A1000 is a standard server which serves web pages (which may contain HTML, Java, ActiveX and other constructs). Such servers may run applications such as Apache, Microsoft IIS, Netscape SuiteSpot, or other web server software. It is used to provide access to web pages to sellers using SELLER INTERFACE A1100 or the like.

SELLER INTERFACE A1100 is typically a standard computer, such as those which run the Microsoft Windows or Apple Macintosh operating systems, but could also be a network computer (a simple terminal with a small operating system), a screen based telephone, a WebTV box (or similar) or other devices which could be used to interface with information on the World Wide Web of the Internet. Such device may use a modem (line, cable, satellite, ADSL, wireless etc.) or network adapter to a Local Area Network connected to the Internet, to interface with information on the Internet. The SELLER INTERFACE A1100 may use an Internet Service Provider to connect to the Internet, but may utilize other means as well. A seller would typically utilize such a device in order to view and interact with web pages.

CORE NETWORK A1200 contains most of the database and other servers directly involved in running the auction and other parts of the service.

NATURAL LANGUAGE INTERPRETER SERVER A1210 contains a CPU, memory, disk drive, operating system, network adapter (such as Ethernet) and other components typical of network servers, as well as a natural language interpreter application and several databases required for understanding natural language.

BUYER DATABASE SERVER A1220 contains a CPU, memory, disk drive, operating system, network adapter (such as Ethernet) and other components typical of network servers, as well as a database application (such as those from Oracle). Buyer information, such as buyer demographics, buyer behavior, open profile standard data etc., is stored and retrieved here.

PRODUCT QUALIFIER DATABASE SERVER A1270 contains a CPU, memory, disk drive, operating system, network adapter (such as Ethernet) and other components typical of network servers, as well as a database application (such as those from Oracle). It contains information on categories used to qualify products (such as those from Consumer Reports or other sources of product and service reviews).

SHOPPING ENGINE SERVER A1230 contains a CPU, memory, disk drive, operating system, network adapter (such as Ethernet) and other components typical of network servers, as well as a web-based shopping engine application, and also may contain a database application (such as those from Oracle), and product and seller databases, including both affiliated and unaffiliated sellers. It retrieves and may organize information on products from various sellers, including, without limitation, the price, product features, brand, delivery time, warranties, shipping costs, financing, and seller reputation.

SELLER RULES DATABASE A1240 contains a CPU, memory, disk drive, operating system, network adapter (such as Ethernet) and other components typical of network servers, as well as a database application (such as those from Oracle). It contains rules which affiliated sellers have set in relation to limits and other constraints on how seller offers on products or services will be made to buyers through the auction process. This database need not reside within the core network A1200. It could, for example, also reside at a secure seller site.

VALUE-ADD DATABASE SERVER A1290 contains a CPU, memory, disk drive, operating system, network adapter (such as Ethernet) and other components typical of network servers, as well as a database application (such as those from Oracle). It contains information on value added products or services or other offers which may be combined with seller offers in order to enhance the overall offering to the buyer.

AUCTION ENGINE SERVER A1250 contains a CPU, memory, disk drive, operating system, network adapter (such as Ethernet) and other components typical of network servers, as well as an auction engine application, and also may contain a database application (such as those from Oracle), and a database of algorithms used for various product categories as required. The server conducts the auction and generates and stores results and reports for sellers.

THIRD PARTY DATABASE SERVER A1280 contains a CPU, memory, disk drive, operating system, network adapter (such as Ethernet) and other components typical of network servers, as well as a database application (such as those from Oracle). It contains information on third party ratings of products and/or services which can be utilized in the auction process depending upon buyer-selected priorities.

BILLING SERVER A1260 contains a CPU, memory, disk drive, operating system, network adapter (such as Ethernet) and other components typical of network servers, and may also contain a database application (such as those from Oracle). It collects and maintains billing records. It may process bills to invoice affiliated sellers based upon a variety of criteria, including, without limitation, completed sales, charges for participating in auctions, or charges for proprietary and/or non-proprietary information.

II. System Operation

The preferred embodiment includes several methods for buyers to navigate through the process, which depend on the buyer's level of expertise. Buttons can be selected which give more information or which skip several steps altogether to take the buyer directly to the auction itself, depending upon buyer preference.

Figure 23:
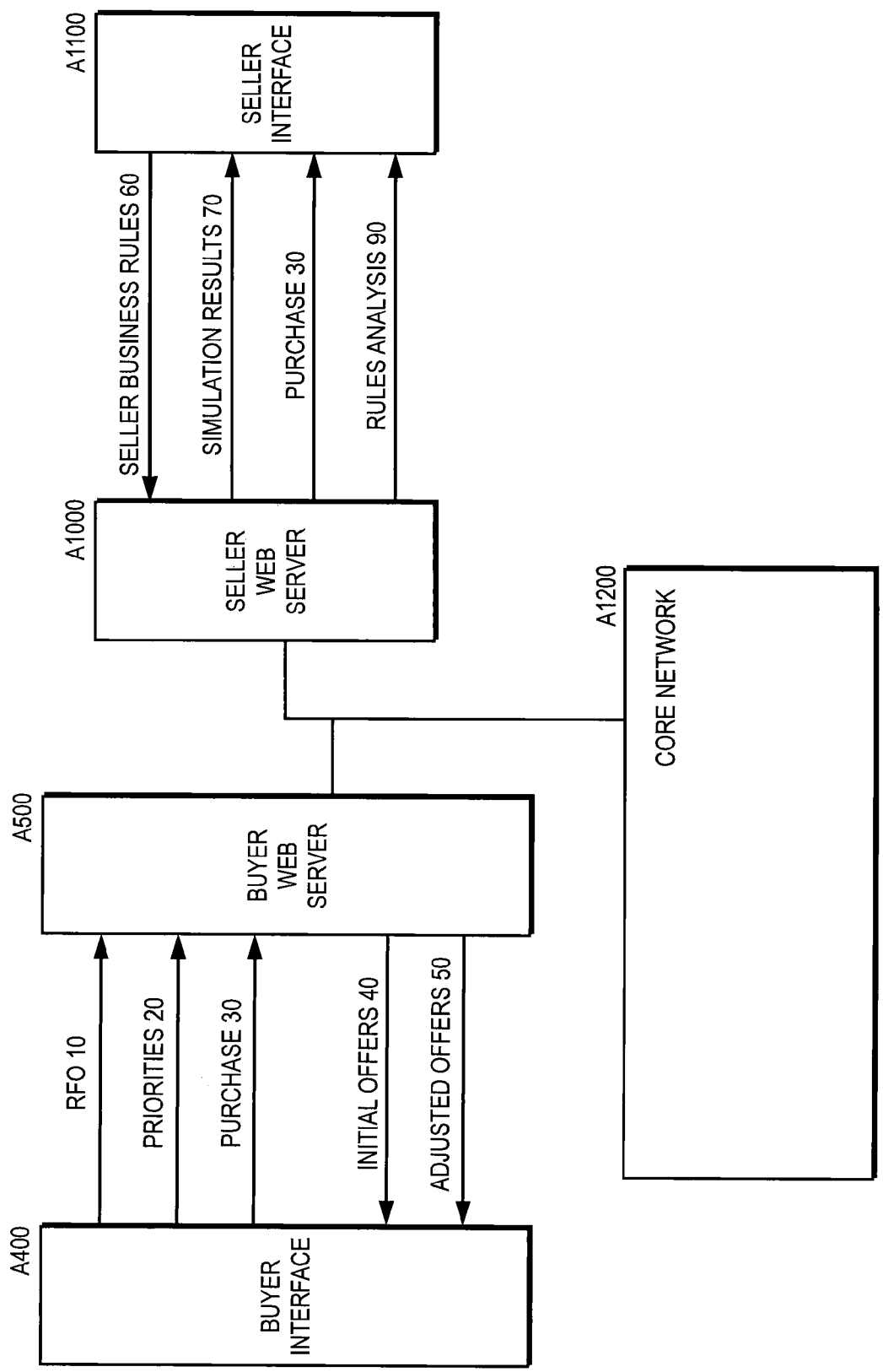
FIG. 23 is a block diagram illustrating the communication of information between buyer interface and web server, and between seller interface and web server.

FIG. 23 illustrates an exemplary embodiment of the present invention in which communications between buyers and sellers take place over the Internet, with buyer web server A500 and seller servers A600, A800 and A1000 acting as intermediaries. The buyer logs on to buyer web server A500 and creates a request for offer (RFO) 10. RFO 10 is made available to seller rules 60 that had been previously defined by sellers, transmitted to seller web server A1000, and stored within core network A1200. An auction is run within the core network, taking into account the RFO 10, seller rules 60, and, potentially, some third party information. Buyer web server A500 sends sellers' initial offers 40 and/or adjusted offers 50 to the buyer, who decides whether or not to proceed with the transaction. If a transaction is concluded, purchase announcement 30 is communicated to the seller.

FIGS. 24 through 27 are flow charts illustrating the process by which the buyer formulates RFO 10, requests and receives initial offers 40, specifies her preferences 20, requests and receives adjusted offers 50, modifies her RFO 10 or preferences 20 based on adjusted offers generated by the system, and carries on the transaction. It is assumed that buyer had already established a connection with buyer web server A500, through buyer interface A400. Any computer capable of running web browser software, such as Netscape Navigator or Microsoft Internet Explorer, can serve as buyer interface A400. The actual process of establishing such an Internet connection to server A500 is well-known, and need not be described further here.

Figure 24:
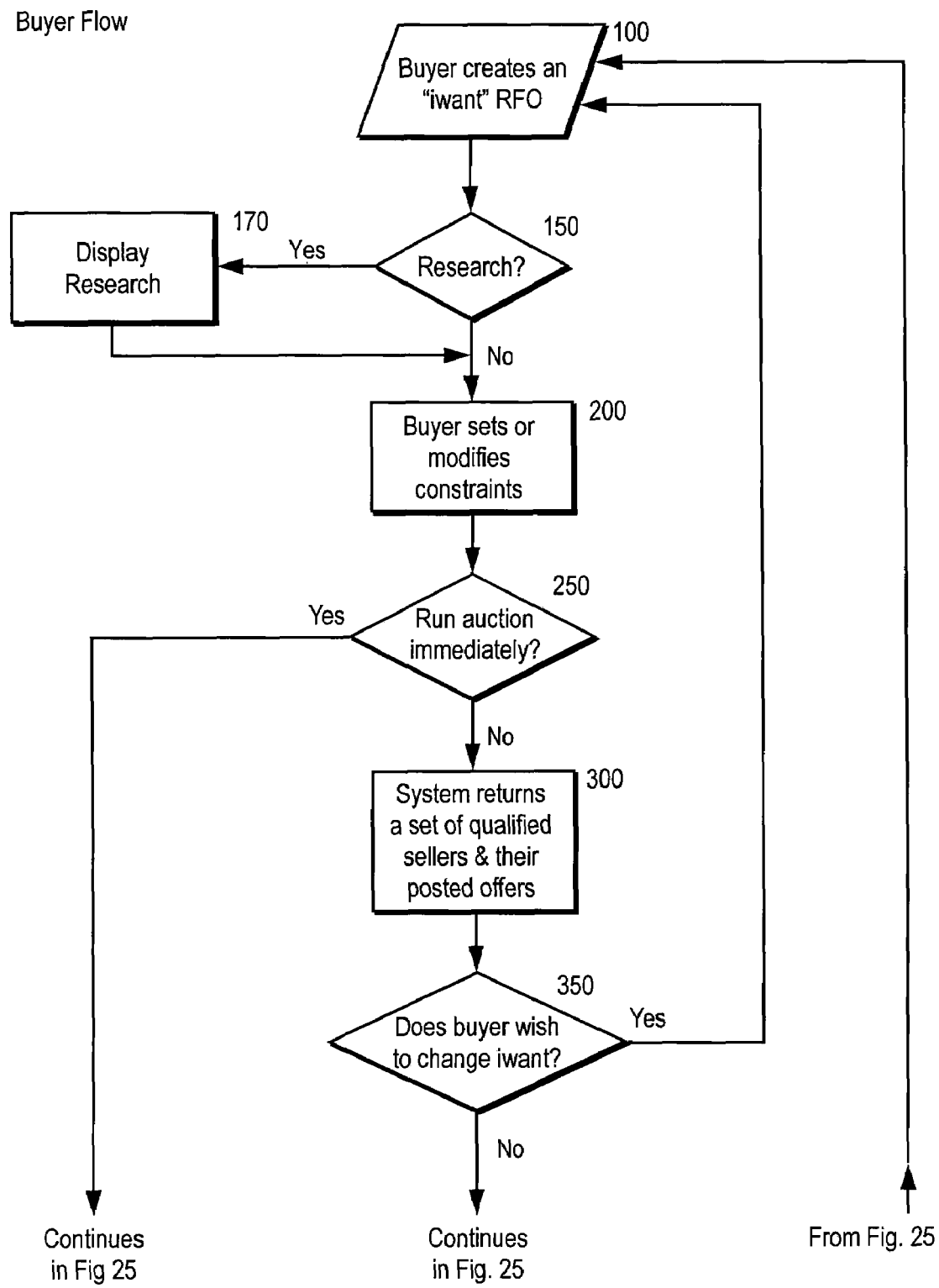
FIGS. 24-27 are flow charts illustrating an exemplary embodiment wherein the buyer creates a request for offer (RFO), specifies priorities, and receives adjusted offers.
Figure 25:
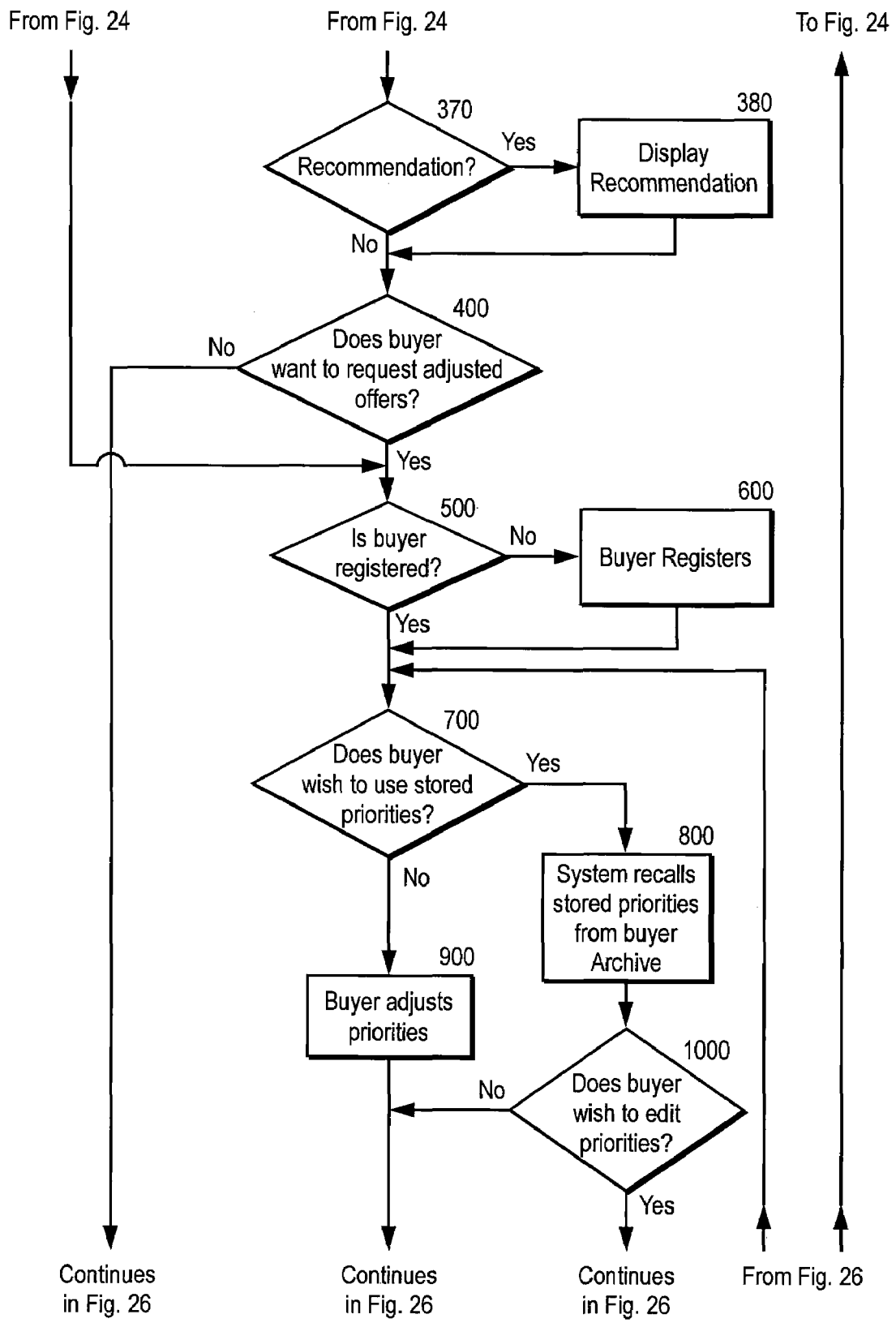
Figure 26:
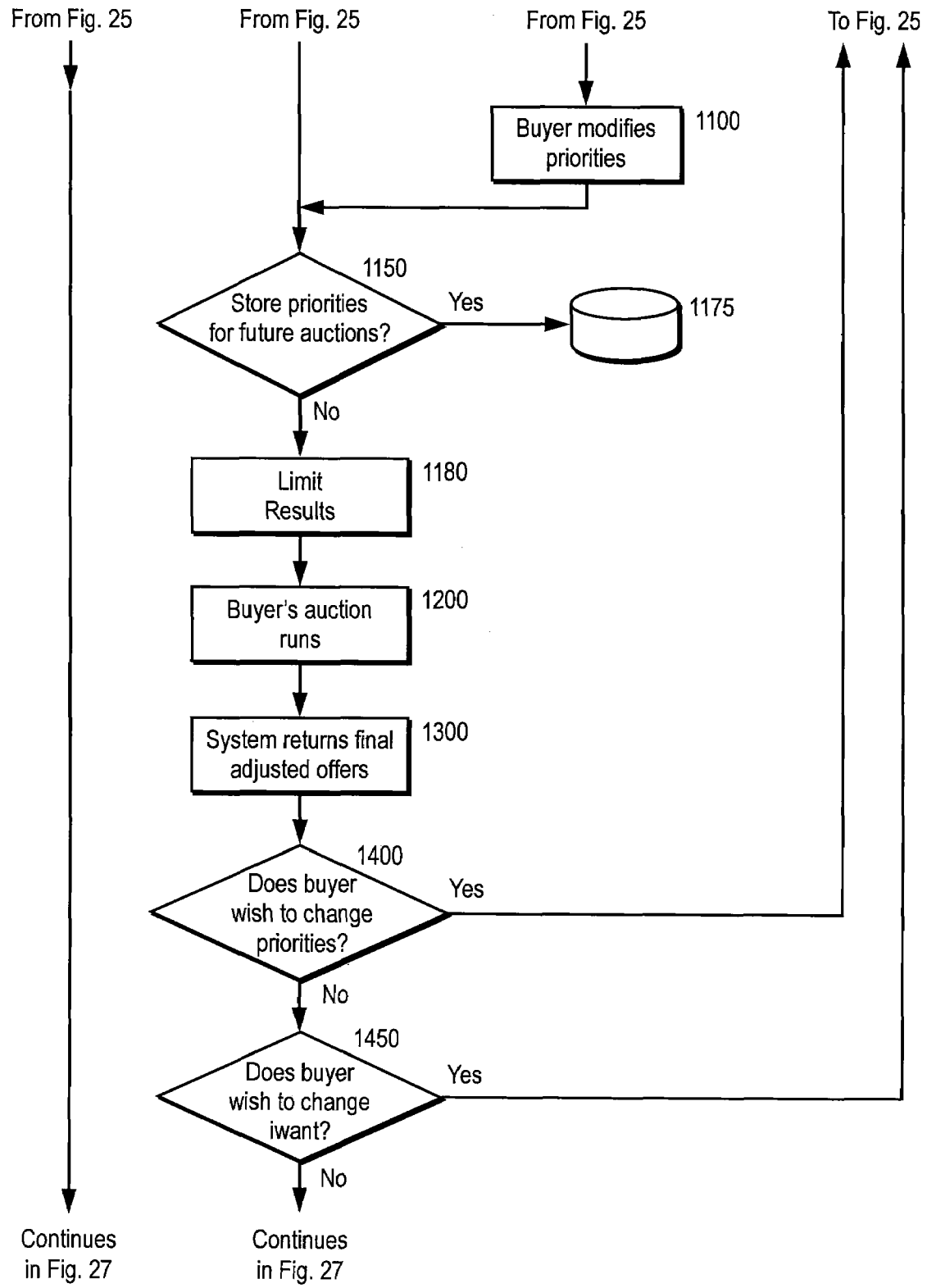
Figure 27:
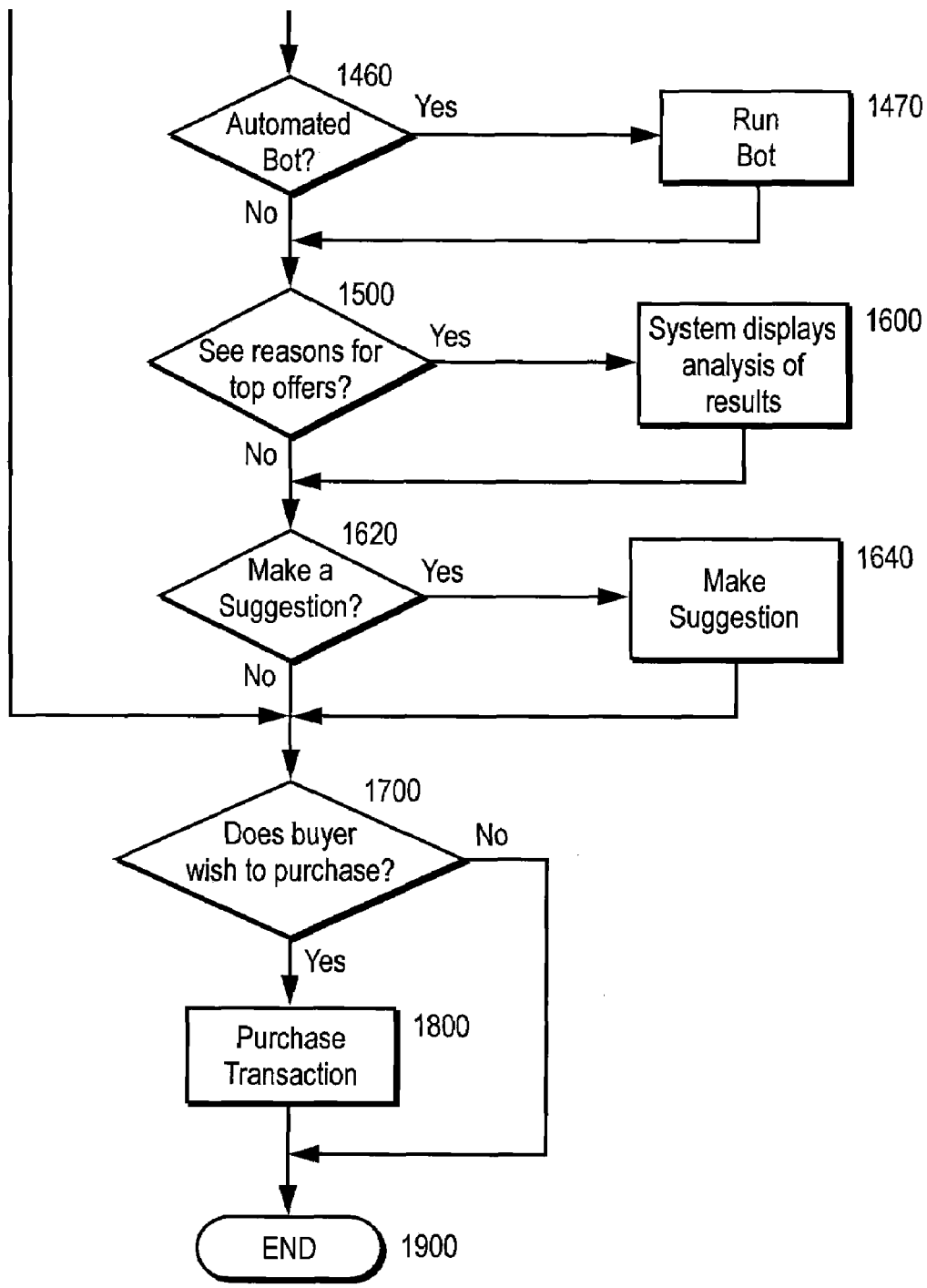

At step 100 in FIG. 24, the buyer creates an RFO 10. In a preferred embodiment, video monitor A405 of buyer interface A400 displays a form similar to U100 (FIG. 31). In the form U100 (FIG. 31), a buyer enters a description of the product or service she wants to purchase, the description preferably being made in natural language. The description may include the type of product, requested features, warranty period, financing needs, delivery preference, and any other attribute the buyer wishes to include. The description, however, can be also very general. For example, the buyer may specify that she is looking for products enabling her to watch movies or for products enabling her to store food, rather than specifying particular items like VCRs and DVD players or refrigerators and kitchen cabinets, respectively. The description is received by buyer web server A500, which passes it to natural language interpreter A1210, embedded within core network A1200, to convert it into a format that shopping engine A1230 can later process. In another embodiment, the buyer selects the product category and features from a pre-defined on-screen or pull down menu, which may be hierarchically structured.

At step 150, the buyer decides whether or not she wants to request information or advice on a product or category of products. This may be done, for example, by clicking on the "learn" button in form U100 (FIG. 31). In another implementation, information is displayed automatically, depending on the vagueness of the buyer's description. Descriptions that do not include a precise specification of a product or service, but only an area of interest, are treated to suggest the buyer needs to be informed about products or services in that area. In yet another implementation, the buyer may actually begin with step 150, and proceed to step 100 only after having been educated about products fitting her needs.

At step 170, video monitor A405 displays requested research or advice, through a form similar to U200 (FIG. 32). The research or advice is supplied to buyer interface A400 by third party data server A1280, through buyer web server A500. The information supplied based on the research request can vary in its complexity. For example, without limitation, the information can be as simple as an article explaining the available features of new products and the differences among them or as detailed as a table summary with feature-by-feature product comparisons like those often shown in consumer magazines (e.g., Consumer Reports). Advice can range from a mere recommendation of a brand name, to a full stipulation of product's essential features, or to summary statistics showing the popularity of various products among users of the present invention.

At step 200, the buyer can optionally delimit the scope of seller search, through a form such as U400 (FIG. 35) or U410 (FIG. 36), which may be accessed by selecting the "look only" button on form U100 (FIG. 31). A wide variety of constraints can be placed on the search. For example, the buyer can limit eligible retailers to only those within a local geographical area, state, or country. She can also exclude retailers from a particular geographical area, e.g. "everything but California". Another limit may be imposed by specifying the highest price the buyer is willing to pay, or the shortest period of warranty service. The buyer can also insist on including in the search only those retailers that were ever rated by reputable agencies, or reviewed by major magazines, or earned a high reputation from other buyers, possibly with similar demographic characteristics. The buyer's constraints are stored in the Buyer Database Server A1220. In an alternative embodiment, step 200 may be omitted. In yet another alternative embodiment, step 200 can be embedded after step 300.

At step 250 the buyer may choose to proceed directly to the specification of her preferences and the actual auction, both of which are described later in this section. This may be done by clicking on the "go!" button in form U100 (FIG. 31), form U400 (FIG. 35), or form U410 (FIG. 36). The choice is for convenience to repeat buyers, who are familiar with the interface and aware of the time saved by using this shortcut. In another embodiment of the system, it need not be implemented. By clicking "my choices" in form U410 (FIG. 36) in buyer interface A400, the buyer does not proceed directly to the auction, which makes the present invention comparable in "look and feel" to current Internet shopping engines, thereby lowering the switching costs to users.

At step 300, shopping engine server A1230 queries product qualifier database server A1270, and retrieves offers that satisfy most or all of the criteria specified in RFO 10. The results of the search, initial offers 40, are passed to buyer interface A400, where they are displayed in form U600 (FIG. 38). Sellers offers may either be precompiled and stored on product qualifier database server A1270, or server A1230 may request them and compile them on the fly from seller web server A1000, direct database access method server A800, or HTML data interface method server A600.

The buyer may sort returned initial posted offers 40 in U600 (FIG. 38) by price, delivery time, store distance, seller name, manufacturer name, model number, etc., by clicking on the appropriate buttons. In another embodiment, the posted offers could be sorted by a score that is automatically imputed to each offer, as described in greater detail in step 380.

Optionally, the system could, at this stage, enrich the list of initial offers by a list or browser window displaying complementary goods or services. Complementary or substitution products may, without limitation, be identified by analysis of buying habits of consumers or by the application of a collaborative filter to the buyer's request. In other embodiments, similar suggestions could be made, without limitation, at steps 380, 1300, 1620, or 1900.

At step 350 the buyer can revise her RFO 10, by displaying the form U100 (FIG. 31) (or a similar form) again. This helps in situations in which RFO 10 was stipulated too narrowly, with shopping engine A1230 returning only a few or no initial offers 40, or too broadly, when hundreds of offers 40 were returned U600 (FIG. 38). Alternatively, this step can be omitted, leaving buyers to use other methods to return to step 100, such as pressing the web browser's "back" button.

At step 370, the buyer asks for a recommendation from among the initial offers 40, for instance, by clicking on the "make a recommendation" button in form U600 (FIG. 38). Alternatively, the recommendation may be generated automatically, without the buyer's prompt, when the posted offers are initially displayed.

At step 380, the recommendation is displayed by buyer interface A400 in a suitable form. A possible form is shown in U700 (FIG. 39), wherein a numerical score is calculated for each initial offer 40 and offers are sorted in descending order. Such a score could, for example, be based in part on the ranking of the product by Consumer Report and/or other magazines, or it could be based in part on its popularity among other buyers, as determined from records of purchases.

At step 400 buyer chooses to proceed with an auction or to make an immediate transaction. In one embodiment, buyers conducting immediate transactions (i.e., not using the auction component of the present invention) do not need to identify themselves because they transfer to the seller's web site to conclude the transaction, while buyers requesting adjusted offers 40 must be registered. In alternative embodiments, all buyers may be required to conclude every transaction in-situ, thus requiring identification from all of them. In yet another embodiment, all transactions may be concluded directly with the seller, for example at his website, thus requiring no registration from any buyer at the Auctioneer site.

At step 500, the System checks whether the buyer has registered with buyer web server A500 before. If not, a standard registration form U800 (FIG. 40) is displayed on buyer interface video monitor A405, in which the buyer identifies herself. This step can also be automated, for example by using browser cookies, thus demanding no action on the buyer's part.

In the present embodiment, registration and identification are used to create and invoke buyer's profile, stored within buyer database server A1220. A simplified version of the system may not require step 500. Instead, buyers could re-enter information concerning their priorities every time they use the simplified system.

At step 600, the buyer completes a registration process. Buyer web server A500 instructs buyer database server A1220 to open a new "account", and the buyer sees, for example, a form such as U1300 (FIG. 47) on her monitor A405. The buyer or her proxy enters information about the buyer which can include, without limitation, basic personal demographic information, billing and shipping addresses, and credit card information, which are stored in buyer database A1220. The buyer's account information is preferably accessible to the buyer from any user interface so that it can be updated or modified by the buyer at any time.

Form U1300 (FIG. 47) makes accessible other forms, like U1310 (FIG. 48), U1320 (FIG. 49), U300 (FIG. 33), or U310 (FIG. 34). Form U1310 (FIG. 48) displays an example of buyer's archive record, showing all transactions that the buyer made within the system. Form U1320 (FIG. 49) shows a report of a rewards program. Sellers may offer benefits in terms of a reward program to the buyer, as part of their bidding strategy and/or in exchange for information about the buyer. Forms U300 (FIG. 33) and U310 (FIG. 34) deal with the buyer's priorities and are discussed later in this section.

At step 700, the buyer chooses whether to create a new set of priorities 20 or to use her priorities 20 stored in her account on buyer database server A1220. For example, buyers who frequently purchase the same or similar goods may benefit from using their stored priorities 20, which had already been optimized. At step 800, buyer web server A500 contacts buyer database A1220 to recover stored priorities 20. They are, in turn, passed to buyer interface A400, and displayed in a form such as U300 (FIG. 33). The sliders in form U300 (FIG. 33), which correspond to the buyer's priorities for product or service features, can assume their positions from the last transaction, or their positions when last stored in the buyer's account.

At step 1000, buyer's approval of the recovered priorities 20 is sought. In form U300 (FIG. 33), the priorities 20 may be approved by clicking on the "go!" button. At step 1100, the buyer modifies recovered priorities 20. This modification can be done in a wide variety of ways. For example, the modification can be made by adjusting the sliders in an exemplary form U300 (FIG. 33). It can also be made with the aid of an expert system, as illustrated by the "decide for me" button on form U310 (FIG. 34). The expert system may run on buyer database server A1220, or any other server within core network A1200, or be dedicated to its own server. The expert system may, for instance, analyze the buyer's transaction record and infer the most likely priorities 20 that would have generated such a record. It may also base its suggestion on the average or median priorities 20 of a group of buyers with similar demographic characteristics.

At step 900, the buyer creates a new set of priorities 20 by moving sliders within form U300 (FIG. 33). Sliders are just one example of the many ways that could be used to enable a buyer to set her priorities. Other methods of setting preferences are well known to those of ordinary skill in the art and need not be described in detail here. Optionally, expert system aid may be available at step 900.

At step 1150, buyer instructs buyer web server A500 to store the new or modified priorities 20 in her account within buyer database A1220. The actual storing of priorities 20 is done in step 1175.

At step 1180, the buyer can optionally put restrictions on displayed auction results. For instance, as shown in an exemplary form U810 (FIG. 41), the buyer can limit the number of adjusted offers 50 to be displayed, or provide a cut-off point for adjusted offers 50. Buyer may also be reminded at this step of the restrictions created in step 200, in forms U400 (FIG. 35) and U410 (FIG. 36). In another embodiment, step 1180 may be omitted.

At step 1200, auction engine server A1250 runs a buyer's auction. The detailed description of the auction process is provided later below, using FIG. 28 with steps 1210 through 1280.

In certain cases, as in U910 (FIG. 43), utilizing A1290, it may be beneficial for the Auctioneer (the buyer's auction service provider) to attach value added products or services or other offers which may be combined with seller offers to enhance the overall offering to the buyer. This may also give the perception to the buyer that all offers are adjusted whether or not they are from affiliated sellers.

At step 1300, a list of final adjusted offers 50, with their scores, is returned to the buyer web server A500 by auction engine server A1250. It is passed to buyer interface A400, through an exemplary form U900 (FIG. 42). The results may be sorted in a wide variety of ways, including without limitation, by the score each adjusted offer 50 earned, by price, or by model number.

At step 1400 buyer determines whether to proceed or to modify her priorities 20. For instance, by clicking on the "adjust my priorities" button in form U900 (FIG. 42), the buyer returns to step 700. The loop gives the buyer a quick way to learn how different sets of priorities 20 affect the resulting adjusted offers 50. Step 1400 is not essential, other embodiments need not contain it.

At step 1450, buyer may revise her RFO 10. Revision is accessible, for example, by pressing the "I want to . . . " button in form U900 (FIG. 42).

At step 1460, buyer can choose to employ an automated bot. The bot enables the buyer to automate recurring transactions. It can alert the buyer when the transactions are supposed to be undertaken and/or it can enable the buyer to search for buyer-specified offers that are unavailable at the present time, but which are likely to appear in the future. The bot may run on buyer web server A500, however, it can also run on a dedicated server (not displayed) within core network A1200. The choice of using an automated bot can also be made available to the buyer at other points in the process.

At step 1470, buyer sets parameters for the bot, as illustrated in exemplary form U500 (FIG. 37). For instance, the buyer can specify, without limitation, the length of time for the bot to be active, the means of notification of the buyer, or whether or not the transaction can be made by the bot on the buyer's behalf.

At step 1500, the buyer can elect to see an analysis of final adjusted offers. The analysis is provided to help the buyer better understand the influence of priorities 20 on adjusted offers 50. It may be accessible via the "explain" button in form U900 (FIG. 42), or in any other suitable way.

At step 1600, analysis of adjusted offers is performed and displayed. In one embodiment, buyer's monitor A405 displays exemplary form U1100 (FIG. 45), which shows adjusted offer 50 evaluated with respect to buyer's priorities 20. Optionally, or in another embodiment, buyer web server A500 uses adjusted offers 50 and buyers priorities 20 to compute the critical factors that made a particular offer inferior to the highest-score offer. Yet, in another embodiment, buyer's monitor A405 displays a table that lists all attributes of the adjusted offers 50, together with buyer's priorities 20, and explicitly shows how the scores were calculated.

At step 1620, the buyer can request expert suggestions. The suggestions may be based on numerous factors, including, without limitation, results of product or service testing by independent third parties, recommendations of major magazines, or reputation points given by the other users of the present invention. It can also take the form of recommending a complementary product, as described earlier. For example, a buyer interested in a home theater system can be informed that most other people buying home theater systems also buy speaker stands.

At step 1640, the actual suggestion is generated and displayed. In one embodiment, buyer web server A500 queries third party database server A1280 for results of testing, or for third party recommendations. It also queries buyer database server A1220 to identify other products and/or services that are commonly purchased with the product or service returned in adjusted offers 50. Typical results of a suggestion search are displayed in exemplary form U1200 (FIG. 46) on buyer's monitor A405.

At step 1700, the buyer can make a decision to purchase. This can be done, for example, by clicking on a "buy me!" button in form U900 (FIG. 42). Foregoing a purchase makes buyer web server A500 store buyer's RFO 10 for potential later use. The buyer may alternatively click a "talk to a rep" button in form U900 (FIG. 42) to be connected, either telephonically or electronically to a seller representative, who could potentially answer questions in regards to the product or service in question.

At step 1800, the transaction is executed. In the preferred embodiment, buyer web server A500 receives buyer's billing information from buyer database server A1220, and relays it to buyer interface A400 for confirmation. For example, form U1000 (FIG. 44) may be shown on buyer's monitor A405, asking the buyer to either confirm or modify her billing and shipping information. Upon confirmation, purchase 30 is received by buyer web server A500 and relayed to billing server A1260 for further processing.

Billing server A1260 sends purchase 30 to HTML data interface method server A600, or direct database access method server A800 (possibly utilizing a proprietary standard), or to seller web server A1000 depending on the seller's setup. Purchase 30 is then received, respectively, by seller website A700, seller database A900, or seller interface A1100. For example, a purchase notification mediated by seller web server A1000 may look like that in form U3500 (FIG. 59). Purchase announcement 70 notifies the winning seller that a transaction has been made on his behalf. Also, billing server A1260 credits the seller's account, while applying agreed upon charges for a closed transaction.

In an alternative embodiment, if users of the present invention are not required to register but are required to perform the transaction in-situ, then step 1900 would consist of the buyer inputting billing and shipping information, with the rest of the process being the same as that described above.

In yet another embodiment, if buyers complete the transaction at the winning seller's website, then step 1900 would consist of buyer web server A500 determining which seller was chosen by the buyer, and instructing billing server A1260 to charge that seller a success fee.

Figure 28:
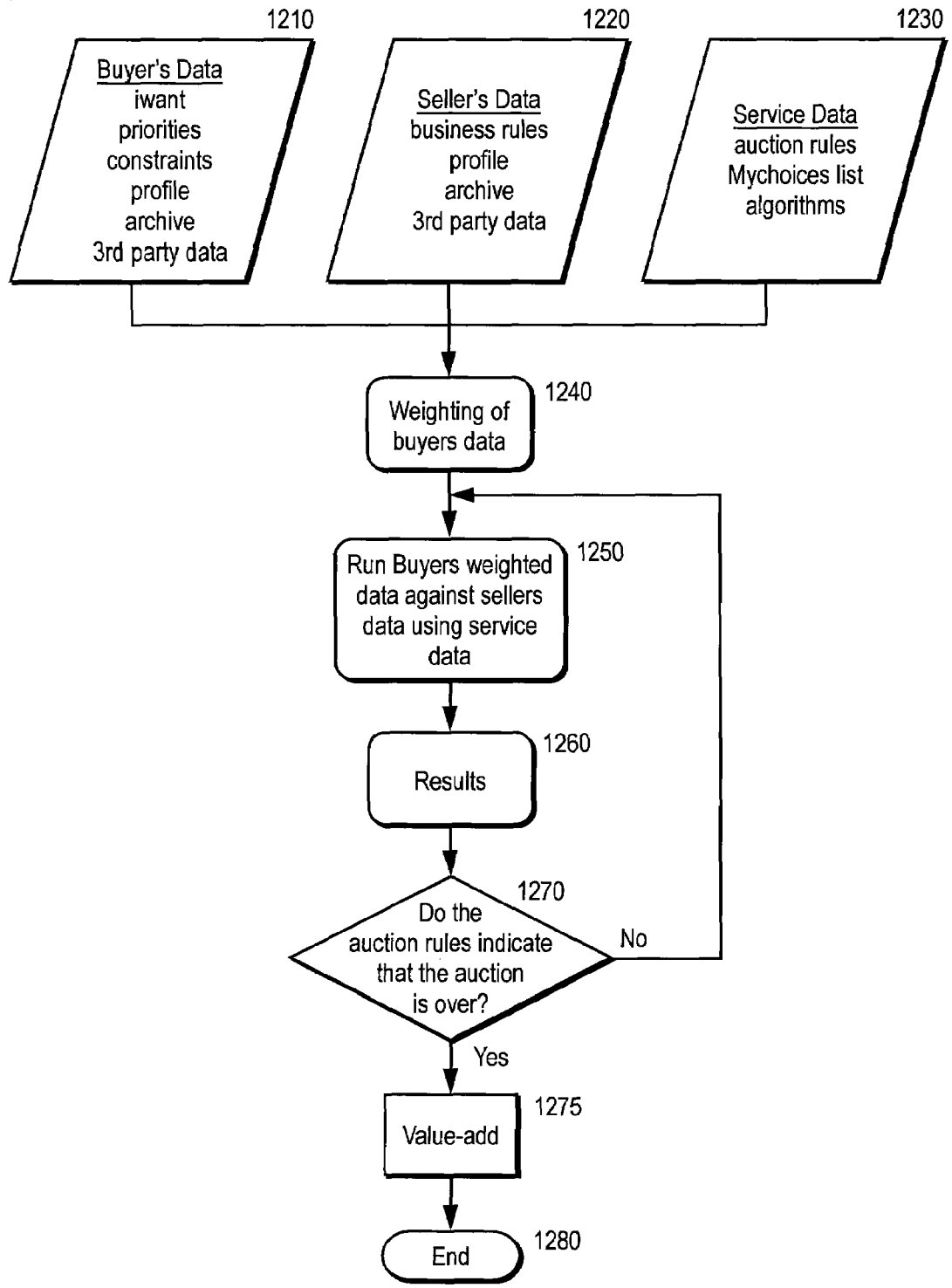
FIG. 28 is a flow chart illustrating an exemplary embodiment of a buyer's auction.

FIG. 28 illustrates an exemplary embodiment of the process by which auction engine server A1250 generates adjusted offers 50. The process involves the use of buyer's RFO 10, her priorities 20, the sellers' business rules 60, and a set of auction rules. The auction rules are preferably specified by the Auctioneer service provider, but can also be specified by the buyer or any other appropriate party. Optionally, third party information can be used in the auction process, as explained below.

At step 1210, auction engine server A1250 receives buyer's RFO 10 and her priorities 20 from buyer web server A500.

At step 1220, auction engine server A1250 queries seller rules database A1240, and obtains business rules from those affiliated sellers that could potentially satisfy RFO 10. In addition, third party information can be requested from third party database server A1280. For example, ratings information from a third party service (e.g., Consumer Reports) can be obtained if the buyer has limited her choices to only those products or services that have received a favorable review from such a rating service. Furthermore, information from past users of the present invention can be obtained from buyer database A1220. For example, a list of products and services that have received fewer than 20 complaints from previous buyers using the Auctioneer can be obtained if the buyer has limited her choices to only those products or services that have not generated complaints by previous buyers. Simplified embodiments of the present invention need not include all of the various forms of information. Alternatively, auction engine A1250 can just obtain the business rules of sellers who satisfy all restrictions imposed by the buyer. Auction engine A1250 may also receive constraints imposed by the buyer on participating sellers, as specified in step 200, or limitations on bidders and auction outcomes, as specified in step 1180. Those steps are, however, not necessary. In another embodiment, the restrictions may be applied by buyer web server A500 after adjusted offers 50 have been generated, for example at step 1300.

At step 1230, the auction engine server A1250 retrieves the auction rules previously stored on the auction engine server A1250 by the Auctioneer service provider. Alternatively, the auction engine server A1250 can receive auction rules specified by the buyer from buyer web server A500.

At step 1240, initial offers 40 are evaluated according to buyer's priorities 20 and a best initial offer is determined. The evaluation may involve weighting initial offers 40 by linear weights constructed from buyer's priorities 20. Many other weighting techniques are admissible, however, such as non-linear weighting, and need not be described in detail here.

At step 1250 an adjustment of seller offers is performed. Seller business rules 60 are used to modify initial offers 40, or adjusted offers 50 made in a previous round. Seller business rules 60 can optionally respond based on information about the seller offers from the previous round. More thorough specification of seller business rules 60 is discussed below, with respect to FIGS. 29-30.

At step 1260, adjusted offers 50 of the present round are evaluated. In the preferred embodiment, the evaluation is identical to that in step 1240. In alternative embodiments, however, it can be different. The evaluation may be used, for instance, to determine whether a seller's adjusted offer 50 is admissible. The criteria for admissibility of adjusted offer 50 are part of the auction rules, and can be very general.

At step 1270, the status of the auction is compared with auction rules obtained in step 1230. If auction rules indicate the auction has not reached an end, it continues to loop. For example, an auction that ends when no seller makes an improving offer may loop several times.

At step 1275, value-added product or services can optionally be added to affiliated or unaffiliated sellers' offers.

At step 1280, the process on the auction engine server terminates, with final adjusted offers 50 being transmitted to buyer web server A500.

Figure 29:
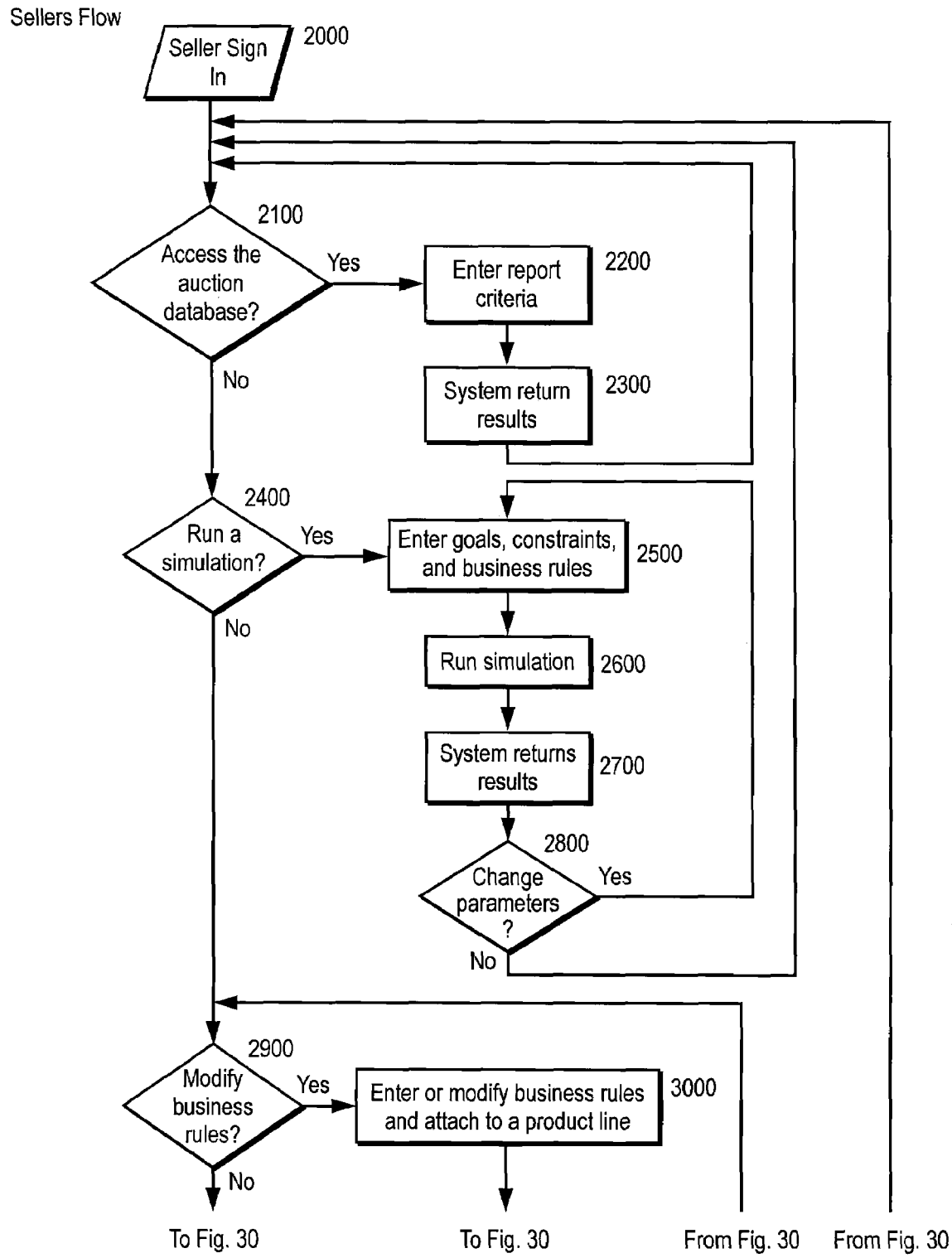
FIGS. 29-30 are flow charts illustrating a process in which the seller specifies business rules, runs a simulation, and requests and obtains information generated by the present invention.
Figure 30:
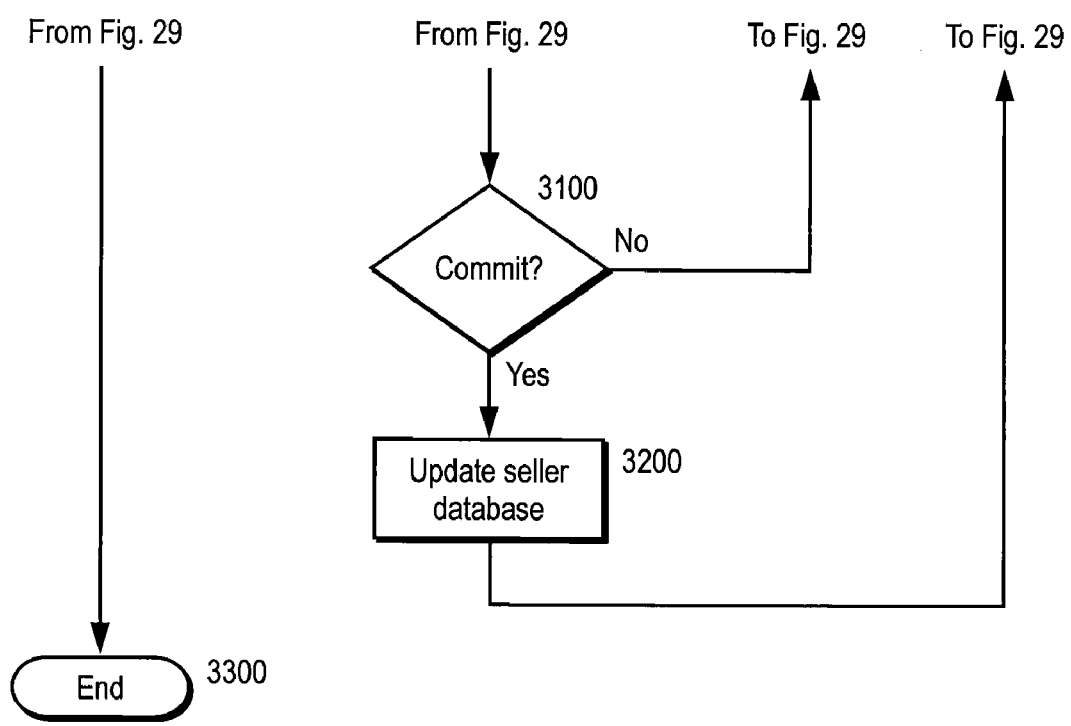

FIGS. 29 and 30 describe the process by which the seller creates and stores his business rules for the auction and obtains information, or analysis of information, generated by the present invention. It is assumed that the seller had established an Internet connection with seller web server A1000, through seller interface A100. Any computer capable of running Internet browser software can be used to establish this connection.

At step 2000, the seller signs in to seller web server A1000 using seller interface A1100. The process of signing in involves the seller supplying any valid identification to access his account on seller rules database server A1240. The account on seller rules database server A1240 had been previously created by the maintenance staff of the System, based on an affiliation agreement with the seller. The agreement can, for example, be reached using mail, email, fax, Internet form subscription, or any other means of communication capable of supporting legally binding agreements.

For cases in which the affiliation agreement is reached over the Internet, the seller may be presented with forms similar to U2000 (FIG. 50), U2100 (FIG. 51), and U2200 (FIG. 52). Form U2000 (FIG. 50) is an exemplary overview with links to sections discussing the rights and responsibilities accepted by the seller and the entity running the present invention. Form U2100 (FIG. 51) illustrates possible types of affiliation. As mentioned in the "Product and Pricing" section of the Background, the present invention generates proprietary information. Different types of affiliation grant access rights to different bundles of proprietary information. Form U2200 (FIG. 52) succinctly summarizes exemplary types of information available under each type of affiliation. In a simpler embodiment of the present invention, all sellers could have identical access rights to the information.

At step 2100, the seller chooses whether to view information generated, or mediated by the present invention. All affiliated sellers have access to auction results, such as that described as near-perfect information in the Background of the Invention. The information may range from that which is also readily available from other parties, to information that can be, in principle, obtained in the absence of the present invention (e.g. buyers' needs, or priorities), to detailed information that is only generated by the present invention, listed, for instance, in the right column of form U2200 (FIG. 52).

At step 2200, the seller specifies the information to view, in a suitable form displayed on seller's monitor A115. This may include the area of products or services, the type of information, like RFOs 10, or auction results 50, the time period, and other constraints on requested records. Seller web server A1000 automatically compares the seller's request against his affiliation agreement obtained from seller rules database server A1240, and invalidates the request if the seller's affiliation agreement prohibits access to the requested information. At step 2300, seller web server A1000 searches buyer database server A1220, or third party databases A1280 and returns results as rules analysis 90 to the seller interface A1100. Forms like U3000 (FIG. 55), U3100 (FIG. 56), U3200 (FIG. 57), U3400 (FIG. 58) or U3500 (FIG. 59) can be used to display information on individual transactions that occurred within the present invention. Exemplary forms U3000 (FIG. 55) and U3100 (FIG. 56) pertain to buyer's information. Some of the buyer's information may only be accessed with the buyer's permission, e.g., in exchange for buyer loyalty program incentives (like frequent flier points). Forms U3200 (FIG. 57) and U3400 (FIG. 58) pertain to records of actual offers generated by the present invention, while form U3500 (FIG. 59) displays the terms of the offer eventually accepted by the buyer. Form U3600 (FIG. 60) displays aggregate information about and analysis of auctions occurring during a certain time interval.

At step 2400, the seller can decide to use his business rules 60 in a simulated environment, giving him the opportunity to test them prior to committing to use them. Using a simulated environment helps the seller discover whether his rules perform as intended.

At step 2500, the seller enters his business rules 60 into forms like U2300 (FIG. 53) or U2400 (FIG. 54). Form U2300 (FIG. 53) represents only an example of the way business rules 60 can be specified. These rules could also be driven by an electronic interface to another computer located on the seller's site which contains seller's own proprietary rule based system. Different sets of specifications can be allowed in different categories of products. Business rules 60 are sent by seller interface A1100 to seller web server A1000 and passed to seller rules database server A1240, however, they are marked "simulation-only" as they do not represent a binding commitment on the part of the seller.

At step 2600, a simulation is run inside core network A1200. In one embodiment, auction engine A1250 obtains the last n RFOs 10 and priorities 20 from buyer database server A1220 falling within the category to which the business rules apply. Auction engine A1250 then runs n auctions employing the seller's rules 60 against other sellers' rules. In a different embodiment, auction rules 60 are treated by auction engine A1250 as valid rules, except the offers generated by them are not made visible to the buyer within returned adjusted offers 50. After the simulation ends, seller rule 60 is invalidated by seller rule database server A1240.

At step 2700, auction engine server A1250 sends simulation results 70 to seller web server A1000 for further processing. Seller web server A1000 passes results 70, or their analysis to seller interface A1100 where they are displayed on seller video monitor A1115. The results may show basic aggregate information about how the sellers simulated rules compared to other sellers' rules in all dimensions, as in form U3600 (FIG. 60), or information on how many auctions were won, and what were the priorities profiles to which the simulated rule most appealed.

At step 2800, the seller can continue to experiment with his business rules in the simulation by changing the parameters.

At step 2900, the seller can modify his business rules 60 that he uses in actual (not simulated) auctions.

At step 3000, the affiliated seller enters or modifies seller business rules 60 in form U2300 (FIG. 53), in much the same way as in the simulated environment. The seller can adopt business rules that produced favorable results for him in a simulation. However, the modified rules do not have to be based on simulation results.

At step 3100, the seller decides to make new seller business rules 60 legally binding.

At step 3200, seller business rules 60 are sent to seller web server A1000 and permanently stored within seller rules database A1240 of core network A1200.

The various embodiments described above should be considered as merely illustrative of the present invention and not in limitation thereof. They are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims which follow:

What is claimed is:

1. A fully automated method of facilitating an electronic auction between a prospective buyer and a plurality of prospective sellers with near perfect information, comprising the steps of:

inputting into a computer a buyer's request for an offer;

communicating the request for an offer to at least two of the sellers;

receiving offers, including terms of sale in response to the request for an offer, from at least two of the sellers;

automatically generating rating information about seller offers based on a plurality of predetermined criteria;

communicating information regarding at least some of the seller offers to at least one other seller;

receiving an adjusted offer from at least one of the sellers during a specified auction period; and communicating information regarding at least some of the seller offers and at least part of the rating information to the buyer, wherein a software process initiates the communicating of seller offers and rating information to the buyer when a buyer-specified event occurs, and wherein the buyer-specified event is the receipt of a seller offer with a rating above a buyer-specified rating level.

* * * * *